(12) United States Patent
Tsyganskiy et al.

(10) Patent No.: US 7,958,486 B2
(45) Date of Patent: Jun. 7, 2011

(54) METHODS AND SYSTEMS FOR DATA-FOCUSED DEBUGGING AND TRACING CAPABILITIES

(75) Inventors: Igor Tsyganskiy, Palo Alto, CA (US); Vitaliy Stulski, Los Gatos, CA (US); Dmitri Liakh, Foster City, CA (US); Vyacheslav Gomov, Cupertino, CA (US)

(73) Assignee: SAP AG, Walldorf (DE)

( * ) Notice: Subject to any disclaimer, the term of this patent is extended or adjusted under 35 U.S.C. 154(b) by 1168 days.

(21) Appl. No.: 11/441,164

(22) Filed: May 26, 2006

(65) Prior Publication Data
US 2006/0294158 A1 Dec. 28, 2006

Related U.S. Application Data

(63) Continuation-in-part of application No. 11/111,794, filed on Apr. 22, 2005.

(51) Int. Cl.
G06F 9/44 (2006.01)
G06F 3/00 (2006.01)
G06F 3/048 (2006.01)

(52) U.S. Cl. ........ 717/105; 717/109; 717/125; 717/126; 717/127; 715/713; 715/762; 715/763

(58) Field of Classification Search .................. None
See application file for complete search history.

(56) References Cited

U.S. PATENT DOCUMENTS

| | | | |
|---|---|---|---|
| 4,559,614 A | 12/1985 | Peek et al. | |
| 5,481,711 A | 1/1996 | Sotani | |
| 5,499,371 A | 3/1996 | Henninger et al. | |
| 5,542,078 A | 7/1996 | Martel et al. | |
| 5,577,244 A * | 11/1996 | Killebrew et al. | 717/169 |
| 5,596,746 A | 1/1997 | Shen et al. | |
| 5,659,723 A | 8/1997 | Dimitrios et al. | |
| 5,812,850 A | 9/1998 | Wimble | |
| 5,872,970 A * | 2/1999 | Pickett et al. | 718/101 |
| 5,917,730 A | 6/1999 | Rittie et al. | |
| 5,974,568 A | 10/1999 | McQueen | |
| 5,983,020 A | 11/1999 | Sweeney et al. | |
| 6,023,578 A | 2/2000 | Birsan et al. | |
| 6,031,993 A | 2/2000 | Andrews et al. | |

(Continued)

FOREIGN PATENT DOCUMENTS

EP 726537 A1 8/1996

OTHER PUBLICATIONS

Fahrner, Christian, "A survey of database design transformations based on the Entity Relationship model," Data & Knowledge Engineering 15 (1995) p. 213-250.
Sinha, Atish P. et al., "Ari empirical investigation of entity-based and object-oriented data modeling a development life cycle approach," ACM, Jan. 1999, pp. 229-244.
Tichelaar, Sander, "Modeling Object Oriented Software for Reverse Engineering and Refactoring," Inauguraldissertation der Philosophisch-naturwissenschaftlichen fakultat der Universitat Bern; Dec. 2001.

(Continued)

Primary Examiner — Tuan Q Dam
Assistant Examiner — Isaac T Tecklu
(74) Attorney, Agent, or Firm — Finnegan, Henderson, Farabow, Garrett & Dunner, LLP

(57) ABSTRACT

Embodiments of methods and systems consistent with the present invention enable data-focused analysis of an application by reorganizing execution information generated by an application into categories associated with the data objects used by the application, and displaying or otherwise using the reorganized information for analysis, debugging, execution tracing, etc. of the application. Thus, the application execution information is presented from the data standpoint instead of from the execution sequence standpoint.

17 Claims, 79 Drawing Sheets

U.S. PATENT DOCUMENTS

| | | | |
|---|---|---|---|
| 6,115,646 | A | 9/2000 | Fiszman et al. |
| 6,128,771 | A | 10/2000 | Tock et al. |
| 6,163,781 | A | 12/2000 | Wess, Jr. |
| 6,269,475 | B1 | 7/2001 | Farrell et al. |
| 6,298,354 | B1 | 10/2001 | Saulpaugh et al. |
| 6,339,838 | B1 | 1/2002 | Weinman, Jr. |
| 6,360,223 | B1 | 3/2002 | Ng et al. |
| 6,374,252 | B1 | 4/2002 | Althoff et al. |
| 6,374,256 | B1 | 4/2002 | Ng et al. |
| 6,430,562 | B1 * | 8/2002 | Kardos et al. ............ 1/1 |
| 6,467,079 | B1 | 10/2002 | Ettritch et al. |
| 6,502,098 | B2 | 12/2002 | Lau |
| 6,542,937 | B1 | 4/2003 | Kask et al. |
| 6,591,272 | B1 | 7/2003 | Williams |
| 6,625,651 | B1 | 9/2003 | Swartz et al. |
| 6,633,878 | B1 | 10/2003 | Underwood |
| 6,643,664 | B1 | 11/2003 | Yaung |
| 6,668,370 | B1 | 12/2003 | Harmon et al. |
| 6,681,383 | B1 | 1/2004 | Pastor et al. |
| 6,754,670 | B1 | 6/2004 | Lindsay et al. |
| 6,769,095 | B1 | 7/2004 | Brassard et al. |
| 6,772,172 | B2 | 8/2004 | Leong et al. |
| 6,785,882 | B1 | 8/2004 | Goiffon et al. |
| 6,862,711 | B1 | 3/2005 | Bahrs et al. |
| 6,976,144 | B1 | 12/2005 | Trefler et al. |
| 7,003,781 | B1 | 2/2006 | Blackwell et al. |
| 7,007,029 | B1 | 2/2006 | Chen |
| 7,047,524 | B1 | 5/2006 | Braddock, Jr. |
| 7,072,913 | B2 | 7/2006 | Jans et al. |
| 7,076,766 | B2 | 7/2006 | Wirts et al. |
| 7,099,887 | B2 | 8/2006 | Hoth et al. |
| 7,100,195 | B1 | 8/2006 | Underwood |
| 7,120,896 | B2 | 10/2006 | Budhiraja et al. |
| 7,124,134 | B2 | 10/2006 | Buzzeo et al. |
| 7,194,475 | B2 | 3/2007 | DelMonaco et al. |
| 7,194,485 | B2 | 3/2007 | Kaipa et al. |
| 7,231,400 | B2 | 6/2007 | Cameron et al. |
| 7,536,406 | B2 | 5/2009 | Haselden et al. |
| 7,562,351 | B2 * | 7/2009 | Haas et al. ............ 717/127 |
| 7,680,818 | B1 | 3/2010 | Fan et al. |
| 2002/0023261 | A1 | 2/2002 | Goodwin et al. |
| 2002/0083168 | A1 | 6/2002 | Sweeney et al. |
| 2003/0023950 | A1 | 1/2003 | Ma et al. |
| 2003/0034989 | A1 | 2/2003 | Kondo |
| 2003/0061266 | A1 * | 3/2003 | Ouchi ............ 709/106 |
| 2003/0084127 | A1 | 5/2003 | Budhiraja et al. |
| 2003/0110446 | A1 | 6/2003 | Nemer |
| 2004/0002982 | A1 | 1/2004 | Ersek et al. |
| 2004/0003369 | A1 * | 1/2004 | Gonos ............ 717/100 |
| 2004/0006506 | A1 | 1/2004 | Hoang |
| 2004/0025171 | A1 | 2/2004 | Barinov et al. |
| 2004/0030716 | A1 | 2/2004 | Hoth et al. |
| 2004/0111702 | A1 | 6/2004 | Chan |
| 2004/0168124 | A1 | 8/2004 | Beisiegel et al. |
| 2004/0215642 | A1 | 10/2004 | Cameron et al. |
| 2004/0225678 | A1 | 11/2004 | Buzzeo et al. |
| 2005/0015377 | A1 | 1/2005 | Wan |
| 2005/0027732 | A1 | 2/2005 | Kalima |
| 2005/0050477 | A1 | 3/2005 | Robertson et al. |
| 2005/0060650 | A1 * | 3/2005 | Ryan et al. ............ 715/526 |
| 2005/0076328 | A1 | 4/2005 | Berenbach et al. |
| 2005/0165822 | A1 | 7/2005 | Yeung et al. |
| 2005/0234916 | A1 | 10/2005 | Bergman et al. |
| 2005/0234976 | A1 | 10/2005 | Oara et al. |
| 2005/0262107 | A1 | 11/2005 | Bergstraesser et al. |
| 2005/0262378 | A1 | 11/2005 | Sleeman et al. |
| 2005/0278358 | A1 | 12/2005 | Doughan |
| 2005/0289167 | A1 | 12/2005 | Haselden et al. |
| 2006/0009869 | A1 * | 1/2006 | Sasaki et al. ............ 700/96 |
| 2006/0010106 | A1 | 1/2006 | Gerea et al. |
| 2006/0106626 | A1 | 5/2006 | Jeng et al. |
| 2006/0149790 | A1 | 7/2006 | Rusch |
| 2006/0168565 | A1 | 7/2006 | Gamma et al. |
| 2006/0240396 | A1 | 10/2006 | Foo et al. |
| 2006/0241961 | A1 | 10/2006 | Tsyganskiy et al. |
| 2006/0241999 | A1 | 10/2006 | Tsyganskiy et al. |
| 2006/0242170 | A1 | 10/2006 | Tsyganskiy et al. |
| 2006/0242171 | A1 | 10/2006 | Tsyganskiy et al. |
| 2006/0242172 | A1 | 10/2006 | Tsyganskiy et al. |
| 2006/0242173 | A1 | 10/2006 | Tsyganskiy et al. |
| 2006/0242174 | A1 | 10/2006 | Tsyganskiy et al. |
| 2006/0242175 | A1 | 10/2006 | Tsyganskiy et al. |
| 2006/0242176 | A1 | 10/2006 | Tsyganskiy et al. |
| 2006/0242177 | A1 | 10/2006 | Tsyganskiy et al. |
| 2006/0242188 | A1 | 10/2006 | Tsyganskiy et al. |
| 2006/0242196 | A1 | 10/2006 | Tsyganskiy et al. |
| 2006/0242197 | A1 | 10/2006 | Tsyganskiy et al. |
| 2006/0242207 | A1 | 10/2006 | Tsyganskiy et al. |
| 2006/0271911 | A1 | 11/2006 | Palapudi et al. |
| 2006/0282458 | A1 | 12/2006 | Tsyganskiy et al. |
| 2006/0293934 | A1 | 12/2006 | Tsyganskiy et al. |
| 2006/0293935 | A1 | 12/2006 | Tsyganskiy et al. |
| 2006/0293940 | A1 | 12/2006 | Tsyganskiy et al. |
| 2007/0061732 | A1 | 3/2007 | Bobbin et al. |
| 2007/0214173 | A1 | 9/2007 | Ohashi et al. |

OTHER PUBLICATIONS

Sharewareconnection, "Software Listing: Schema Compare," Apr. 26, 2008 <http://www.sharewareconnection.com/titles/schema-compare.htm> (8 pages).

SQLDBCompare, "The powerful database schema comparison tool for SQL Server databases!," Best SoftTool, Apr. 1, 2004, Apr. 26, 2008 <http://web.archive.org/web/20040401202050/http://www.bestsofttool.com/SQLDBCompare/SDC_Introduction.aspx> (5 pages).

Stulski, Vitaliy, "Diagnosing Application Failures in WebLogic," WebLogic Developer's Journal, Sep. 10, 2003, Apr. 29, 2008, <http://weblogic.sys-con.com/read/42977.htm> (10 pages).

"Eclipse Platform Technical Overview," IBM Corp. and the Eclipse Foundation, Dec. 2005 (23 pages).

De Lucia, A. et al., "Migrating Legacy Systems Towards Object Oriented Platforms," IEEE, 1997, pp. 122-129.

Ducasse, Stephane, "Logic and Trace-based Object-Oriented Application Testing," WOOR 2004, pp. 1-11.

Tarau, Paul, "Fluents: A Refactoring of Prolog for Uniform Reflection and Interoperation with External Objects," 2000, Springer, pp. 1225-1239.

Tokuda, Lance, et al., "Evolving Object-Oriented Designs With Refactorings," Kluwer Academic Publishers, 2001, pp. 89-120.

Ajila, S., "Software Maintenance: An Approach to Impact Analysis of Objects Change," Software—Practice and Experience, vol. 25, No. 10, Oct., 1995, pp. 1155-1181.

Daou, B. et al., "Regression Testing of Database Applications," Proceedings of the 2001 ACM Symposium on Applied Computing (SAC 2001), 2001, pp. 285-290.

Deruelle, L. et al., "A Change Impact Analysis Approach for CORBA-Based Federated Databases," Database and Expert Systems Applications (DEXA), LNCS vol. 1873, 2000, pp. 949-958.

Deruelle, L. et al., "Local and Federated Database Schemas Evolution—An Impact Propagation Model," Database and Expert Systems Applications (DEXA), LNCS vol. 1677, 1999, pp. 902-911.

Ren, X. et al., "Chianti: A Change Impact Analysis Tool for Java Programs," Proceedings of the 27th International Conference on Software Engineering (ICSE'05), May 15-21, 2005, pp. 664-665.

Ryder, B.G. et al, "Change Impact Analysis for Object-Oriented Programs," Proceedings of the 2001 ACM SIGPLAN-SIGSOFT Workshop on Program Analysis for Software Tools and Engineering (PASTE'01), Jun. 18-19, 2001, pp. 46-53.

Bishop, L., "Incremental Impact Analysis for Object-Oriented Software," M.S. Thesis, Iowa State University, 2004 (69 pages).

de Boer, F.S. et al., "Change Impact Analysis of Enterprise Architectures," Proceedings of the 2005 International Conference on Information Reuse and Integration (IRI-2005), Aug., 2005 (5 pages).

Ibrahim, S. et al., "Integrating Software Traceability for Change Impact Analysis," International Arab Journal of Information Technology, vol. 2, No. 4, Oct. 2005, pp. 301-308.

* cited by examiner

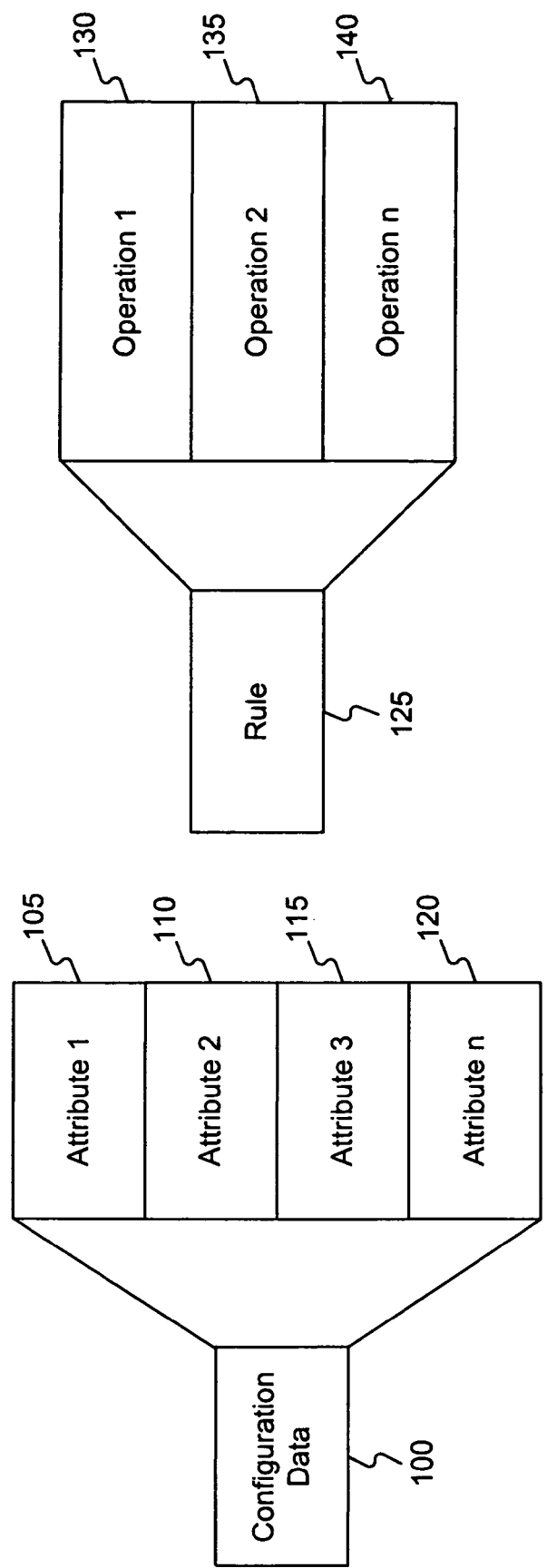

Business Application
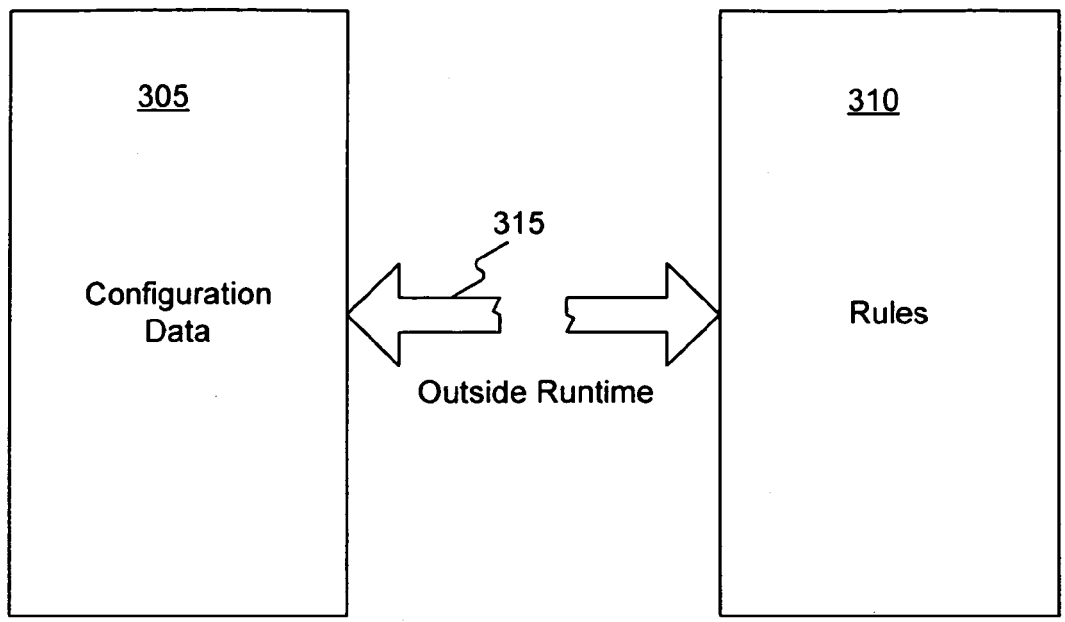
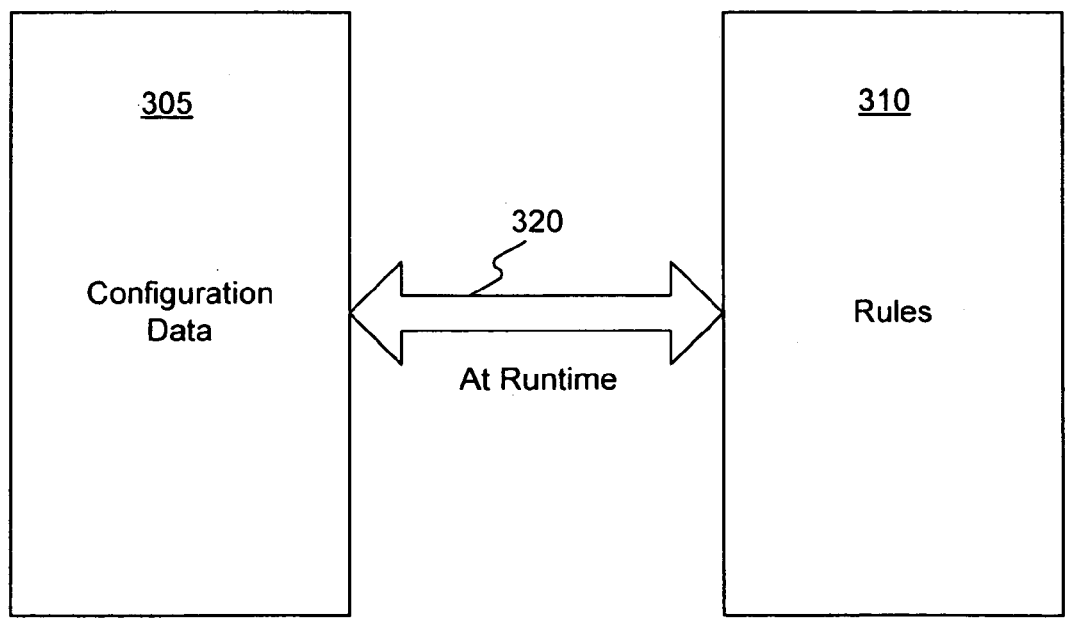
FIGURE 3A

```
1   package wagetypes
2   /* Start Attribute Section - DO NOT DELETE
3   @depreciated ("Does not exist in the R3 system")
4   @name ("/123-"cumulated EEP")
5   @virtualgroups ("Cumulation: Technical")
6   End Attribute Section */
7   /** /123 - Cumulated EEP */
8   public final class WageType_s123 extends WageType (
9       public final static String id = "/123";
10
11      public WageType_s123() (super();)
12      public WageType_s123 (Wage Type wagetype) (super(wagetype);)
13
14      public static final class CONFIG_99991231 extends Configuration (
15          public static final String START_DATE-"19010101".
16          public static final String END_DATE-"99991231";
17
18          public static final char ProcessingClass03 = processingclasses.ProcessingClass03.Value0;
19          public static final char ProcessingClass04 = processingclasses.ProcessingClass04.Value0;
20          public static final char ProcessingClass05 = processingclasses.ProcessingClass05.Value0;
21          public static final char ProcessingClass06 = processingclasses.ProcessingClass06.Value0;
22          public static final char ProcessingClass10 = processingclasses.ProcessingClass10.Value0;
23          public static final char ProcessingClass20 = processingclasses.ProcessingClass20.Value7;
24          public static final char ProcessingClass22 = processingclasses.ProcessingClass22.Value_w;
25          public static final char ProcessingClass30 = processingclasses.ProcessingClass30.ValueT;
26          public static final char ProcessingClass31 = processingclasses.ProcessingClass31.Value0;
27          public static final char ProcessingClass32 = processingclasses.ProcessingClass32.Value0;
28
29          public static final String EvaluationClass02 = evaluationclasses.EvaluationClass02.Value00;
30      )
31
32  )
```

FIGURE 7A

Characteristics Operation Payroll ADDWT

| Pars.calc.rules | | | | |
|---|---|---|---|---|
| Rule | Where found | | | |
| &&12 | 1 **** *> | ZERO= N | RTE= BWGRL | ADDWT "HOURLY RATE FROM I 0554 |
| | 2 **** *> | ZERO= N | RTE= BWGRL | ADDWT "HOURLY RATE FROM I 0554 |
| | 3 **** *> | ZERO= N | RTE= BWGRL | ADDWT "HOURLY RATE FROM I 0554 |
| | 4 **** *> | ZERO= N | RTE= BWGRL | ADDWT "HOURLY RATE FROM I 0554 |
| &010 | 3 **** 2 | ADDWT * | ELIMI N | ZERO= N ADDWT /002 |
| | 3 **** 3 | ADDWT * | ELIMI N | ZERO= N ADDWT /001 ADDWT /002 |
| | 4 **** 0 | ADDWT * | ELIMI N | ZERO= N ADDWT /001 |
| | 4 **** 1 | ADDWT * | ELIMI N N | ZERO= N N ADDWT /002 |
| | 4 **** 2 | ADDWT * | ELIMI N | ZERO= N ADDWT /001 ADDWT /002 |
| | 4 **** 3 | ADDWT * | ELIMI N | ZERO= N ADDWT /001 |
| | 9 **** 0 | ADDWT * | ELIMI N | ZERO= N ADDWT /002 |
| | 9 **** 1 | ADDWT * | ELIMI N N | ZERO= N N ADDWT /001 ADDWT /002 |
| | 9 **** 2 | ADDWT * | ELIMI N | ZERO= N ADDWT /001 |
| | 9 **** 3 | ADDWT * | ELIMI N | ZERO= N ADDWT /001 |
| | * **** 0 | ADDWT * | ELIMI N | ZERO= N ADDWT /001 ADDWT /002 |
| | 1 **** 1 | ADDWT * | ELIMI N | ZERO= N ADDWT /001 |
| | 1 **** 2 | ADDWT * | ELIMI N N | ZERO= N N ADDWT /002 |
| | 1 **** 3 | ADDWT * | ELIMI N | ZERO= N ADDWT /001 ADDWT /002 |
| | 2 **** 0 | ADDWT * | ELIMI N | ZERO= N ADDWT /001 |
| | 2 **** 1 | ADDWT * | ELIMI N N | ZERO= N N ADDWT /002 |
| | 2 **** 2 | ADDWT * | ELIMI N | ZERO= N ADDWT /001 ADDWT /002 |
| | 3 **** 0 | ADDWT * | ELIMI N | ZERO= N ADDWT /002 |

Search

| | Search Wage Type | Search Function | Search Operation |
|---|---|---|---|
| ☑ Wage Type Name | equals ▶ | /844 | |
| ☑ Number | greater than ▶ | 25 | |
| ☑ Rate | equals to ▶ | 0 | |
| ☐ Rate currency | equals ▷ | | |
| ☐ Amount | equals to ▷ | | |
| ☐ Amount currency | equals ▷ | | |

Search    Cancel

FIG. 63

METHODS AND SYSTEMS FOR DATA-FOCUSED DEBUGGING AND TRACING CAPABILITIES

RELATED APPLICATION

This application is a continuation-in-part of U.S. patent application Ser. No. 11/111,794, entitled "Systems and Methods for Modeling and Manipulating a Table-Driven Business Application in an Object-Oriented Environment," filed Apr. 22, 2005, which is incorporated herein by reference.

BACKGROUND

1. Relevant Field

The present inventions generally relate to business application software. More particularly, the inventions relate to systems, methods and computer readable media for modeling of business applications and the use of a model to create, improve, and maintain a business application.

2. Background Information

One drawback with legacy business application systems stems from how business data and rules are often contained in physically separate table data structures, with little user-friendly representation of the organization or relationships of those structures. Such table-driven systems are difficult to work with. For example, a business object may be defined across ten or more different database tables that are not easily accessed, displayed, or understood together.

Furthermore, as shown in the example of FIG. 3A, a table-driven business application typically stores its configuration data 305 and its rules 310 in multiple, physically separate tables. Considered statically, there is no obvious or easily determined relationship or connection 315 between configuration data 305 and rules 310. At runtime, however, configuration data 305 and rules 310 interrelate 320 because the configuration data 305 and the rules 310 affect each other. For example, some configuration data 305, may affect the execution of rules 310. The physical separation between related data and between data and rules, the lack of static indications of runtime interactions between data and rules, and other factors make the data and processes of a business application difficult to understand, difficult to create, difficult to debug, and difficult to modify without causing unexpected effects.

In view of the foregoing, it is desirable to take business application structures and translate them into user-friendly objects that can be more easily understood, manipulated, debugged, designed, redesigned, analyzed, and/or modified.

SUMMARY

Consistent with embodiments of the present inventions, systems and methods are disclosed for presenting business application execution information. Embodiments and methods consistent with the invention execute the business application; create an execution log containing information regarding operations and data of the business application in execution sequence order; identify a set of objects used by the business application; organize the information in the execution log according to the set of objects; and present the organized information according to the set of objects.

It is to be understood that both the foregoing general description and the following detailed description are exemplary and explanatory only, and should not be considered restrictive of the scope of the invention, as described and claimed. Further, features and/or variations may be provided in addition to those set forth herein. For example, embodiments of the invention may be directed to various combinations and sub-combinations of the features described in the detailed description.

BRIEF DESCRIPTION OF THE DRAWINGS

The accompanying drawings, which are incorporated in and constitute a part of this disclosure, illustrate various embodiments and aspects of the present invention. In the drawings:

FIGS. 1 to 3B illustrate exemplary business structures of a business application;

FIG. 7A illustrate an exemplary processes consistent with the present invention;

FIGS. 17 to 67 illustrate exemplary user interface displays consistent with the present invention.

DETAILED DESCRIPTION

Figure 2A:
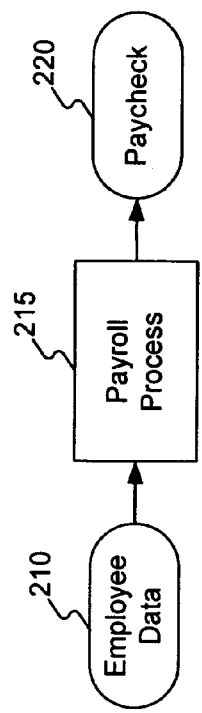

The following detailed description refers to the accompanying drawings. Wherever possible, the same reference numbers are used in the drawings and the following description to refer to the same or similar parts. While several exemplary embodiments and features of the invention are described herein, modifications, adaptations and other implementations are possible, without departing from the spirit and scope of the invention. For example, substitutions, additions or modifications may be made to the components illustrated in the drawings, and the exemplary methods described herein may be modified by substituting, reordering, or adding steps to the disclosed methods. Accordingly, the following detailed description does not limit the invention. Instead, the proper scope of the invention is defined by the appended claims.

Overview

Systems and methods consistent with the invention generally relate to business application software. Exemplary business applications include those offered by SAP, built around the SAP R/3™ (hereinafter referred to as "R/3") system. These business applications may provide the capability to manage financial asset and cost accounting, as well as production operations and materials, personnel, plants, and archived documents. The R/3 system runs on a number of platforms including WINDOWS 2000™ and uses the client/server model. The R/3 system is a comprehensive set of integrated business applications. R/3 provides the ability to store, retrieve, analyze, and process corporate data used for financial analysis, production operation, human resource management, and other business processes. At one level, an R/3 system (or other legacy business application system) may be thought of as a collection of legacy business structures or business objects held primarily in databases (as tables) that are manipulated by business processes or workflows.

For example, as shown in FIG. 1A, an exemplary business structure includes configuration data 100, which may be one or more business data objects containing data used by a business process. Configuration data 100 may include several data fields called attributes, such as "attribute 1" 105 through "attribute n" 120. For example, configuration data 100 may include data such as an employee's name, an hourly wage rate, and indicators for directing processing of data for the employee. Exemplary business structures also include business rules, such as rule 125, which are typically made up of multiple operations, such as "operation 1" 130 through "operation n" 140. Rule 125 may reflect a series of operations that when executed will, for example, cease deducting social security payments after an employee's cumulative salary reaches a specified amount.

In systems such as R/3, configuration data and rules control the business application software. As shown in FIG. 2A, in an exemplary payroll processing business application, the business structures may include a wagetype 200, which may be a business data object containing configuration data used to configure portions of a paycheck. For payroll processing purposes, each employee may have associated with him or her one or more wagetype structures containing data about the employee that is used to perform the payroll functions. For example, an employee may have a wagetype for hourly rate, a wagetype for union fees, a wagetype for deductions, etc. Each wagetype may include one or more attributes 205 that act as configuration elements, shown as attributes A-H. The attributes themselves may be of different types. For example, as shown, attributes A-C may be processing class attributes, which control the processing path used by the business application when performing processing (rules) for the employee. Attributes D-F may be cumulation attributes, which identify wage types that relate to one another and are processed together in some instances. Attributes G and H may be evaluation class attributes, which control processing paths like processing class attributes, but for different rules. A wage type 200 may include other types of attributes 205, as well.

Figure 2B:
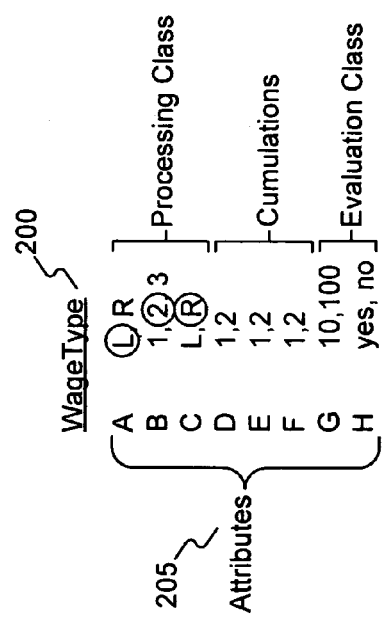

As shown in FIG. 2B, as one of its functions, an exemplary payroll processing application 215 takes employee data 210 as input and produces a paycheck 220 as output. At runtime, each employee record is processed based on the employee's data 210 to produce the employee's paycheck 220.

Figure 2C:
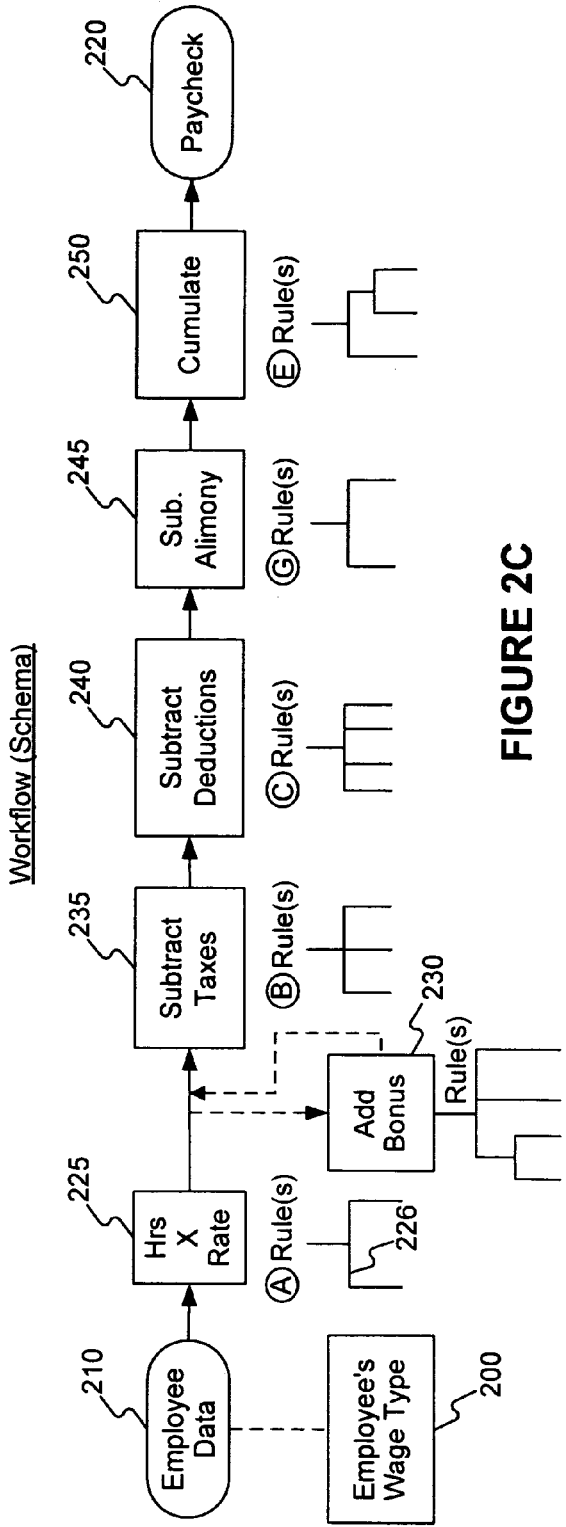

FIG. 2C illustrates the exemplary process of FIG. 2B in greater detail. As shown in this example, employee data 210 is contained in the employee's wagetype(s) 200 or in one or more similarly organized data structures. These data structures contain the data used by, and to control, process 215 that calculates and produces a paycheck 220.

More specifically, employee data 210 from the employee wage type 200 may be used by a workflow or schema that implements payroll process 215. In the example shown, the first function of payroll process 215 may be the "HRS× RATE" function 225, which may multiply the employee's hours worked by the employee's hourly wage rate. The data specifying the hours and hourly rate may be derived from the employee's wage type 200. As shown in this example, information regarding how to perform the "HRS×RATE" function 225 is specified by a rule(s) 226 (rule "A" in FIG. 2C) associated with function 225. The functioning of the rule(s) 226, and thus the functioning of the "HRS×RATE" function 225, may be affected by attributes 205 contained in the employee's wage type 200. For example, as shown in FIG. 2A, a processing class attribute 205, such as attribute A, may have "L" selected for this employee and "R" unselected. Selecting "L" may cause rule(s) 226 associated with the "HRS×RATE" function 225 to calculate the product in a different manner than if "R" were selected for attribute A. For example, "L" may cause the hourly rate to increase by 1.5 for hours greater than 40, such that the employee gets paid time and a half for overtime beyond 40 hours, while "R" would not use an hourly rate increase, for an employee who is not eligible for increased overtime pay.

As shown in FIG. 2C, the next function to be performed in the workflow may be either the "ADD BONUS" function 230 or the "SUBTRACT TAXES" function 235. Typically, data from the employee's wage type 200 will indicate whether the employee is to receive a bonus and control the workflow to determine which of the two functions is performed next. As explained with respect to the "HRS×RATE" function 225, the rules associated with the "ADD BONUS" function 230 or the "SUBTRACT TAXES" function 235 (rules "B" and "C," respectively, of FIG. 2C) determine how those functions are performed, and attributes 205 from the employee's wage type 200 may affect the functioning of the rules.

Similarly, the "SUBTRACT DEDUCTIONS" function 240, "SUBTRACT ALIMONY" function 245, and "CUMULATE" function 250 are performed as the illustrated workflow progresses, and the rules associated with each function may be similarly affected by the corresponding attributes 205 in the employee's wage type 200. As shown in FIG. 2C, rules "D," "E," and "F" correspond to functions 240, 245, and 250, respectively. After all the workflow functions are completed, the payroll process shown produces a paycheck 220 for the employee reflecting the results of the operations carried out by the various functions.

Other business applications, such as financial applications, asset accounting applications, cost accounting applications, production operations applications, etc., use business structures and workflows comparable to the payroll processing application illustrated in FIGS. 2A-2C.

Figure 3B:
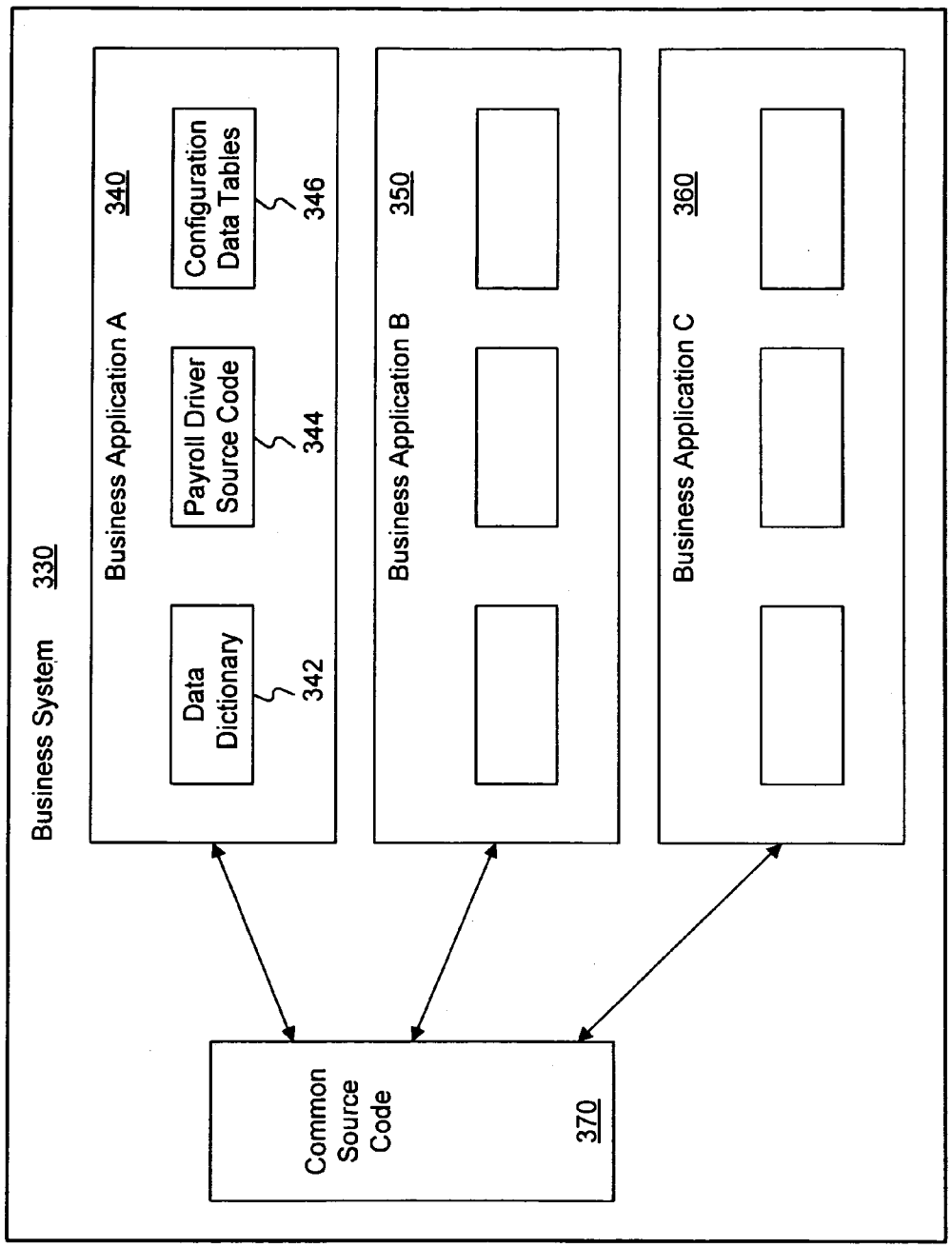

FIG. 3B illustrates an exemplary business system architecture to which embodiments of the invention may be applied. As shown, a business system 330, such as an SAP R/3 system, may include several business applications, such as business application A 340, business application B 350, and business application C 360. A business application, may be, for example, a payroll application that calculates the payroll for a company, generates paychecks or payslips for each employee, etc.; a human resources application that manages employee data, adds new employee records, deactivates retired employee records, etc.; or some other type of business application.

A typical legacy business application, such as a payroll application exemplified in this example by business application A 340, is table-driven. In other words, the data which controls execution of the application is contained in database tables. The application is designed to read and traverse the tables and execute business functions or processes according to the contents of the database tables. Multiple applications run on the same physical hardware and from data contained in the same relational database(s).

At a high level, payroll business application A 340 may be thought of as consisting of basically three major logical parts: (1) a data dictionary 342 that describes all the tables related to the application, (in this case payroll), (2) source code 344 that is the driver of the business processes within the business application, and (3) configuration data 346 that control the operation of the business processes within the business application. Each application in business system 330, such as business application B 350 and business application C 360, typically has its own data dictionary, source code, and configuration data. Configuration data is typically very application specific, while some data dictionary business objects and some source code may be shared among business applications.

Data dictionary 342 contains information about the business that is used by the business application, such as information about the employees used by the payroll application, for example, information regarding when a new employee joined the company. Configuration data 346 contains information controlling the operation of business application A 340 and is typically stored in database tables accessible to users who can customize the payroll application for their business needs by modifying configuration data 346. Some embodiments consistent with the invention focus on modeling configuration data 346, which controls the operation of business application source code 344, such as the payroll driver.

In one embodiment, configuration data 346 may be logically modeled by several major business objects. For example, an SAP R/3 business system payroll application may be modeled as major business objects such as wagetypes, schemas, and rules. Further, major business objects may be logically modeled as containing one or more sub-objects such as processing class, evaluation class, and cumulations, for an R/3 wagetype. The configuration data in the modeled objects describes how the business application is configured for a specific user, such as a specific company.

Source code 344 represents a driver for the business processes within the business application. The application source code driver of the business application is essentially just a framework that needs the configuration data to tell it how to operate. Without the configuration data to tell it how to work, the source code cannot work meaningfully. The source code driver 344 knows how to execute any schema, which is part of configuration data 346, and a schema is required to run an application; e.g., a payroll schema is required to run a payroll business application.

Payroll driver 344 knows how to read a schema table and do what the schema table says. A schema may be considered a work flow description. For example, in an R/3 system, the business application source code, such as payroll driver source code 344, is basically designed to navigate or traverse the configuration database tables that stores a schema(s). Business application driver 344 reads the schema table row by row, takes the data out of the schema tables, and executes the rules associated with a specific function of the schema. These rules are affected by the data in the associated wagetypes. So a schema, and it's associated rules, needs a wagetype to direct it's functioning. These business objects are all interrelated.

In a table-driven business system application, such as an R/3 payroll business application, a wagetype business object (or its equivalent) may modify the functionality of a schema, and the data in the wagetype can be configured by a user or whoever configures the payroll application. For example, consider a simple schema to calculate A and calculate B. The calculate B function and calculate A function are executable by driver source code 344 running the schema. But the order of execution of function A and function B, that is, whether to calculate A and then calculate B, or calculate B and then calculate A, is determined by the schema business object in configuration source code 246, which is consulted by payroll application source code 344 when executing. A user can modify the schema business object and thus modify the configuration of business application 340. Source code may contain the executable statements implementing the algorithms of how to calculate A and how to calculate B, but the connection and the order is determined by the configuration data.

For another example, consider a rule business object that includes five calculation algorithms for a particular value. Configuration data, (e.g., in a wagetype object), may be set so that one algorithm is used for a specific group of employees at time X. At time Y, some legislation change or a union negotiation for the group of employees may take place and cause a need for a change for this particular group to switch to another calculation algorithm. To make the change, a user may modify a wagetype for this group employees in the business application by changing their processing class values so that they use another algorithm in their payroll calculations.

Common source code 370 represents code (and other business objects) that are stored in a common code base that business applications share among themselves. Consequently, in legacy business systems, including R/3, there may be no clear separation between the logical instances of execution or the logical instances of the data in a business application. Thus, when a user configures a part of a business application that is common to other applications, e.g., in common source code 370, the user may affect many different instances of objects at execution. It is very difficult to verify that the changes made to the common code are correct for each and every business application that uses it, because they all must be tested to be sure.

In addition, configuration data 346 may be changed or created that causes the unintended and/or incorrect use of objects stored in common source code 370. For example, in an SAP R/3 payroll business application, a user may configure a United States schema to use a Brazilian tax calculation function, which is accessible from common source code 370. This is not correct, however, as the Brazilian tax function will perform a different calculation than a United States tax function.

As noted above, the data structure business objects, like wagetypes, and the functional business objects, like rules, are very interconnected and changes to one will typically affect the other. For example, changing part of a payroll application data structure object, such as a wagetype or a processing class of a wagetype, will likely affect the calculations for multiple employees done by multiple rules and related to multiple other wagetypes. And vice-versa. Consequently, in the table-based and table-organized form native to business system 330, data structure business objects and functional business objects are difficult to understand, maintain, modify, debug, optimize, and correctly manipulate.

Some embodiments of systems and methods consistent with the invention represent business application objects as object-oriented programming language elements, building a model of the business application in some respects, and applying object-oriented programming language tools to the model. The model and the tools improve a user's ability to understand, maintain, modify, debug, optimize, and correctly manipulate the business application, as represented by the object-oriented programming language model.

In some embodiments consistent with the invention, anything that is related to the configuration of the business application may be considered a business object for transformation to an object-oriented programming language element(s). In one embodiment, a designer may select and define the business objects that are to be modeled as OOP objects. This selection and definition of business objects may be done using one or more different techniques, but generally the designer's goal should be to define business-application-layer objects, which are logical collections of things (data, operations, etc.)

reflecting the design and functionality of the business application, and not objects based on the implementation or data structures that implement the business application, such as data-dictionary-layer structures. A business application typically uses a relational database model, but business object definition typically should not be based on the database relationships as they usually do not coincide with the logical business functionality.

In one technique, a designer may analyze the outputs of a business application and decide that the output data structures should be business objects in the business application model. For example, running a payroll application on an SAP R/3 system produces a table of result wagetypes, making wagetypes a clear candidate for a business object to be transformed into an OOP object. Smaller data structures that are part of larger data structures, such as processing classes, cumulations, and evaluation classes that are part of a wagetype, are also obvious candidates for transforming into OOP objects.

A designer may also analyze the business application to identify business entities that are treated as logical collections of data and/or associated operations by the business application, as these are also logical candidates for definition as business objects. For example, an SAP R/3 payroll application provides user interfaces to configure wagetypes, schemas, and rules to customize the application, treating them as logical entities. Thus, wagetypes, schemas, and rules may be considered business objects for modeling by OOP language elements. Logical business entities that encompass other logical entities may be decomposed to model as objects the encompassed logical entities that comprise them, such as decomposing wagetypes into processing classes, cumulations, and evaluation classes business objects.

Figure 25:
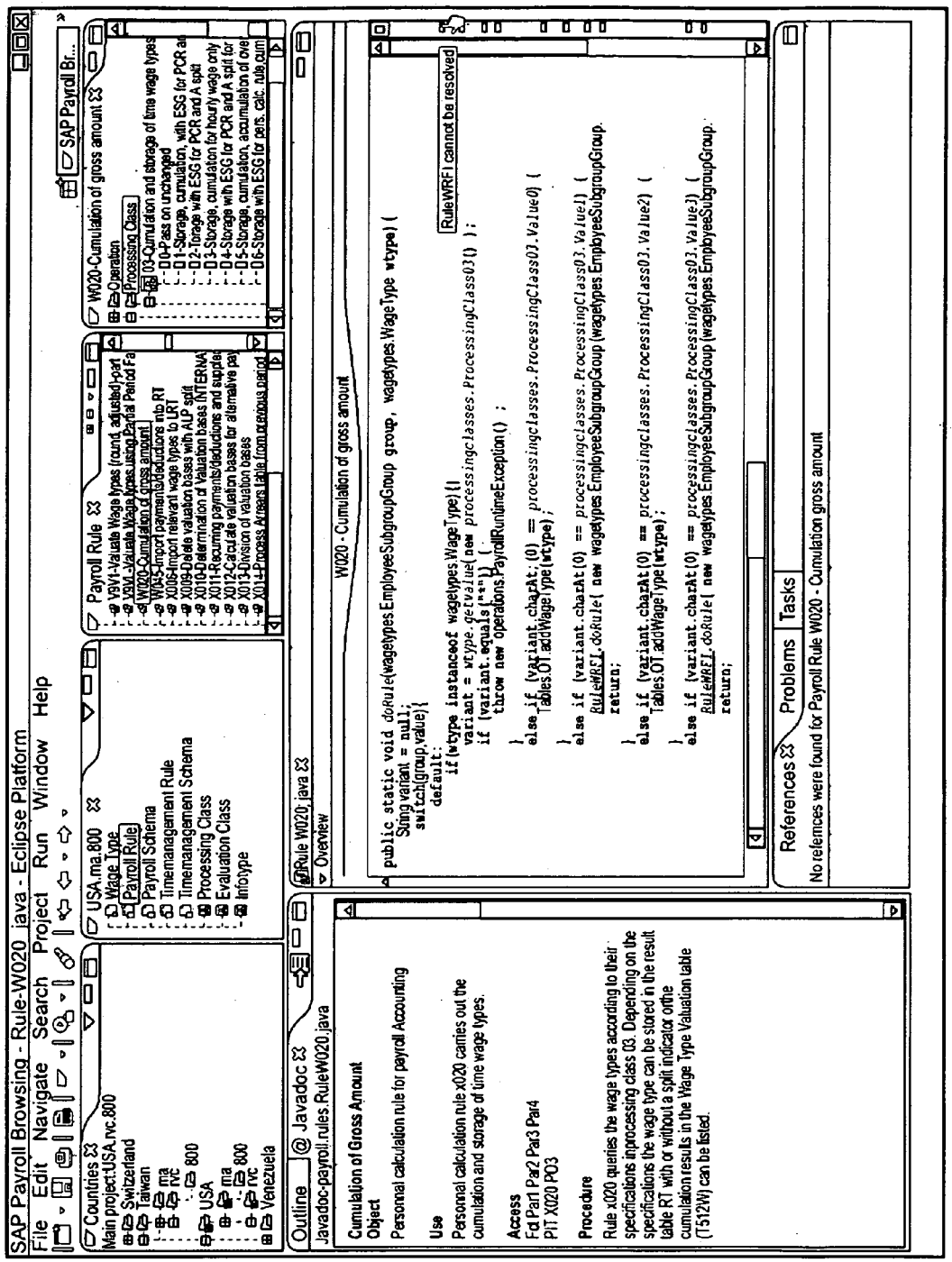

After the business objects that comprise a model of a business application are defined, embodiments of systems and methods consistent with the invention may map them to specific object-oriented objects and elements. This may be done by analyzing the attributes of a business object and transforming them into an object-oriented language element, such as a JAVA™ (hereinafter referred to as "Java™" or "Java") language element that appropriately models the business object attributes. This process involves finding a corresponding construct, structure, or other element within the destination object-oriented language to represent each important attribute, element, or relationship of the business object being transformed. For example, an object-oriented language class, such as Java™ class, may be used as a starting point to represent most business objects. Business objects that are basically data structures, such as wagetypes in an R/3 payroll application, may be represented using static OOP elements in an OOP object such as a class, for example, as shown in FIG. 7A (and explained further below). Business objects which contain executable code constructs, such as rules and schemas in an R/3 payroll application, may be represented using OOP objects having code, such as a class with methods or functions, for example, as shown in FIG. 25 (and explained below). Other object-oriented language features may also be used to model business object attributes. For example, object-oriented language superclasses and subclasses may be used to model the hierarchy and inheritancy attributes of business objects, and object-oriented language scope elements, such as public and private, may be used to model the scope attributes of business objects, etc.

This mapping process may be automated by defining a set of mapping rules used by a conversion engine to take input business object data for business objects and convert it into a corresponding object-oriented language object as described further below.

In addition to transforming business objects into corresponding object-oriented language objects, elements, etc., embodiments of systems and methods consistent with the invention may also use code-development-project-organization-tool features to model a business application. For example, as noted above, a legacy business system 330 typically shares common code and data structures 370 among business applications, so if something is changed in the common code, i.e., in the common parts, it affects every object or structure that uses that common part. One way to represent this feature of a business application in a model, such as an object-oriented model, may be to use code development project features and shared folders. For example, in many legacy table-based business systems like R/3, many business objects have a common configuration across runtime instances of the application, but each instance itself is independent, and different, at runtime. For a specific example, consider a business application used for a division of a business in Argentina and a division of the business in the United States. The application is configured using the same type of configuration tools for Argentina and the United States, but the running configurations of the application for each country are totally separate, and the same configuration objects within the context of the Argentine run of the application can mean different things than within the context of the United States run. They are like separate universes. Both universes, however, have a common foundation of business objects that are shared. These relationships and behaviors of the business application may be modeled using separate projects to hold, delimit, and manage the United States instances of the application objects and the Argentine instances of the application objects and by using shared folders to hold, delimit, and manage the common objects. Similarly, other OOP language development environment features, in addition to projects and shared folders, could also be used to model business application/business system features.

A designer modeling such aspects of a business system and business application may look at the relationships within the business system/application to identify "vertical dimensions" and "foundation" elements for projects and folders. A dimension may be thought of as an instance of all the objects involved in a process. A foundation element may be thought of as a common element that is used by many instances. So if an application uses the same structure more than once, but the data is different each time (i.e., there are many instances of the same structure), then these may be modeled as different dimensions (projects) with a common foundation (shared folder). Thus a model, such as an object-oriented model, of a business application/system organized by projects and shared folders enables demonstration and evaluation of the effects to the dimension(s) of modifying a foundation element. Put in object-oriented terms, a foundation element may perhaps be analogized to a class definition for an object, while a vertical dimension may be analogized to an instance of the class object. Each instance may be the same architecturally, yet the data in each one is different. Such analogies and may be useful to a designer modeling complex table-driven business applications and systems having shared code and data structures and building transformation rules for converting business application objects and applications into object-oriented language representations.

Systems and methods consistent with the invention analyze a business application's data, operations, and relationships and create a corresponding model, such as an object oriented programming (OOP) model, corresponding to the business application entities. In one embodiment an OOP model may be realized in the Java programming language and may include OOP objects, functions, and operators. Each OOP model accurately represents the data, relationships, and rules associated with the corresponding business entity. Once converted to an OOP model embodiment, systems and methods consistent with the invention may use standard OOP tools to understand, manipulate, design, redesign, analyze, and modify the business application. This can be done independently of the native business application system, as the OOP model is separate and independent from the business application entities. Modifications made to the OOP model may then be converted back into business application entities and installed in the native system.

Detaching Application into Offline Mode

Figure 4A:
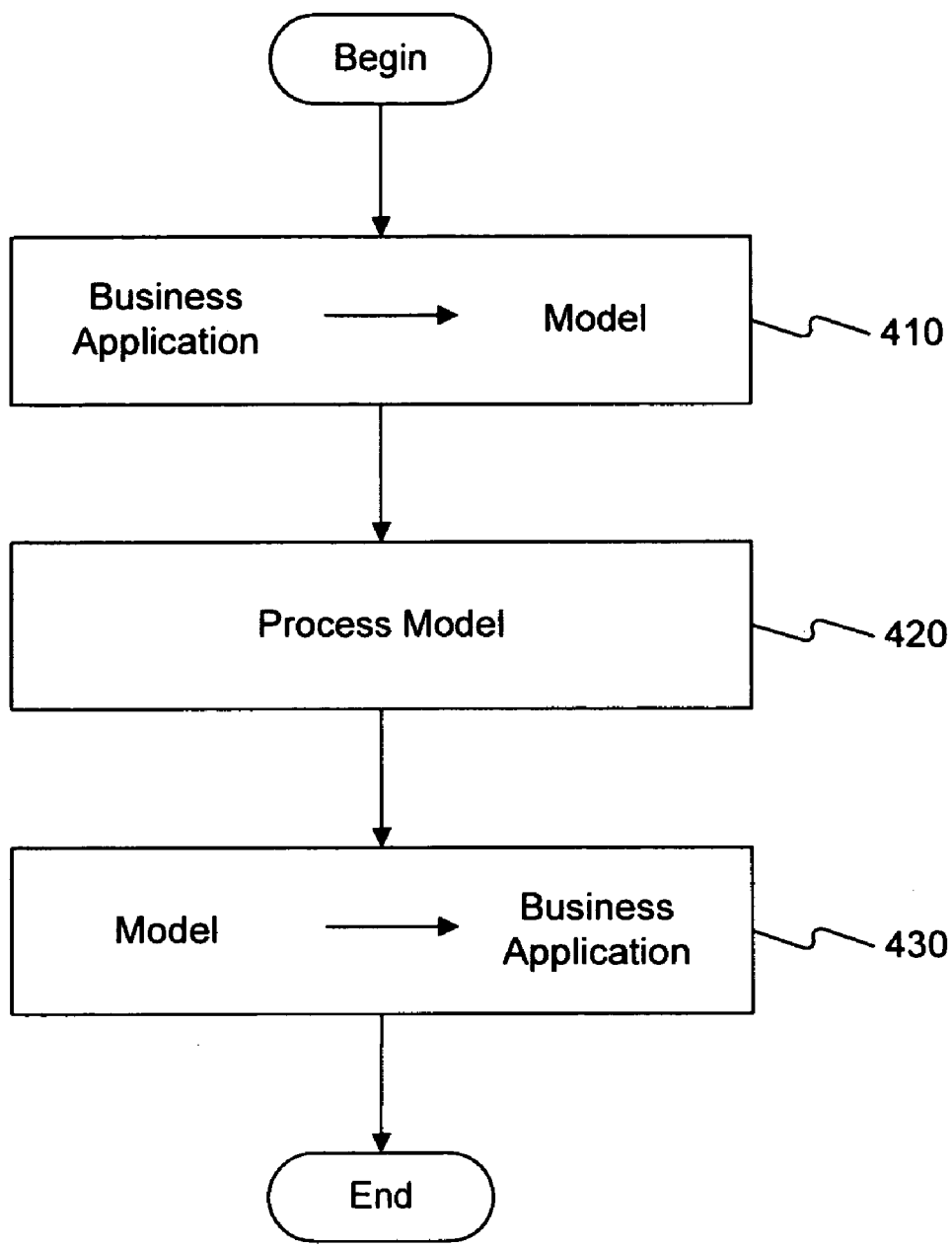
FIG. 4A illustrates a flowchart illustrating an overview of an exemplary process 400 for creating an off-line model of a business application, consistent with the present invention.

FIG. 4A illustrates a flowchart illustrating an overview of an exemplary process 400 for creating an off-line model of a business application, consistent with the present invention. The exemplary process is applied to a business application composed in a first programming format. The programming format for such business applications are often specialized programming formats unique to each particular business application and, as described above, typically have limited flexibility in how a programmer may conduct efficient programming or debugging tasks.

As shown in FIG. 4A, systems consistent with the invention may translate the business application into a model representing the business application (stage 410). More particularly, the model reflects a representation of the business application in a second programming format different than the original or first programming format of the business application. In preferred embodiments of the invention, the second programming format may be an OOP language, such as Java or C++. The process for translating the business application into a model is described in greater detail below with respect to FIGS. 5 to 8.

Once the system has generated the model of the business application, the system may then enable a user to process the model in a processing environment or platform corresponding to the second programming format (stage 420). For example, as described above, the second programming format may be an OOP language, such as Java. Systems consistent with the invention may thus enable a user to program, debug, or analyze the programming code of the model by using, for example, an OOP editor or other type of OOP processing environment or platform. Because the user may process the model, as opposed to the actual business application, the user may do so while business application is still running. Thus, systems consistent with the invention allow a user to process a business application without interfering with normal business activities.

Figure 4B:
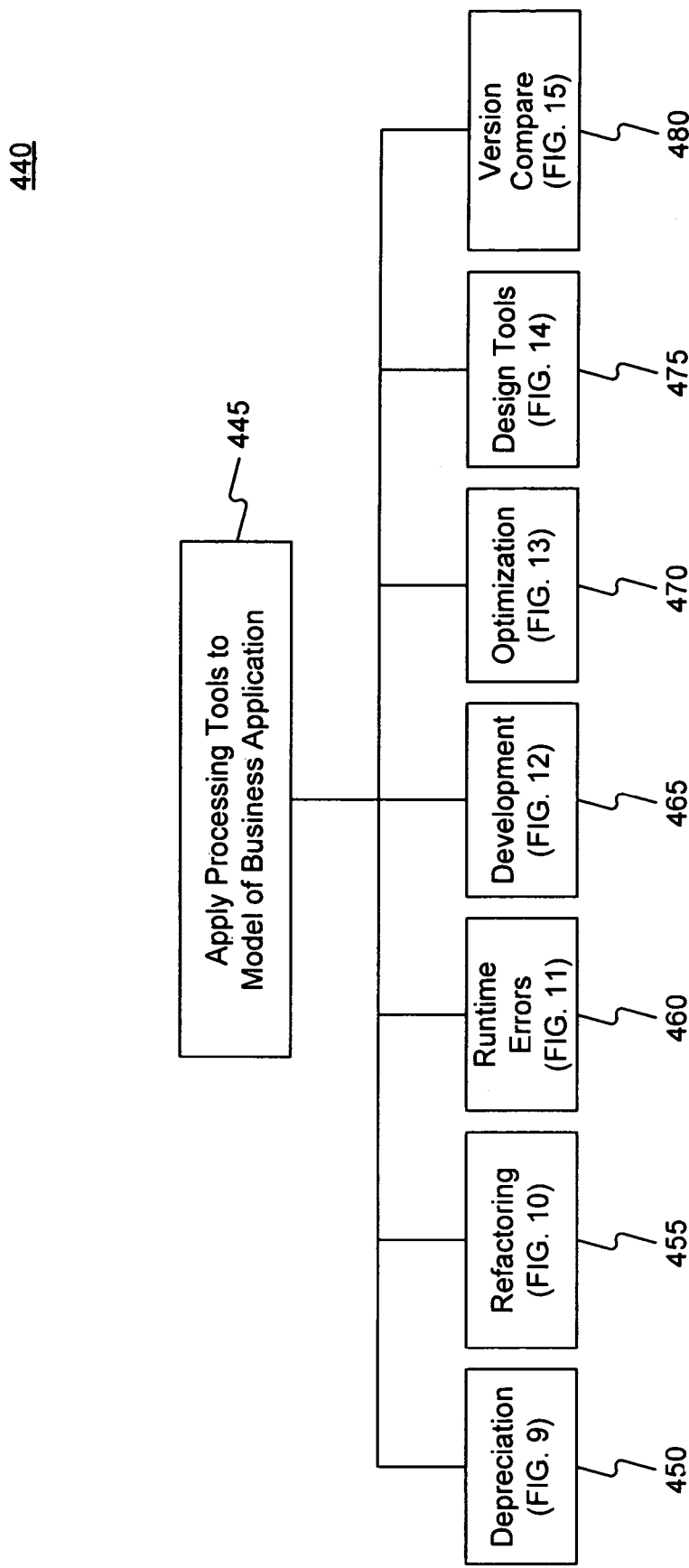
FIG. 4B is an exemplary illustration 440 of the various processing tools consistent with the invention.

Further, by taking advantage of processing tools available with such OOP processing environments, the system may enable a user to use one or more tools to process the model. FIG. 4B is an exemplary illustration 440 of the various processing tools consistent with the invention. As shown in FIG. 4B, the system may enable a user to apply the processing tools to the model of the business application (stage 445). These processing tools may include a deprecation process (stage 450), a refactoring process (stage 455), a runtime error process (stage 460), a development process (stage 465), an optimization process (stage 470), a design tools process (stage 475), and a version compare process (stage 480). These and other processing tools consistent with the invention are described in greater detail below with respect to FIGS. 9 to 15. Further, FIGS. 17 to 56 illustrate exemplary user interface screens enabling a user to process the model representing the business application.

The system may then re-translate the model representing the business application in the second programming format back to the first programming format (stage 430). As described below, systems consistent with the invention may translate the model in such a way that any modifications made to the model in the second programming format are automatically reflected in the re-translated business application composed in the first programming format. The process for re-translating the model back to the first programming format is essentially the reverse of the forward translation process described above with respect to stage 410, and as illustrated below with respect to FIGS. 5 to 8.

Figure 5:
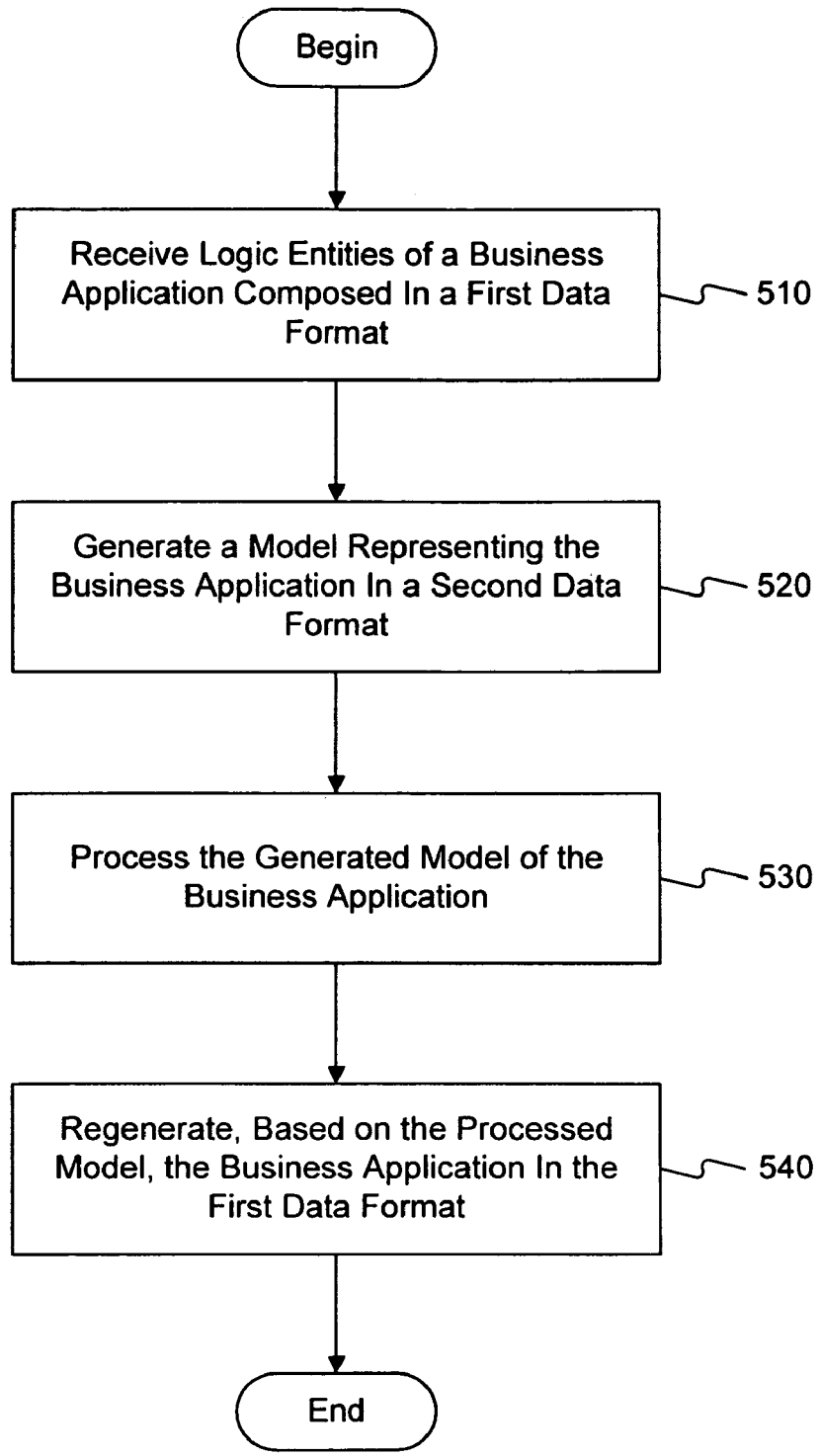
FIGS. 5, 6A, and 6B illustrate exemplary processes consistent with the present invention.

FIG. 5 illustrates the exemplary modeling process 500 of FIG. 4 in greater detail. As shown in FIG. 5, to translate the business application into the second programming format, the system receives the logic entities of the business application composed in the first programming format (stage 510). As described above with respect to FIG. 1, these logic entities may be the business data structures (e.g., configuration data 100 and business rules 125) of the business application. Based on the received logic entities of the business application, the system may then generate a model representing the business application in the second programming format (stage 520). As also describe above, the second programming format may be, for example, an OOP language such as C++ or Java. The system may then, as described above with respect to FIG. 4, process the generated model of the business application (stage 530). The system may then re-translate the processed model to regenerate the business application in the first programming format (stage 540).

Generating a Model of a Business Application

Figure 6A:
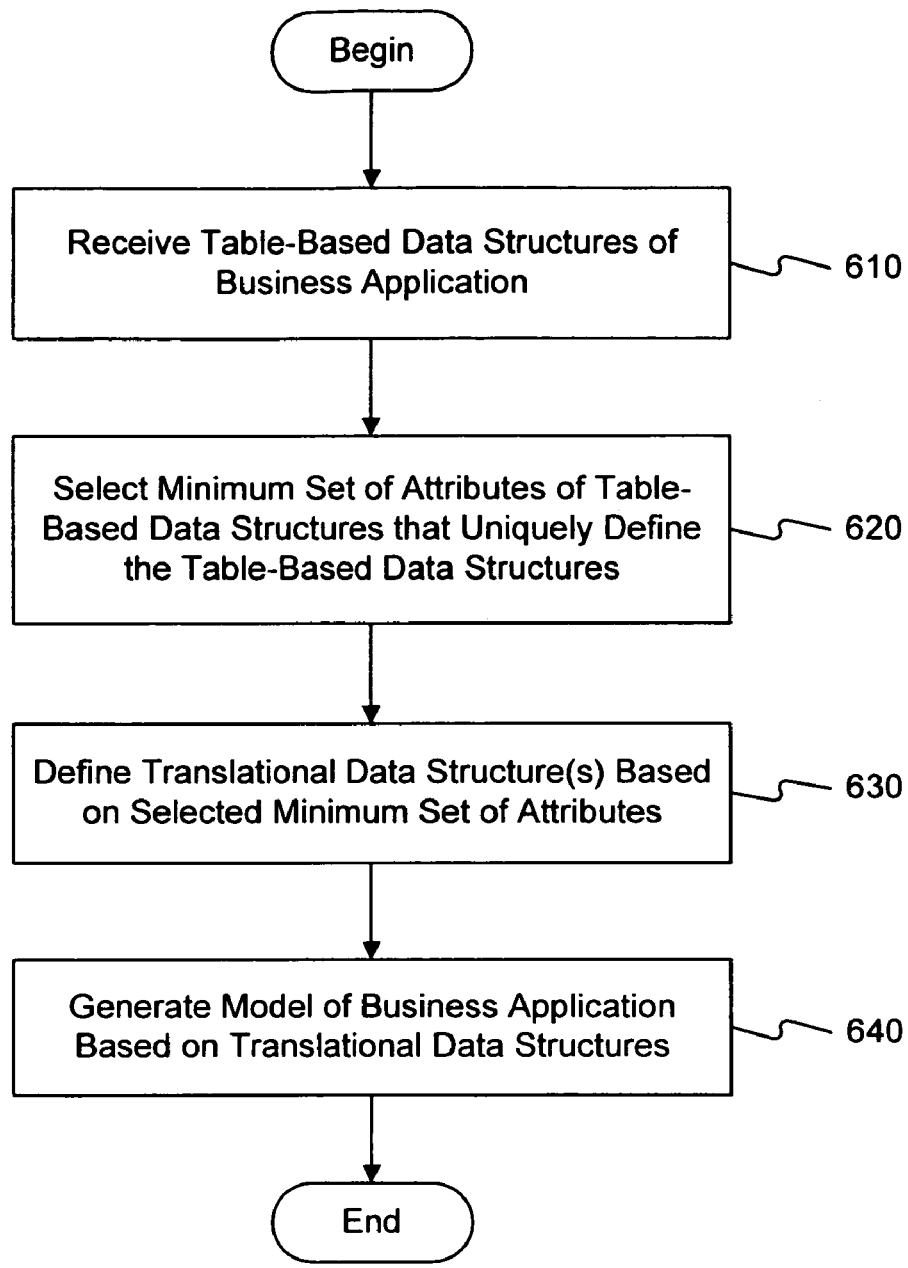

FIG. 6A illustrates an exemplary process 600, consistent with the invention, for translating the business application into a model composed in the second programming format. As shown in FIG. 6A, the system may receive the data structures, which may be table-based data structures, of the business application (stage 610). In this regard, the system may scan the business application to identify the table-based data structures, which may be any group or segment of data reflecting data stored in a table-based format of the business application. The table-based data structures may, for example, correspond to the configuration data and rules of the business application. Further, each table-based data structure may include attributes of the data stored in the respective table-based data structure. For instance, as explained above with respect to FIG. 1, a table-based data structure may include configuration data 100 having attributes 105 to 120 or a rule 125 having operation attributes 130 to 140.

The system may then select the minimum set of attributes of table-based data structures that uniquely define the table-based data structures (stage 620). To this end, the system may first identify those attributes of, for example, the configuration data (e.g., attributes 105 to 120) and any rules (e.g., operation attributes 130 to 140). The system may then identify those attributes that are common to each table-based data structure. From the identified common attributes, the system may then select the least number of these common attributes that uniquely defines each translational data structure.

Based on the selected minimum set of attributes, the system may then define one or more translational data structure(s) (stage 630). In systems consistent with the invention, a translational data structure may be an identified data or business structure of the business application that is converted into an object-oriented structure. For example, in an R/3 payroll application, the minimum set of attributes may include a geographic attribute (e.g., "New Zealand"), a version reference attribute (e.g., "rna"), and a client reference attribute (e.g., "800"). The corresponding translational data structure may thus be defined as NewZealand.rna.800. In OOP terms, the defined translational data structures may include at least one translational data structure that respectively corresponds to a project, an object, and an object instance. The system may then generate the model of the business application based on the defined translational data structures (stage 640).

Figure 6B:
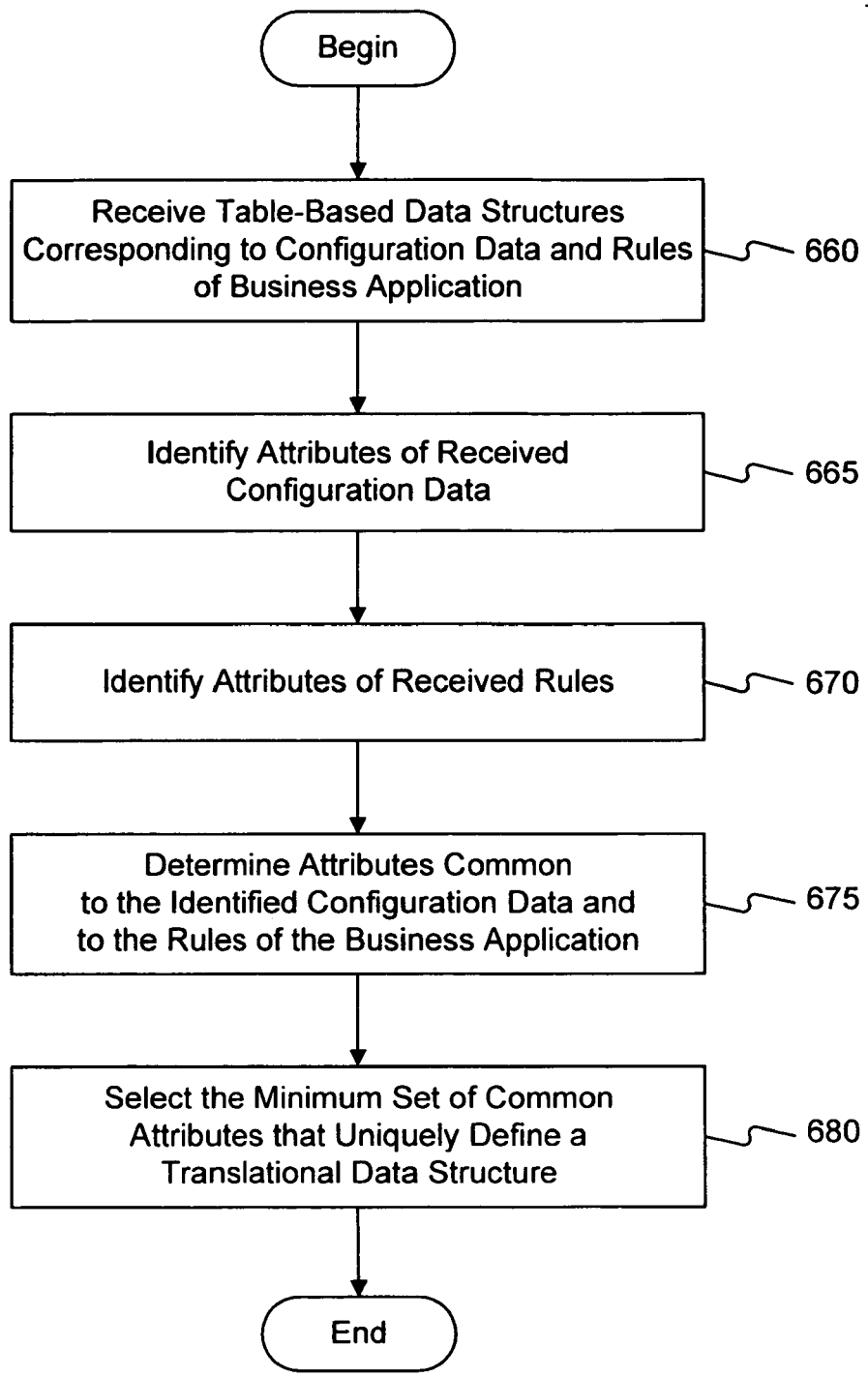

FIG. 6B illustrates an exemplary process 650 further describing the processing stages of FIG. 6A. As shown in FIG. 6B, the system may receive table-based data structures corresponding to configuration data and rules of business application (stage 660). The system may then identify the attributes of received configuration data (stage 665) and identify the attributes of received rules (stage 670). The system may then determine those attributes common to the identified configuration data and to the rules of the business application (stage 675). From these common attributes, the system may then select the minimum set of common attributes that uniquely define a translational data structure (stage 680).

As noted above, methods and systems consistent with the invention may transform business application logic entities or structures into OOP structures that represent the data, relationships, and operations of the business application structures. In one embodiment, the business application structures are transformed at the application level, including consideration of application logic, as opposed to the database table level. Thus, a complex business structure comprising ten or more related database tables, such as a wagetype in an SAP R/3 payroll processing application, may be transformed into a single OOP structure, such as a Java class, that encompasses all the information in the ten or more related database tables.

In some embodiments consistent with the invention, business structures are transformed into a hierarchical object-oriented class structure. For example, as described above, all the related business structures in a business application may be analyzed to identify common elements or attributes, and transformation involves defining an OOP superclass that represents the common elements. Then, specific business structures are analyzed to identify their unique elements, and each specific business structure is transformed into an OOP structure by defining subclass instances of the superclass, which add representations of the unique elements of each specific business structure to the superclass. This exposes the hierarchy of the business structures to a user or administer viewing the OOP structures, and allows manipulation of the OOP representations of the business structures by OOP design and development tools. In one embodiment, included in the transformation to OOP subclasses is extraction of the data from the business structure for inclusion in the subclass. Thus, the values of various fields are also exposed to users and OOP tools.

Processes consistent with the invention for generating a model, e.g., an OOP model, of a business application are described in further detail below with respect to FIGS. 7 and 8. FIG. 7A, for example, illustrates an exemplary OOP structure consistent with the invention. Referring briefly back to FIG. 2A, recall the example of a wagetype business structure 200 from a payroll application of an SAP R/3 system, which may have several attributes 205, such as several processing class attributes. An implementation consistent with the invention may transform the data from a specific wagetype business structure 200, for example the wagetype structure known as "/123, " into an OOP structure such as a subclass that extends a "wagetype" superclass as shown in FIG. 7A. The transformation process creates a valid OOP language name "wagetype_s123" 792 based on the business structure name "/123" and declares it as a subclass of the superclass wagetype 794. The OOP structure corresponding to business application wagetype /123 contains and models the data and relationships 796 of the business application wagetype /123 extracted from the database tables of the business application. In the example shown, included in the OOP structure are code lines that model the processing class attributes 798 of the business application structure wagetype /123. Also included in the example shown is documentation 795 related to the business application structure wagetype /123, which may be used and displayed by OOP tools such as JavaDoc™.

In some embodiments, transformation may be based on a set of rules mapping or defining what OOP structure may create or define each business structure encountered in the business application. In one embodiment, the set of transformation rules may be defined manually. The rules for translating a business application structure into an OOP structure may create syntactically correct OOP structures (e.g., in Java™ code) useful for processing at the business application level. For example, one transformation rule for mapping various business structures into OOP structures may be to group them according to whether they share operations that can be performed on them. Another rule may be to create a subclass for each different time period attribute of a business structure based on start date and end date value of the time period attribute. Another rule may be to, within a subclass, define each business structure configuration element, such as processing class attribute, as an OOP operation in that class. Yet other rules may define when to use a public, private, or shared OOP class attributes to determine the scope and visibility of each OOP structure. Yet another rule may be to take each business structure as defined by the business application and create a corresponding OOP structure, effecting a one-to-one conversion mapping.

Figure 7B:
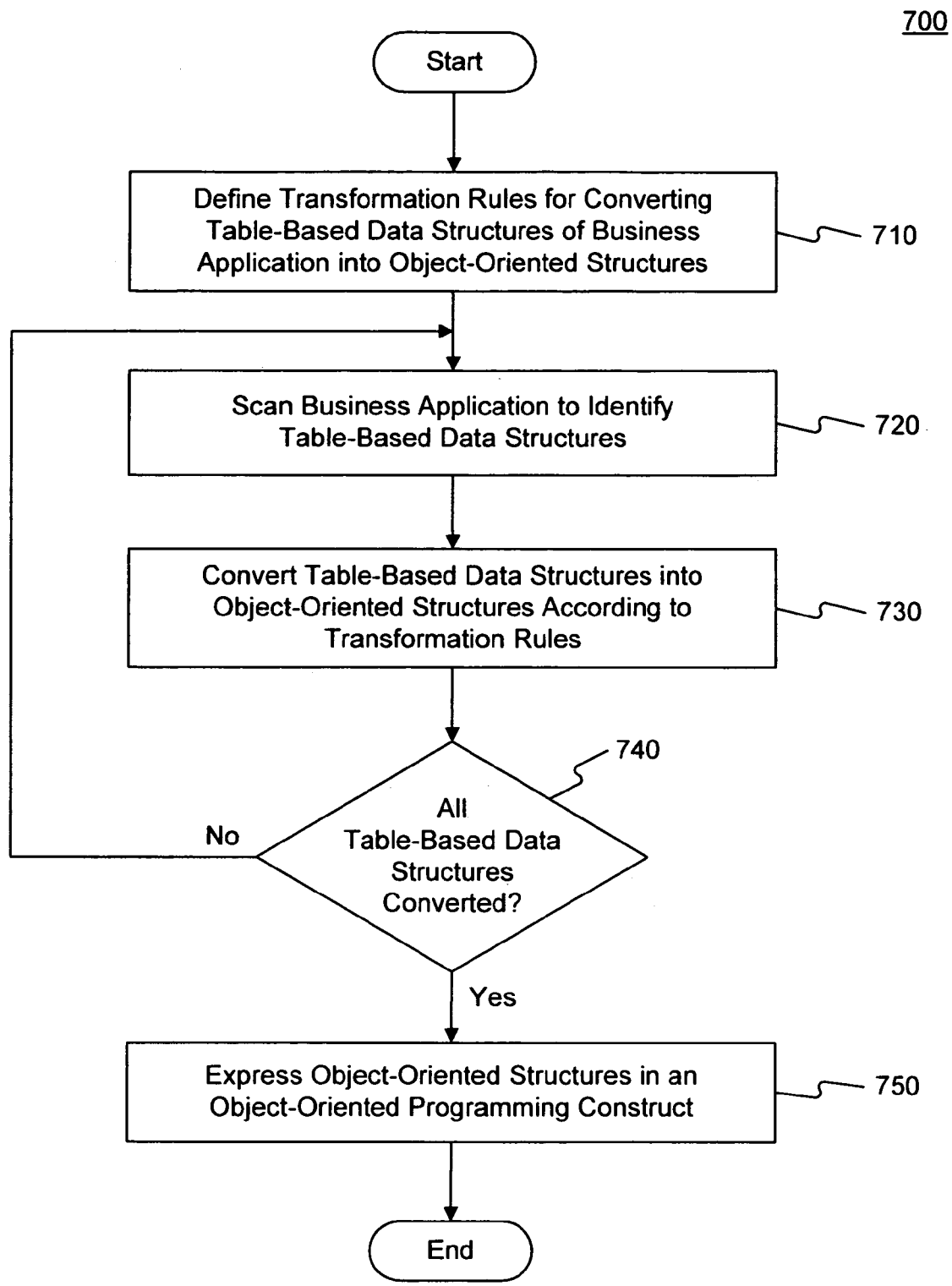
FIG. 7B illustrates an exemplary OOP structure consistent with the invention.

FIG. 7B illustrates an exemplary process consistent with the invention for translating, for example, configuration data. As shown, the process begins by defining transformation rules for converting table-based data structures of a business application into structures (stage 710). Next, the process scans the business application to identify a table-based data structure (stage 720). Next, the process converts the identified table-based data structure into an object-oriented structure, according to the transformation rules (stage 730).

The process then determines whether all the table-based data structures in the business application have been converted into structures (stage 740). If not (stage 740, No), the process loops up and continues to identify and convert. If so (stage 740, Yes), then the process expresses the structures in an object-oriented programming construct, such as an OOP class (e.g., a Java™ class) that represents the table-based data structure.

Figure 7C:
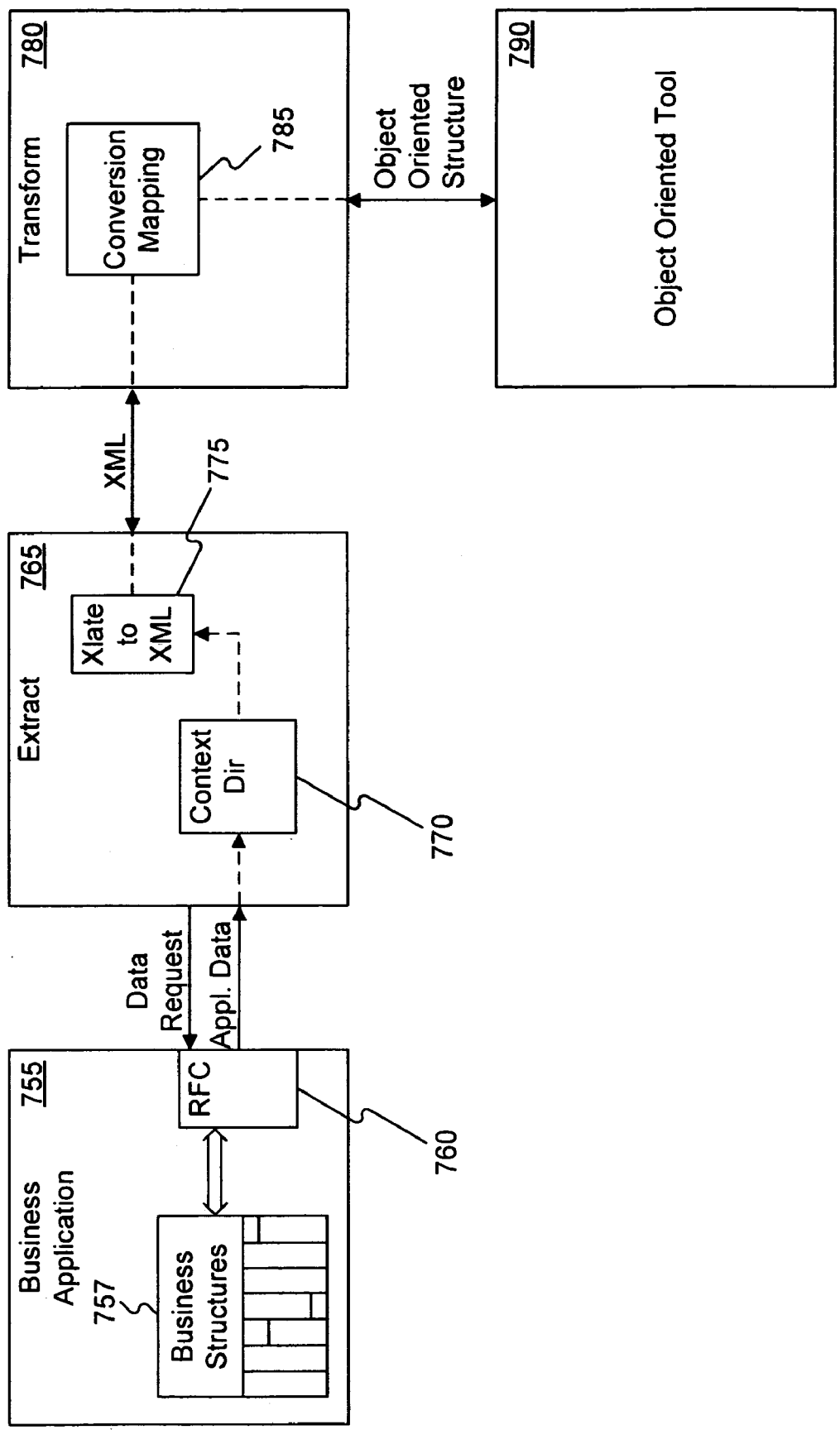
FIG. 7C illustrates a block diagram of an exemplary architecture consistent with an embodiment of the invention.

FIG. 7C is a block diagram of an exemplary architecture, consistent with an embodiment of the invention, for transforming a business application. As shown, a business application 755, such as the Payroll application in an SAP R/3 system, includes business application structures 757, which are logical entities embodied in various database tables or other data formats. In one embodiment, business application 755 is a preexisting application (such as the an application in an SAP R/3 system) that has been modified by adding remote function calls 760 that retrieve business application structures at the request of an outside application.

In the embodiment shown, extract module 765 implements a process that retrieves business application structure data from the business application and readies the data for transformation into an object-oriented structure. For example, extract module 765 may send a data request via remote function call 760 to business application 755 and receive, in response, all the appropriate application data about a business structure 757, including context data about business structure 757. The application data from business application 755 may also include information about the data, e.g., documentation describing the data. In the embodiment shown, extract module 765 maintains a context directory 770 containing information regarding what context is needed for each activity and a translation module 775 that translates the business application data into XML, or a similar markup language.

Transform module 780 receives the XML-formatted business application data from extract module 765. Transform module 780 contains an embedded conversion mapping component 785 that is used in transforming the XML-formatted business application data into an object-oriented structure. Conversion mapping component 785 includes transformation rules, as described above. For example, a business application structure logic entity, such as a "standard deduction" application structure (which may consist, in business application 755, of a number of physical database tables containing various content data), may be mapped with a conversion algorithm into a Java™ class or a set of Java classes. In one embodiment, the name of the resulting object-oriented structure may typically correspond to the name of the logic entity from business application 755. For example, the model representing business application 755 may include a "standard deduction" Java™ class, and instances of the class representing each type of standard deduction in business application 755. Documentation information describing the business application structure from business application 755 may be transformed into comments, such as Java™ language source code comments, or the like and associated with the OOP construct created to represent the business application structure.

Transform module 780 provides the object-oriented structure representing a business application structure to an object-oriented language tool 790, such as a Java™ integrated development environment tool, a Java™ code optimizer, a configuration management tool, etc or an integrated development environment, such as ECLIPSE™ (hereinafter referred to as "Eclipse") (www.eclipse.org), that incorporates many software development tools. Object-oriented language tool 790 may be used to understand, maintain, develop, design, redesign, modify, configure, or otherwise manipulate the OOP model of business application 755. For example, a customized wagetype editor/viewer may be included as part of an integrated development environment for an SAP R/3 system, presenting structures such as the class shown in FIG. 7A on easy to understand, use, and navigate user interfaces, such as the examples shown in FIGS. 22 and 23.

In one embodiment consistent with the invention, extract module 765, transform module 780, and object-oriented language tool 790 may be implemented on a computer(s) separate from the computer implementing business application 755, such that business application 755 can be modeled, and the OOP model manipulated, without interfering with the ongoing operation of business application 755. Further, one of ordinary skill will recognize that Java™ is merely used as one example of an OOP language, and that the scope of the invention includes other OOP languages, such as C++, C#, Visual Basic, etc.

As with data structures (e.g., for configuration data) in legacy business applications, the operations, instructions, or business rules that implement the application are also typically table-based. That is, the operations that perform a business rule function, such as deducting payroll taxes from an employee's paycheck, (and some of the relationships between the operations), may be contained in database tables. The operations may be executed by application source code that traverses the tables when carrying out a particular rule. And, similar to business data structures, business rules or operations may be contained in many different database tables, which entail the same drawbacks described above for table-based business data structures. Perhaps worse, there may be no physical connection between the rules tables and the data tables they operate on and vice-versa. Just as with table-based business application structures, these table-centric rules and operations are difficult for users and administrators to comprehend, manage, create, revise, maintain, and debug.

Embodiments of methods and systems consistent with the invention transform business application operations, rules, and schemas into OOP constructs that represent the operation, rule, or schema, emulate its operation in terms of sequence with other operations, and represent its relationship(s) to the data it operates with and upon. A rule may be thought of as a sequence of operations that work on data structures to perform a business function. A schema may be thought of as a business process or workflow that connects a sequence of rules and data structures to perform a more complex business function, for example, as illustrated in FIG. 2C.

In one embodiment, an automated system determines each operation that makes up a schema or rule in the business application by analyzing the database table(s) that hold the schema or rule, for example, by analyzing the rule tables in an application in an SAP R/3 system or other business application. In one embodiment consistent with the invention, for each business operation found, the system transforms the operation into part of an OOP model by declaring or creating an empty OOP language construct with a similar name to that of the business operation, such as a Java™ function or method. The system may insert a standard number of parameters, or make other modifications, to make the syntax of the newly declared OOP construct valid for the programming format being used, such as the Java™ language. The system preferably puts the OOP constructs in the same sequence as the business application operations to form an OOP model object representing the rule, schema, etc. that encompasses the business application operations. Thus, in some embodiments consistent with the invention, the system produces a model that represents the configuration of the business application rules and schema, but not their functionality, as the OOP constructs are null functions.

In one embodiment, the OOP language code representing the business operations may contain function or method calls only, while the bodies of the functions or methods are empty. OOP languages such as Java™ allow a null function body and can compile a function call with a null function body. For example, a payroll business application for an SAP R/3 system may contain a business rule with the operation "NUM=." An embodiment of a system consistent with the invention may create a syntactically correct null Java function named "NUM=" when modeling the payroll business application. Thus, as noted, the system may produce a model that represents the configuration of the business application rules and schema, but not their functionality, as the OOP constructs are null functions. Since the OOP language syntax is correct, OOP language tools, such as compilers, analyzers, optimizers, etc. can be used to find errors or problems in the configuration model, such as errors in relationships, calls, interactions, design, etc. associated with the modeled null functions.

This is useful because any errors associated with the model are also associated with the business rules and operations it represents. For example, if a modeled OOP function calls another OOP function that does not exist (because there is no corresponding business application operation that caused the called OOP function to be created in the model), this error will be exposed by the OOP language tools, such as a compiler or linker.

In some embodiments consistent with the invention, the OOP functions include documentation pulled from the business application to help users understand the function. In some embodiments consistent with the invention, the process that transforms business application operations or rules into OOP constructs that represent the operation or rule is controlled by a set of transformation rules. These transformation rules may be generated manually. The transformation rules should be designed such that the resulting OOP language function enforces the scope and other characteristics of the business application operation through OOP language techniques. For example, a business application rule (and therefore the operations that comprise it) may be valid for only one country, or in a few countries, or in all countries. To enforce this scope, the transformation rules may produce functions of appropriate scope, such as global, shared, or local. In some embodiments, an OOP project model may also be used to enforce the scope of OOP objects and functions.

In a manner similar to that explained above regard transforming business application data structures into OOP structures, the exemplary architecture shown in FIG. 7C may be used to implement a system that also transforms a sequence of business application operations (e.g., business application rules or schemas), into object-oriented language constructs. In the architecture shown, object-oriented tool 790 may include a customized rule editor/viewer (not shown) as part of an integrated development environment for an SAP R/3 system, presenting easy to understand, use, and navigate user interfaces, such as the examples shown in FIGS. 17 and 25. As explained further elsewhere in this application, the OOP constructs representing the business application rules and schemas may be modified, changed, optimized, etc. using OOP language tools, and then reverse transformed back to the business application format and the run in the business application.

As with data structures (e.g., configuration data) and operations (e.g., rules) in business applications, the relationships or links between business objects, such as business data and business operations, are also typically table-based, making the relationships difficult, at best, to discern statically. For example, as illustrated in FIG. 3, the relationships between configuration data 305 and business rules 310 may not be realized until runtime. This makes it difficult for users and administrators to detect errors in the relationships, such as missing business data that is referred to by other data or a business rule, especially when working with the tables at any time other than run time.

Methods and systems consistent with the invention transform business application relationships or links into OOP constructs that represent the relationship, tying together different types of business objects, such as data and operations, in an easily comprehensible and manageable manner, and in a manner that allows automated OOP tools to check the integrity of the relationships. In one embodiment, an automated system uses an object-oriented language construct, such as an assignment operator (e.g., "=" in Java), to link together OOP objects representing business data and business operations. The object-oriented language construct binds different OOP objects representing business application objects and shows and enforces a relationship between them. For example, as shown in the exemplary implementation of FIG. 7A, the processing class objects 798 of a wagetype object may be related to processing class value objects, and these relationship are represented by the Java assignment operator "=." The processing class object "WageType_s123.ProcessingClass03, " for instance, is linked to the value of the business object "processingclasses.ProcessingClass03.Value0" by the equality operator "=."

Figure 27:
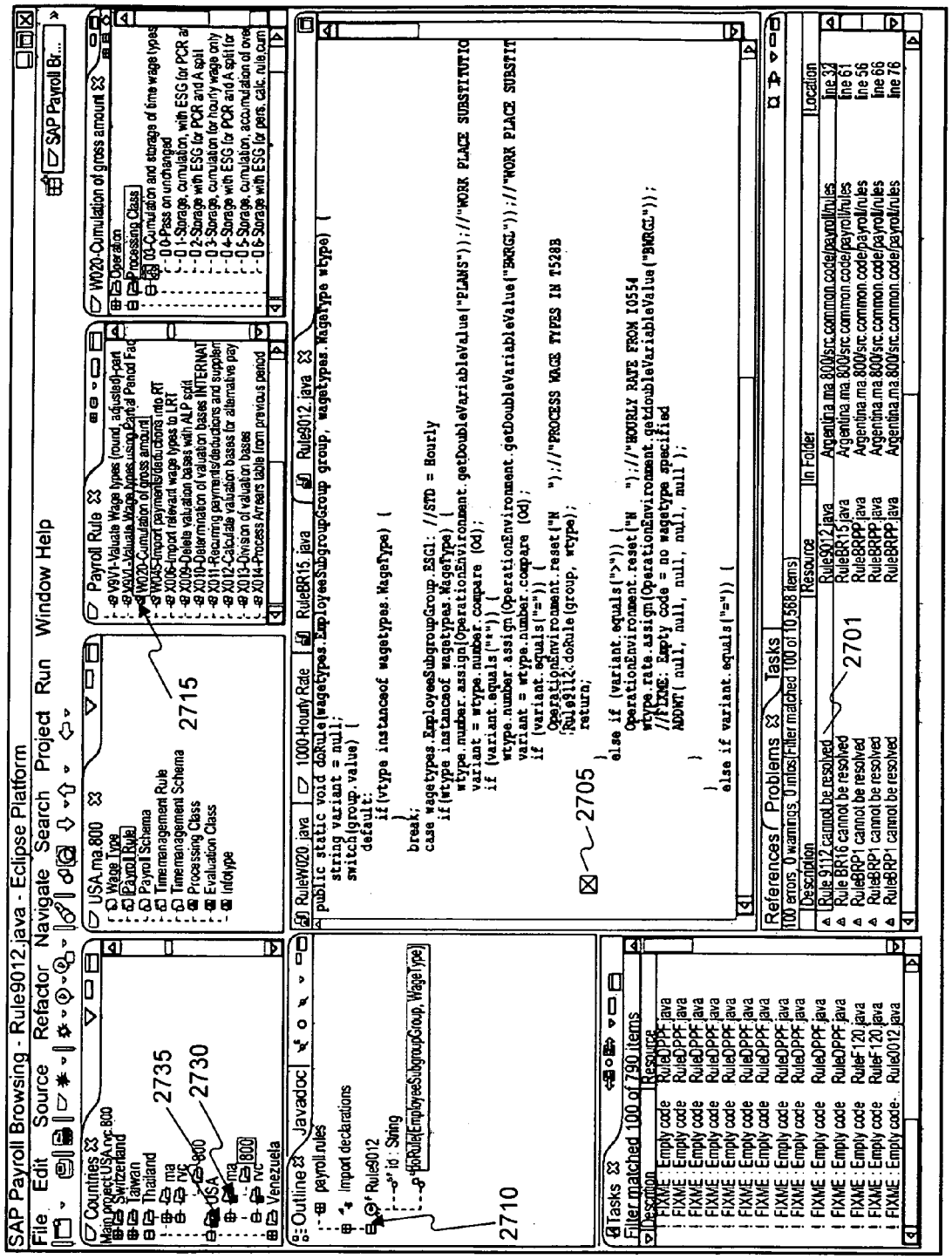

Other business objects may also be linked. For example, a business rule object may be linked to a wagetype object that it affects. For instance, as shown in the example of FIG. 27, a variable object in a rule may be linked to a wagetype processing class attribute, with that link represented by an assignment operator.

Representing the business object relationships as OOP language constructs, such as an assignment operator like "=," allows the use of a OOP language tool, such as a Java debugger, to walk through referential relationships and discover referential problems in the integrity of the business application layer. For example, as shown in FIG. 7A, if the value of processingclasses.ProcessingClass03.Value0 is not defined, then the compiler will flag a reference error when it processes the equality operator in the statement "WageType_s123.ProcessingClass03=processingclasses. ProcessingClass03.Value0." Thus, when trying to resolve the assignment operator relationship, a Java compiler will be able to identify broken links or references, which represent empty links in the corresponding modeled business application. Consequently, for an instance of wagetype, for example, a user can see from the Java code model what values are acceptable for each processing class. The model also lists exactly which processing classes are part of the wagetype, and thus any unlisted processing classes are not defined for that wagetype (and so not allowed). The assignment operator and processing classes included in the wagetype OOP structure are examples of integrity checks for the business application.

Figure 8:
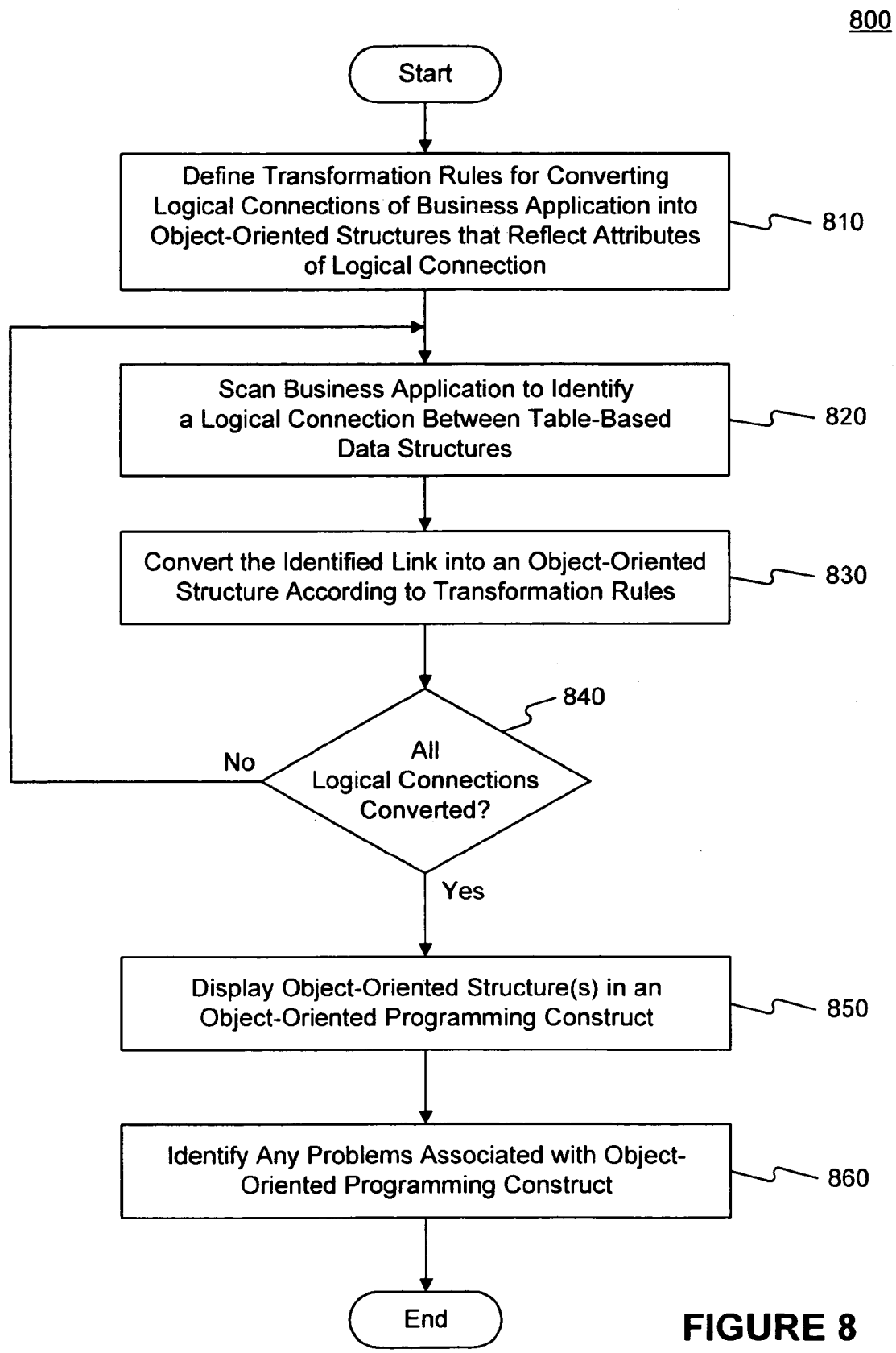
FIG. 8 illustrates an exemplary processes consistent with the present invention.

FIG. 8 illustrates an exemplary process consistent with the invention. As shown, the process may begin by defining transformation rules for converting logical connections from a business application into structures that represent the logical connections (stage 810). Next, the process may scan a business application to identify a logical connection or link between table-based data structures or between table-based data structures and rules (stage 820). Next, the process may convert the identified logical connection or link into an object-oriented structure, according to the transformation rules (stage 830). In one embodiment, the transformation rules include using the equality operator of an OOP language as the object-oriented structure. In some embodiments, the transformation rules are defined manually according to criteria similar to that described for transforming business structures and business rules.

The process may then determine whether all the logical connections or links in the business application have been converted into structures (stage 840). If not (stage 840, No), the process may loop back and continue to identify and convert logical connections. If so (stage 840, Yes), then the process may display the structures as an object-oriented programming construct, such as an assignment operator, between related business data and/or business operation representations (stage 850).

In the exemplary embodiment shown, the process may then identify any problems associated with the object-oriented structure, such as an unresolved reference or other integrity problem (stage 860). Such problems may be identified by convention OOP language tools, such as compilers and linkers. Any such problem represents a problem in the corresponding business application structures and relationships, and the OOP language constructs model the relationships and behaviors of the business application from which they are derived.

As with data structures (e.g., configuration data) and operations (e.g., rules) in business applications, the relationships or links between the business data and business operations are typically table-based, making the relationships difficult, at best, to discern with the table-centric views and tools provided by a typical business application system. For example, as illustrated in FIG. 3, the relationships between configuration data 305 and business rules 310 may not be realized until runtime, making it difficult for users and administrators to comprehend, manage, create, revise, and debug such relationships, especially by working with the static tables before runtime. In another example, a single business rule may be stored in multiple tables. To determine all of the configuration data used by such a business rule, it may be necessary to study all of the multiple tables storing the rule. This process can be time-consuming and error-prone, just to understand the relationship between a business rule and the data on which it operates.

Embodiments of methods and systems consistent with the present invention transform business application objects and relationships into object-oriented programming constructs, making it possible to display business objects and their relationships in an easily comprehensible and manageable manner.

Using processes described above, a model, such as an object-oriented model, may be generated to represent a table-based business application. The model may represent logical entities of the business application, such as rules, configuration data, and schema. The model may also represent links between the logical entities. In this way, object-oriented tools and graphical user interfaces may be used to display the links between the logical entities of the business application.

Figure 31:
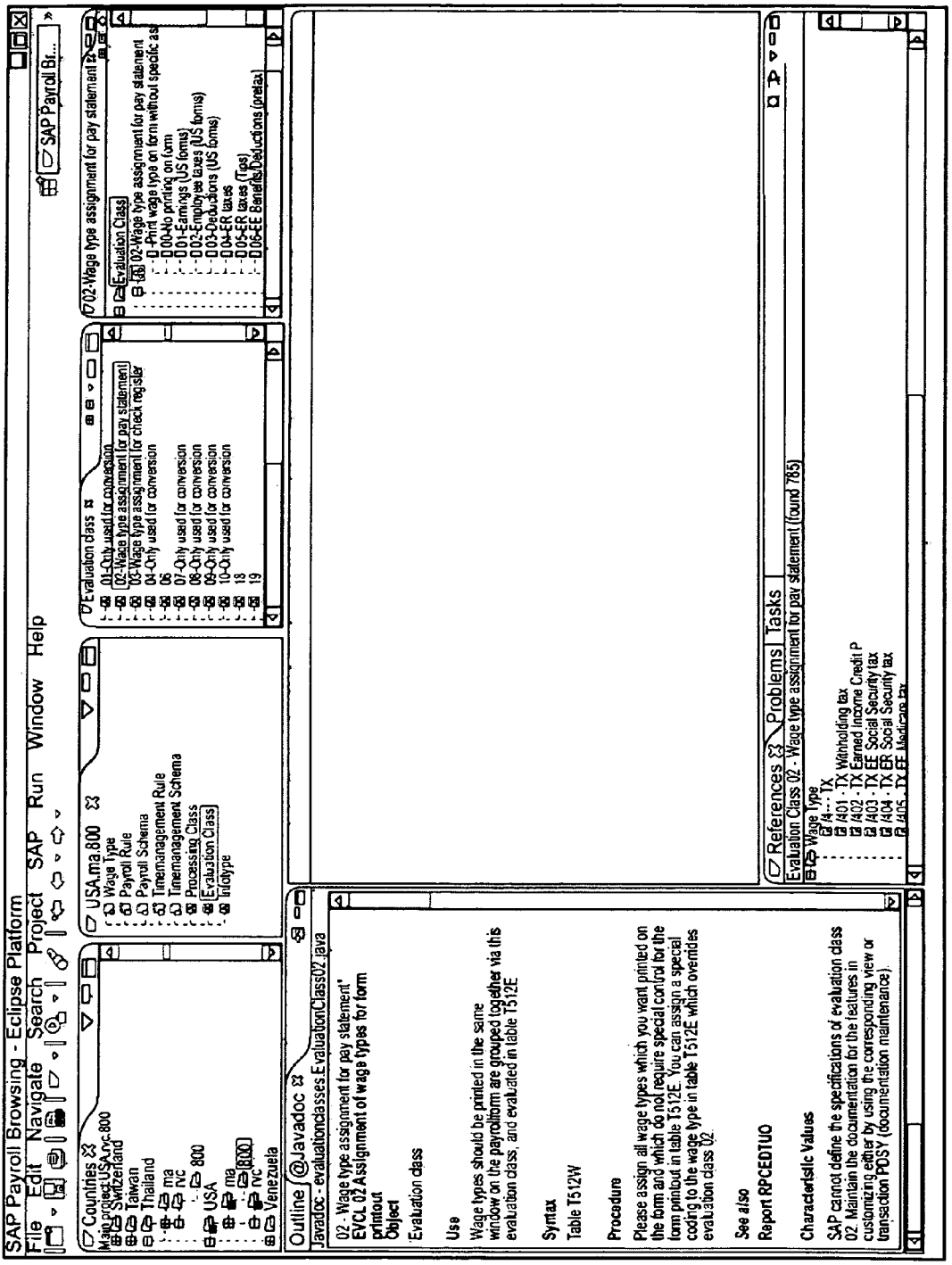

For example, as shown in FIG. 31, a user may select a business object such as an evaluation class, e.g., evaluation class 02, "Wage type assignment for pay statement." This business object may be chosen from a menu of available evaluation classes, as-shown in the upper center right panel with the tab labeled "Evaluation Class." By processing a model, such as an object-oriented model, of the business application using common object-oriented tools and methods, all business application objects that reference evaluation class 02 may be determined and displayed. For example, the referencing objects may be displayed in a list of References, as shown in the bottom right hand pane with the tab labeled "References." A total number of referencing objects may be calculated and displayed, such as "(found 785)" in the bottom right hand pane with the tab labeled "References."

Thus, a user may easily see all the business objects that depend upon or are somehow related to the selected business object and gain awareness of the scope of objects in the business application that may be affected by a change to the selected business object. By using a model of the complex, table-based business application, relationships not previously understandable may now be easily determined and displayed.

Figure 17:
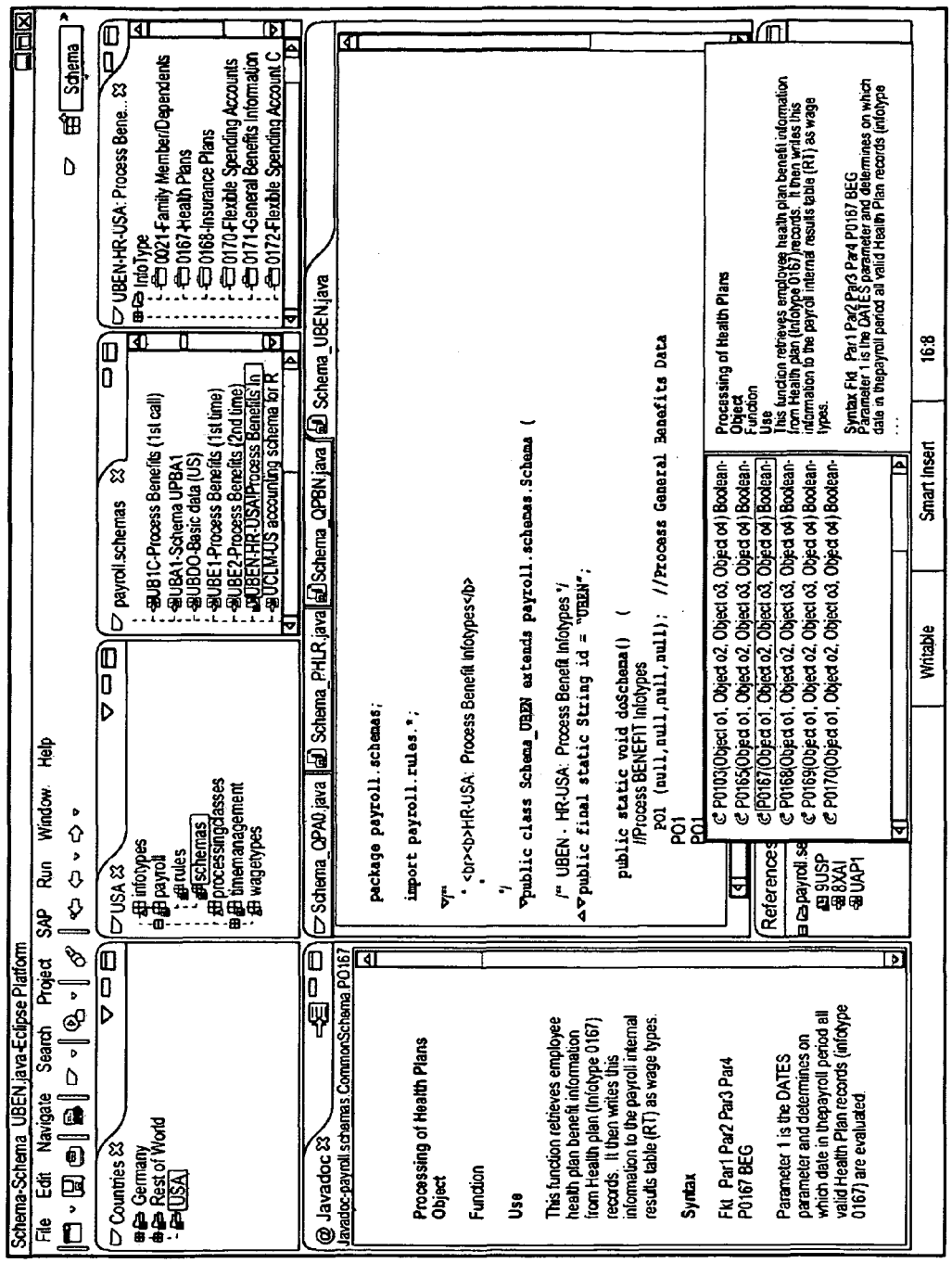

In another embodiment consistent with the invention, an outline may be generated and displayed to expose the structure of business objects within a business application For example, in FIG. 17, a single integrated display shows information pulled from an R/3 system in a Javadoc displayed in the lower left pane. This information includes, for example, a name of a business application object (e.g., payroll.schemas), a use of the business application object (e.g., "This function retrieves employee health plan benefit information . . . "), business application syntax for the object (e.g., Fkt Par1 Par2 Par3 Par4), and an explanation of the parameters.

This information may be displayed simultaneously with a model, such as an object-oriented model, of the business object. In the lower right pane of the single integrated display shown in FIG. 17, pseudo-Java code is displayed that represents payroll.schemas as an object-oriented package. Drop-down lists and pop-up windows may be displayed with the integrated display to provide more information. For example, the information from R/3 shown in the lower left-hand pane may also be shown in a pop-up window over the object-oriented pseudo-code when a user selects a certain part of the object-oriented structure.

In these ways, methods and systems consistent with the present invention use models and programming tools, such as object-oriented models and tools to determine and display the relationships between logical entities in a table-driven business application.

Processing a Model of a Business Application

The following sections describe exemplary embodiments for processing a model of a business application. While the description below provides headings Exposing Deprecated Entities Business applications often involve large, complex legacy systems. Over time, these systems evolve to accommodate changing business rules, user needs, etc. Each change to a business application may affect many logic entities within the business application. For example, changing a processing rule may result in another logic entity, such as configuration data, that is no longer used by the business application. However, because the business application is large and complex, the user making the change may be unaware that the logic entity is now unused and could be deleted. Instead, the unused logic entity remains in the business application even though it is never again used.

As time passes, a business application may develop a great deal of unused, or "deprecated" logic entities, including configuration data and processing rules. Traditional table-based business applications do not have a mechanism for identifying or removing deprecated logic entities. This results in wasted storage space and unnecessary programming complexity associated with conventional business applications.

Using methods and systems consistent with the present invention, deprecated logic entities of a business application may be identified using models and programming tools, such as an object-oriented model of the business application. By transforming business application structures into structures, deprecated logic entities in the business application may be exposed using object-oriented referential integrity checking.

For example, an object-oriented code compiler checks syntax and identifies potential problems, such as mixed data types, broken references, etc. Because a compiler does not actually run the code, it can be used to analyze a model, such as an object-oriented model consistent with the present invention. The potential problems identified by the compiler in the model may correlate to deprecated logic entities in the business application. These potential problems may be marked in an integrated configuration environment to indicate deprecated logic entities that could be removed to streamline the corresponding business application.

Each logic entity in a business application may be transformed into a corresponding object-oriented structure. An object-oriented compiler may then be used to check the referential integrity of the structures. Although the object-oriented compiler thinks it is finding problems, such as broken references, in object-oriented code, it is actually identifying problems in the underlying business application. For example, the object-oriented compiler may identify a reference to a branch of code that will never be executed. By correlating the identified branch of code with its corresponding logic entity in the business application, a deprecated logic entity is identified. In one embodiment, deprecated logic entities may be removed from the business application after they have been identified using the model.

In one example, a business application logic entity, such as "wagetype," may not be defined in the business application for a certain country such as New Zealand. However, "wagetype" cannot be deleted from the business application altogether because it is defined for other countries. During transformation, the object-oriented structure corresponding to wagetype in New Zealand may be created but marked as deprecated to indicate that it is unused in the underlying business application. Deprecated structures may be marked, for example, using yellow underline in displayed object-oriented programming language. Yellow might be used because the deprecated structure is not an error that needs to be fixed (which might be shown in red). In this way, a user viewing the object-oriented structure is alerted to deprecated structures in the business application and can more readily study the effects of changes.

Figure 9:
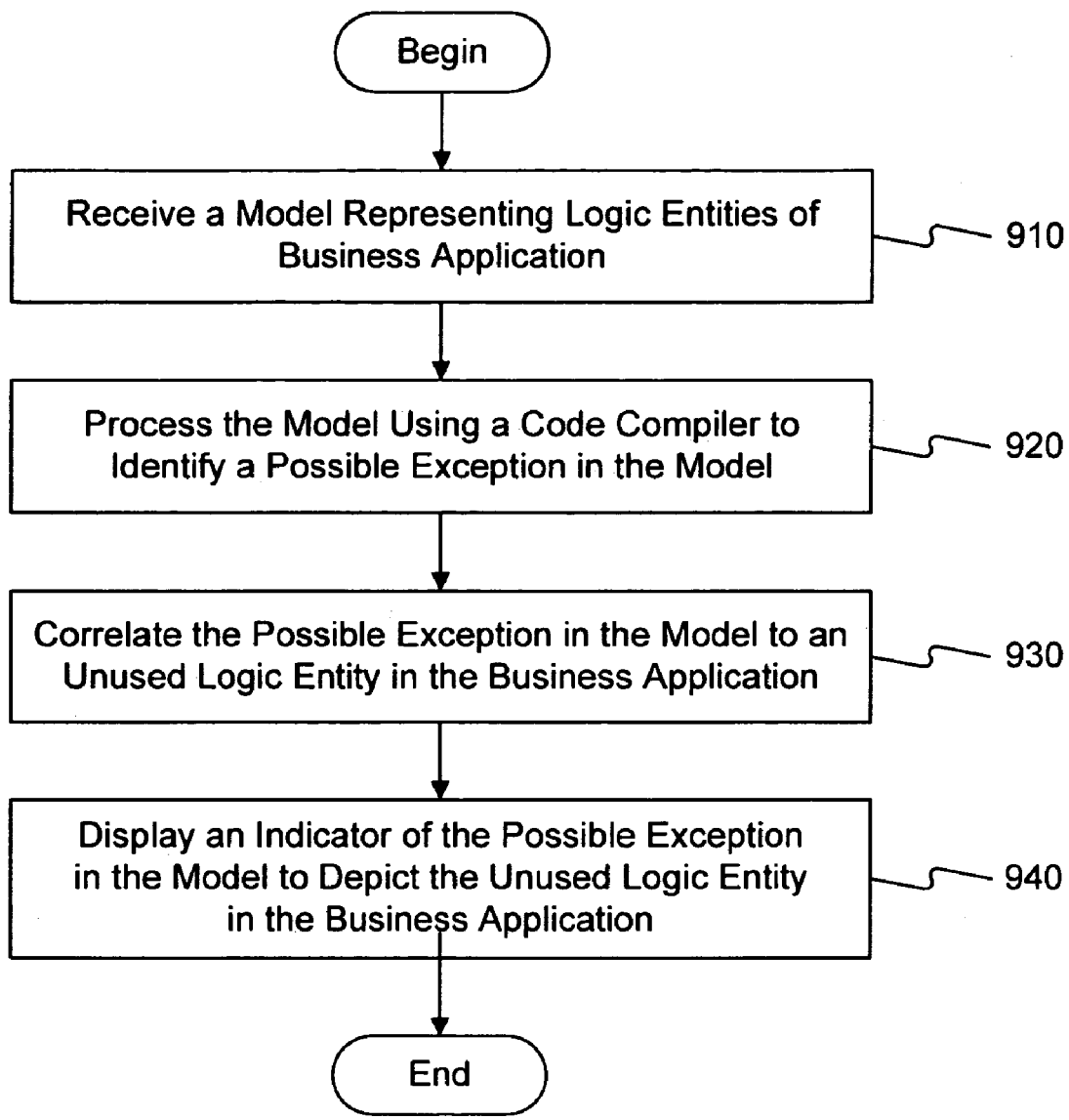
FIGS. 9 to 15 illustrate exemplary processing tool operations consistent with the present invention.

FIG. 9 is a flowchart of a method for exposing deprecated business application logic entities using a model. In this embodiment of the present invention, a model representing logic entities of the business application is received (step 910). As discussed above, the model may be, for example, in an OOP format. The model is processed using a code compiler, such as an object-oriented code compiler, to identify a possible exception in the model (step 920). The possible exception in the model is correlated to an unused logic entity in the business application (step 930), and an indicator of the possible exception may be displayed with the model to depict the unused logic entity in the business application (step 940).

For example, a code compiler may identify a dead pointer in an object-oriented model of business application logic entities. The dead pointer may correlate to an obsolete rule (e.g., a repealed or expired tax) in the business application. When the model is displayed in an integrated configuration environment, the corresponding object-oriented structure may be underlined or highlighted or otherwise marked to indicate the deprecated business application logic entity. Other possible exceptions include orphans, cost structures that do not exist, outdated regulations, expired taxes, etc.

One example of a display consistent with the present invention may be found in the screen shot shown in FIG. 25. A business application rule, "W020—Cumulation of gross amount," is displayed using a model in a large window of a single integrated configuration display. To the right side of the large window is a series of rectangular flag markers indicating possible problems identified by a code compiler applied to the model. When the cursor is placed over a flag marker, a pop-up box may be displayed reading, for example, "RuleWRFI cannot be resolved." This may indicate to a user that the business application logic entity corresponding to the model may be deprecated.

Refactoring

Modifications made to a business application can make an already complex system even more unwieldy to understand and maintain. These difficulties are compounded by the fact that table-based business applications do not allow the use of design techniques available in other types of systems. Refactoring is a programming technique for improving the design of existing software code without altering the code's behavior. Refactoring may improve code by, for example, consolidating many statements into one, decomposing long methods into shorter ones, eliminating redundancies, etc. Refactored code may be easier to read and understand, simpler to debug, and more efficient to run and maintain.

Systems and methods consistent with the present invention enable the use of refactoring to reorganize the configuration of a business application. By transforming business application structures into structures, object-oriented refactoring tools may be used to retool the underlying business application.

Program refactoring tools may be applied to structures to edit the structures without affecting their behavior. Refactoring may be a recursive process, taking several passes through a structure or code section in order to optimize and improve it. Refactoring might be performed on an ongoing basis to maintain code and structures, or it might be applied for a specific purpose, such as preparing an application for a major upgrade.

Using this invention, any number of refactoring tools may be applied to the business application through application to a model of the business application. These tools might include:

(1) Rename refactoring: This function enables the renaming of any package, class, method or variable, and automatically finds and corrects all references to it. By applying the rename tool to the model, the tables and references in the underlying business application may be better organized or named.

(2) Extract method refactoring: This function analyzes a selected piece of code and transfers it into a separate method in order to aid program modularization and break code into manageable pieces. By applying the extract method tool to the model, the underlying business application may be better organized and easier for users to understand.

(3) Inline variable refactoring: This feature replaces all references of a variable with a declaration expression, then deletes the older variable text. This can save time and effort when rearranging code or introducing upgrades, such as new tax laws or new employees. By applying the inline variable tool, the business application may be updated with a minimum of potential referencing errors.

(4) Clean imports refactoring: This function allows a user to scan code in order to find and remove unnecessary import statements. Applying this tool may assist with identifying and cleaning up superfluous elements in the underlying business application.

A skilled artisan will recognize that these and may other refactoring tools and methodologies may be applied to the structures in order to effectively refactor the corresponding business application.

Using methods and systems consistent with the present invention, each logic entity in a business application may be transformed into a corresponding object-oriented structure. An object-oriented refactoring tool may then be used to refactor the resulting structures. The refactoring tool will improve the structures by, for example, consolidating many statements into one, decomposing long methods into shorter ones, eliminating redundancies, etc. However, the operation of the code will not be affected. Once refactoring of the object-oriented code is completed, the object-oriented code may be translated back into its corresponding business application logic structures. In this way, the business application will reflect the improvements made by refactoring the object-oriented code.

Figure 10:
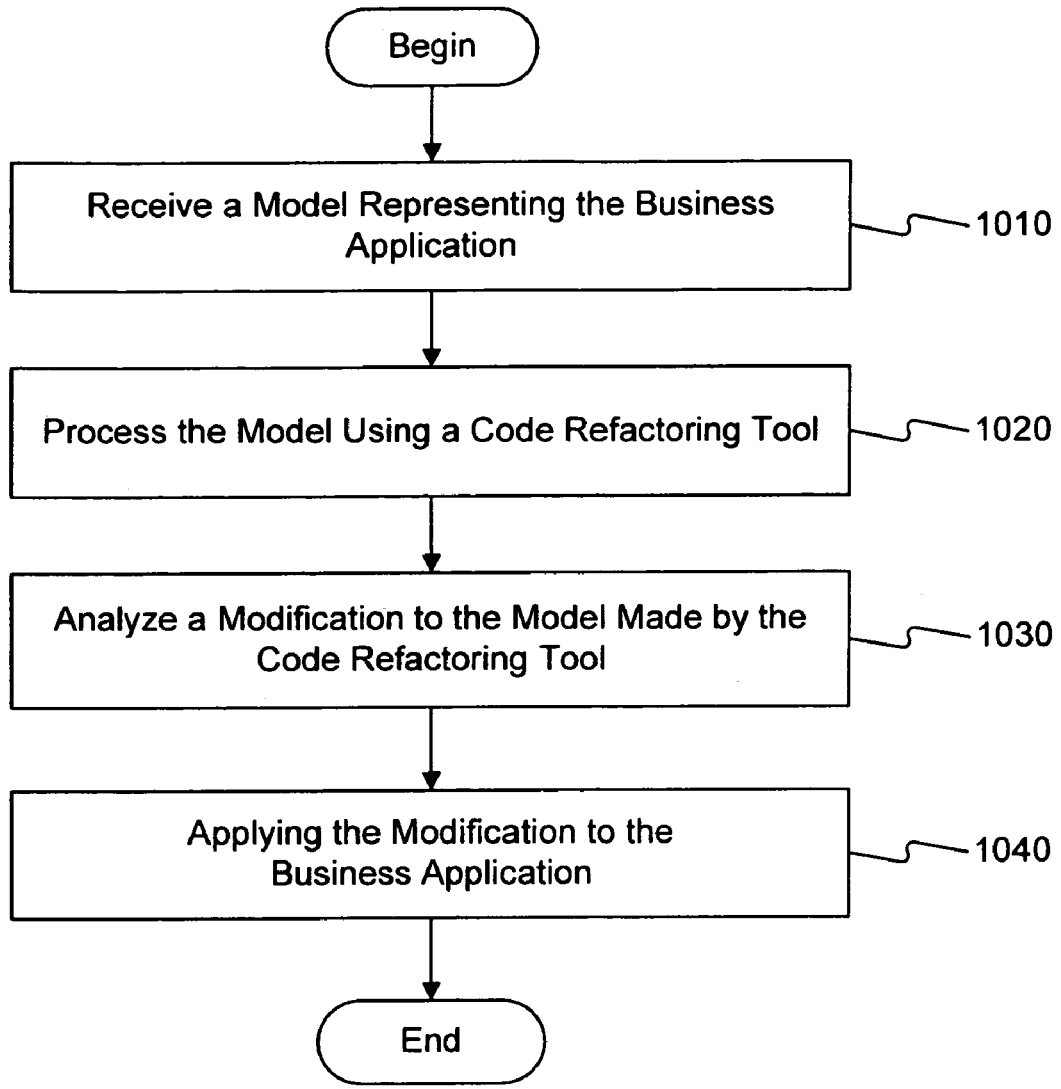

FIG. 10 is a flowchart showing an exemplary method for redesigning a business application composed in a first programming format consistent with an embodiment of the present invention. When a model representing the business application in a second programming format is received (step 1010), the model may be processed using a code refactoring tool in the second programming format (step 1020). In one example, the first programming format may be a table-based format, such as R/3, and the second programming format may be an object-oriented programming format, such as JAVA™.

Modifications to the model made or suggested by the code refactoring tool may then be analyzed (step 1030). Modifications suggested by the code refactoring tool may include, for example, removing redundant code, renaming variables or methods, breaking large routines into shorter ones, etc. Each modification may be analyzed before it is accepted, or modifications may be party or fully automated. After the modifications are accepted and/or applied to the object oriented model, the object-oriented code may be translated back into its corresponding business application logic structures to propagate the changes into the business application, thus effectively refactoring the business application itself. In this way, refactoring modifications may be applied, in the first programming format, to the business application (step 1040).

In one example, the code refactoring tool includes removing redundant code of the model in order to remove redundant code in the corresponding business application. In another example, the code refactoring tool includes consolidating many statements into one, which may in turn streamline the corresponding business application. In yet another example, the code refactoring tool includes decomposing long methods into shorter ones, making the corresponding business application easier to understand and work with.

Runtime Errors

Given the complexity of a business application, each change made to it may affect many logic entities within the business application, resulting in errors that may not be apparent until runtime. For example, changing configuration data related to a project may result in a call to a processing rule that does not exist for that project. However, because the business application is large and complex, the user making the change may be unaware that the call will result in an error during configuration. Instead, the user may not realize the error until runtime, when it is costly and time-consuming to correct. Traditional table-based business applications do not have any simple mechanism for identifying or removing runtime errors at design time.

Using methods and systems consistent with the present invention, runtime errors in a business application may be identified prior to runtime using a model of the business application. By transforming business application structures into structures, runtime errors (such as unresolved references) in the business application may be exposed using object-oriented referential integrity checking.

Each logic entity in a business application may be transformed into a corresponding object-oriented structure. An object-oriented compiler or debugger may then be used to identify errors, such as syntax errors or broken references, in the structures. Although the object-oriented compiler thinks it is finding problems in object-oriented code, it is actually identifying problems in the underlying business application. For example, the object-oriented debugger may identify a reference to a branch of code that does not exist. By correlating the identified branch of code with its corresponding logic entity in the business application, a problem with dependencies in between business application structures may be identified. In one embodiment, a user may correct the problems in the object-oriented code and translate the corrections back to the business application before running the business application.

A runtime error in the business application may be, for example, calling a rule that does not exist for a project, such as a country, or attempting to create a wagetype that does not exist for a project, such as a country. In one embodiment, when business application structures are transformed into structures, a referential error might be revealed by a class that is declared but empty. These errors, once identified using the model, may be displayed using, for example, red underline to show that runtime errors will occur in the business application. The identifier may be propagated up through a number of user interfaces to show potential problems at any level of the system.

Figure 29:
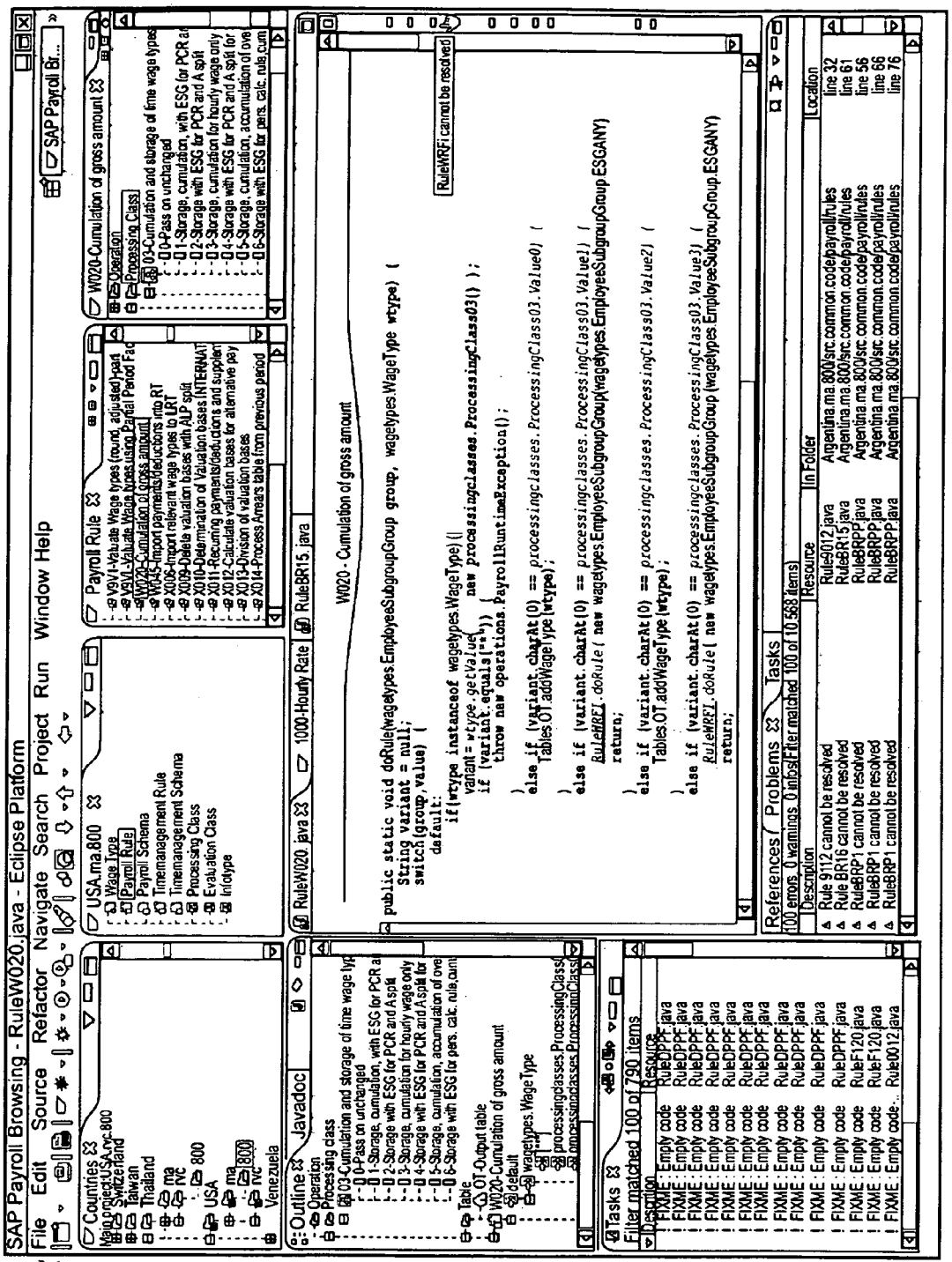

A sample screen shot of how potential errors may be displayed is included in FIG. 29. In the integrated configuration environment of FIG. 29, a business application rule, "W020—Cumulation of gross amount," is displayed for project USA.rna.800 using a model in a large window. To the right side of the large window is a series of rectangular flag markers indicating possible problems identified by a code debugger applied to the model. When the cursor is placed over a flag marker, a pop-up box may be displayed reading, for example, "RuleWRFI cannot be resolved." This may indicate to a user that the business application logic entity corresponding to the model has a potential runtime error. The display also includes a list of problems (e.g., "Rule 9112 cannot be resolved") in the lower right portion. The problems may be further displayed up the hierarchy of menus using, e.g., a red "X" to show the problem in the list of Payroll Rules, the list of logic entities within project USA.rna.800, and the list of all projects. By propagating the error flag up the menu hierarchy, users may be alerted of many potential runtime errors quickly and effectively.

In traditional table-based business applications, a log file may be created to trace the path of processing during a sample run (e.g., a payroll run) of the business application. The log file may note errors present in the business application. However, the log file is typically long and difficult to debug. By using object-oriented programming constructs, debugging may be greatly simplified. The sequential view of a log file is replaced by an object-oriented data representation view that is familiar to developers today. In this way, the same data used for debugging may be presented in a much more user-friendly fashion. In one embodiment, the debugging may be performed offline, increasing efficiency and flexibility of maintaining the business application.

Figure 11:
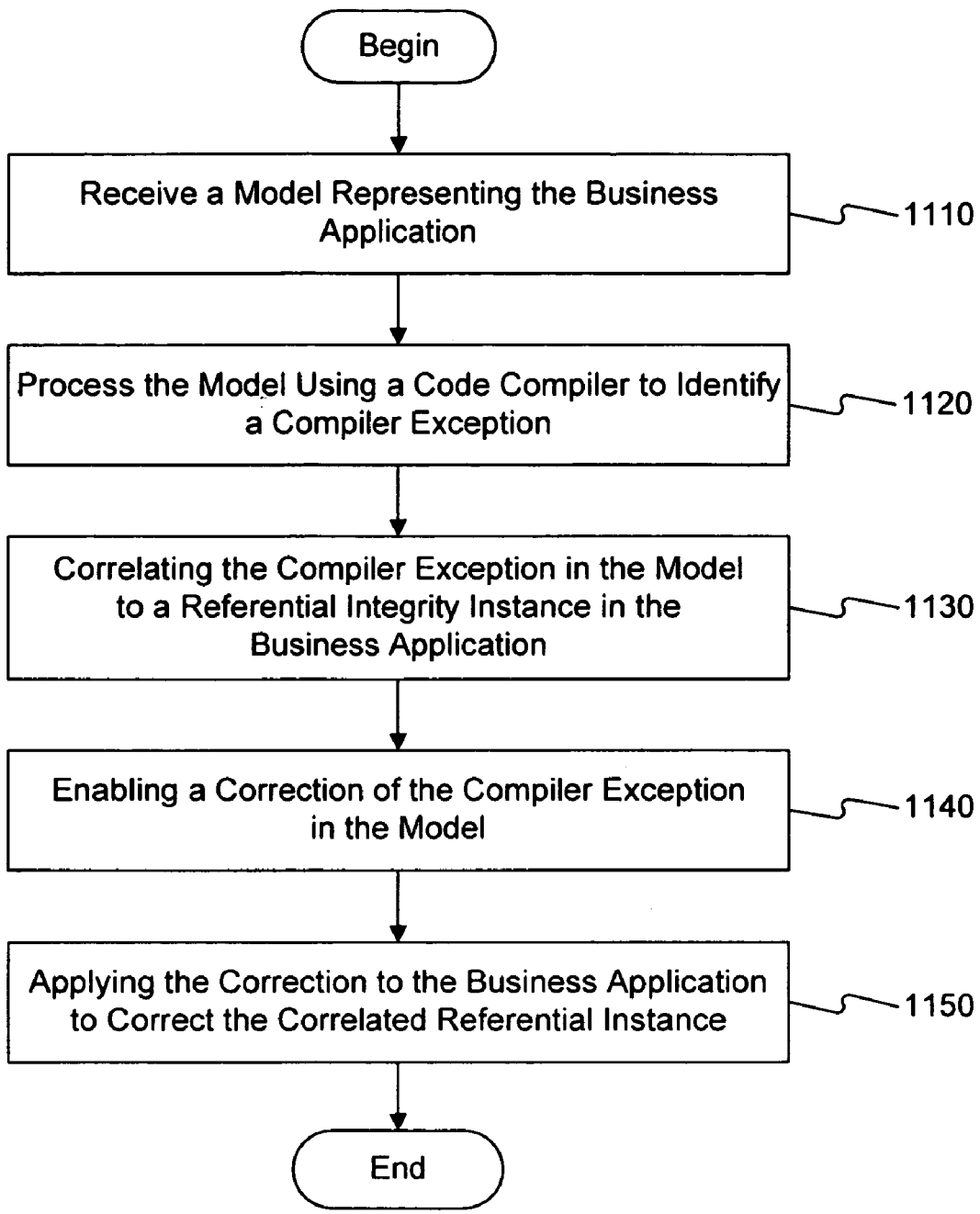

FIG. 11 is a flowchart for a process for analyzing referential integrity of a business application consistent with embodiments of the present invention. A model representing the business application may be received (step 1110) and processed using a code compiler to identify a compiler exception (step 1120). The compiler exception may be, for example, a broken reference, an infinite loop, etc. The compiler exception in the model may be correlated to a referential integrity instance in the business application (step 1130), and correction of the compiler exception in the model may be enabled (step 1140). Correction may be enabled through displaying flags or other indicators to call the problems to the user's attention and providing configuration tools via an integrated configuration environment. Finally, the correction to the business application is applied to correct the correlated referential instance (step 1150).

One skilled in the art will recognize that many different code analyzers, including debuggers, interpreters, compilers, etc. may be used to identify possible runtime errors in the business application and that many different ways of marking and correcting these errors may be employed consistent with embodiments of the present invention.

Interactive Development Environment (IDE)

Business applications, such as the R/3 system created by SAP, often involve large, table-based systems and evolve over many years as businesses grow and change. Highly trained consultants may be employed to implement, configure, and maintain a business application for a company. Due to the complexity of traditional business applications, it may take years to configure an application for a single company. Because of their legacy nature and highly customized usage, business applications typically have limited development tools to assist in the configuration and maintenance of the applications.

To assist in the configuration and management of such business applications, systems and methods consistent with the present invention enable business application consultants to configure and maintain business applications using an interactive configuration environment that offers the simplicity and usability of an IDE.

An IDE is a set of tools available to assist a software developer in writing and maintaining software code. IDEs enable users to design and manipulate code, such as object-oriented code, in an easy-to-understand manner. An IDE may include multiple programs that are run from a single user interface. For example, programming languages often include a text editor, compiler and debugger, which are all activated and function from a common menu. Other IDE tools may include a version control system, GUI design tools, a class browser, an object inspector, and a class hierarchy diagram. IDEs are available for specific programming languages, e.g., the Visual Basic IDE, or for multiple languages, e.g., the Eclipse IDE.

An interactive configuration environment consistent with the present invention integrates and displays a table-based business application using a single, interactive display. For example, users can write a new business rule using familiar object-oriented code, and that code may be converted into logic entities to apply the new rule in the business application. In another example, users may view existing business applications using an IDE interface. In this way, users may not need to worry about the format or structure of the business application but may still be able to understand and configure it.

When business application structures are displayed using object-oriented code structures, the business meaning of the object-oriented code structures may also be displayed in the integrated environment. For example, when a user rolls a mouse over an item in the object-oriented code, documentation of the underlying business meaning may be displayed in a pop-up box. This aids the user in understanding a complex business application using familiar, easy-to-understand object-oriented programming constructs.

Using an object-oriented user interface, the user may browse business application logic entities and related objects using a single integrated display. Object-oriented code assists and templates may be available to assist users in writing new object-oriented code in order to add new logic entities to the business application. A template may consult a translation key to determine syntax, parameters, etc. and display these options in a drop-down list in the object-oriented code display. Using IDE tools, a state of the business application may be compared with a changed state of the business application, for example, by using a side-by-side display.

Figure 12:
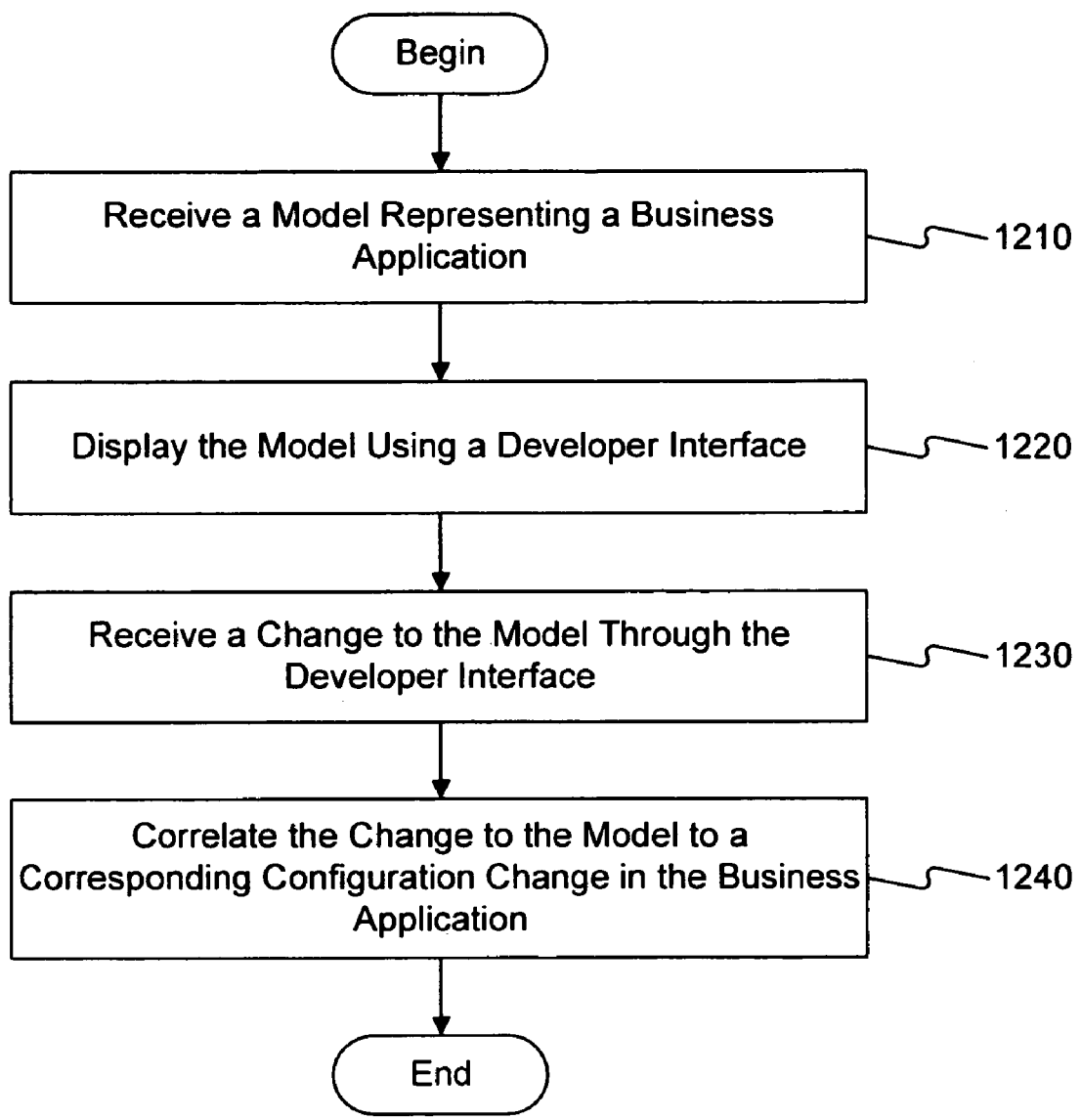

FIG. 12 is an exemplary flowchart of a method for analyzing the configuration of a business application consistent with embodiments of the present invention. When a model representing the business application is received (step 1210), the model may be displayed using a developer interface (step 1220). The model and corresponding business application may be integrated and displayed using a single, dynamic display, e.g., the integrated configuration environment shown in FIG. 17. The integrated configuration environment may include, for example, a series of windows displaying business application entities as a hierarchy of projects, rules, and schema. The environment may also include a model, such as an object-oriented model, of a business application object displayed together with documentation pulled from the business application.

When a change to the model is received through the developer interface (step 1230), the change to the model may be correlated to a corresponding configuration change in the business application (step 1240). The corresponding configuration change may be applied to the business application or it may simply be used to model possible changes.

For example, a consultant may wish to modify a rule in the business application. Rather than analyzing the table-based structure of the business application to determine the tables that hold different parts of the rule, the consultant may use the integrated configuration environment to edit the rule using its model counterpart. As part of the integrated configuration environment, the proper syntax or available parameters may be automatically displayed to assist the consultant in making his edits. Once the edit is complete in the model, the change may be translated back to the underlying business application and automatically applied, e.g., to the many tables that hold different parts of the rule.

In another example, a consultant may Wish merely to determine the effects that a potential change to the business application would have. Using a model of the business application, the consultant could try out the potential change by applying it in the integrated configuration environment to see what the effects would be if the change were committed back to the business application.

A skilled artisan will appreciate that many other configuration tools would be made available to users of a business application by displaying and manipulating a model of the business application using an integrated configuration environment consistent with the present invention.

Checking Validity of Business Applications

As described above, business applications often involve large, complex legacy systems. Over time, these systems evolve to accommodate changing business rules, user needs, etc. Each change to a business application may affect many logic entities within the business application. Furthermore, changes to the business application can make an already complex system even more difficult to maintain. These difficulties are compounded by the fact that table-based business applications do not allow the use of design and optimization techniques available in other types of systems.

For example, changing a processing rule may result in another logic entity, such as configuration data, being inconsistent with underlying business logic. However, because business applications are large and complex, the user making the change may be unaware that the logic entity now contains a logic structure error. Traditional table-based business applications do not have a mechanism for identifying or optimizing inconsistencies in underlying business logic. Thus, many problems, such as broken or circular links in logic entities, may be undetected in the business application.

A number of well-known programming techniques may be used to optimize the design of existing software code without altering the code's behavior. For example, a software debugger, such as Validity Check, True Time, or Bounce Checker may improve code by testing it and modifying the values of variables where necessary. Optimized code is generally easier to read and understand and more efficient to maintain.

Methods and systems consistent with the present invention enable the use of known software tools, such as debuggers, to optimize the configuration of a business application by eliminating inconsistencies in underlying business logic of the business application. In one embodiment, each logic entity in a business application may be transformed into a corresponding structure. A language tool, such as a compiler, may then be used to check the structural consistency of the structures and flag identified logic structure errors. Although the object-oriented language tool literally identifies problems, such as broken links, in object-oriented code, it also identifies problems in the underlying logic of a business application because the code models the business application. For example, an object-oriented compiler may identify a circular reference within a branch of code. By correlating that branch of code with its corresponding logic entity in the business application, the inconsistent logic entity may be identified. In one embodiment, inconsistent logic entities in the business application may be corrected after they have been identified using the model, and the model translated back into business application entities that will function in the business application system.

For example, a debugging tool will optimize the structures, for example, by "repairing" circular links. However, the operation of the code will not be affected. Once correction of identified logic structure errors in the object-oriented code is completed, the object-oriented code may be translated into corresponding business application logic structures. As a result, the business application will reflect the improvements made by optimizing the object-oriented code.

Figure 13:
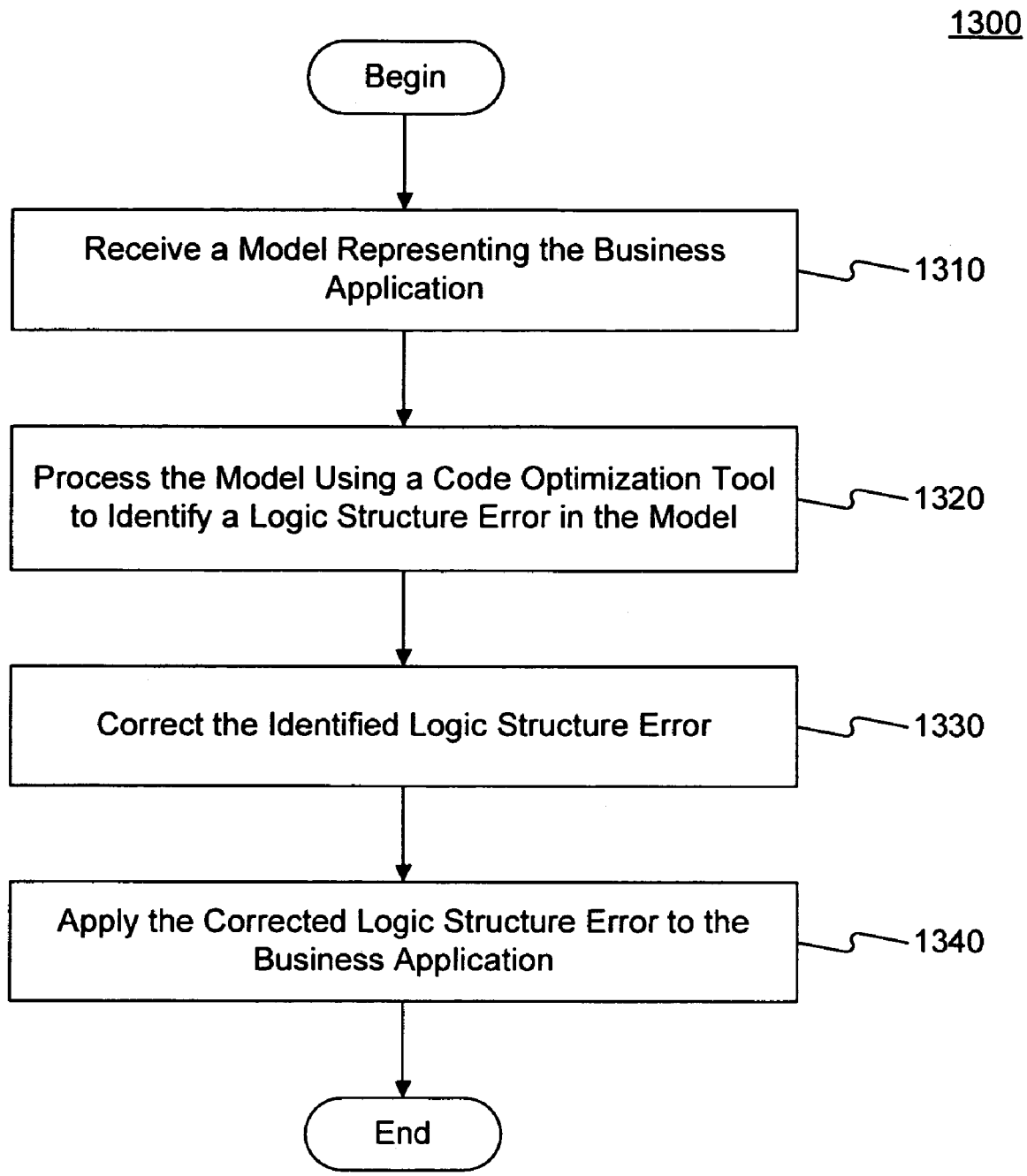

In one method consistent with the present invention shown in FIG. 13, a business application composed in a first programming format may be analyzed by receiving a model representing the business application in a second programming format (stage 1310) and processed by using a code optimization tool to identify logic structure errors (stage 1320). Identified logic structure errors may then be corrected (stage 1330) and applied in the first programming format, to the business application (stage 1340).

Using CASE Tools to Verify Business Application

As described above, business applications often involve large and very complex table-based systems. To configure and implement a business application, a company may need to employ highly trained consultants. Due to the complexity of traditional business applications, it may take years to configure an application for a single company. Business applications typically have limited range of development tools to assist in development of the business applications configuration.

Computer-aided software engineering (CASE) tools assist a software developer in developing and maintaining software code. CASE tools enable users to design and manipulate code, such as object-oriented code, in an easy-to-understand manner. For example, data dictionaries and diagramming tools aid developers in analyzing and designing software systems. In another example, application generators may assist in actual programming of a system. Other CASE tools may assist with data modeling, reverse engineering, simulations, etc. Though CASE tools are available to assist programmers in analyzing and designing traditional software systems, such generic tools are not capable of being applied to a large, legacy system that might be customized to suit the needs of a single company.

Systems and methods consistent with the present invention enable the use of CASE tools to analyze and verify the configuration of a business application. By transforming business application structures into structures, CASE tools may be used to verify the underlying business application configuration. For example, CASE-tool-generated diagrams representing business application layers may assist an architect of a business application in visualizing a matrix of a project. As a result, the architect of a business application may more efficiently design and optimize a business process. For example, such diagrams may help a user to identify an amount of wagetypes, and how those wagetypes are related. In another example, simulation or modeling CASE tools may be used to test the effects of potential configuration changes in a business application. In this way, CASE tools could be applied to assist a consultant in configuring a business application or verifying an existing business application configuration.

Systems and methods consistent with the present invention enable business application consultants to generate and analyze the structure of business applications using tools from a CASE environment. For example, a developer may use a Modified Modeling Language (MML) tool to build a high level diagram of a logic entity, such as a business object class.

By transforming business application structures into structures, object-oriented CASE tools may be applied to generate similar business application structures. For example, a user can write a new business rule using familiar object-oriented code, and that code may be converted into logic business entities to apply the new rule in the business application. As a result, users may configure the business application without worrying about its native format or structure.

In some embodiments, when business application structures are displayed using object-oriented code structures, the business meaning of the object-oriented code structures may also be displayed. This aids the user in understanding a complex business application in the format of familiar, easy-to-understand object-oriented programming constructs.

Figure 14:
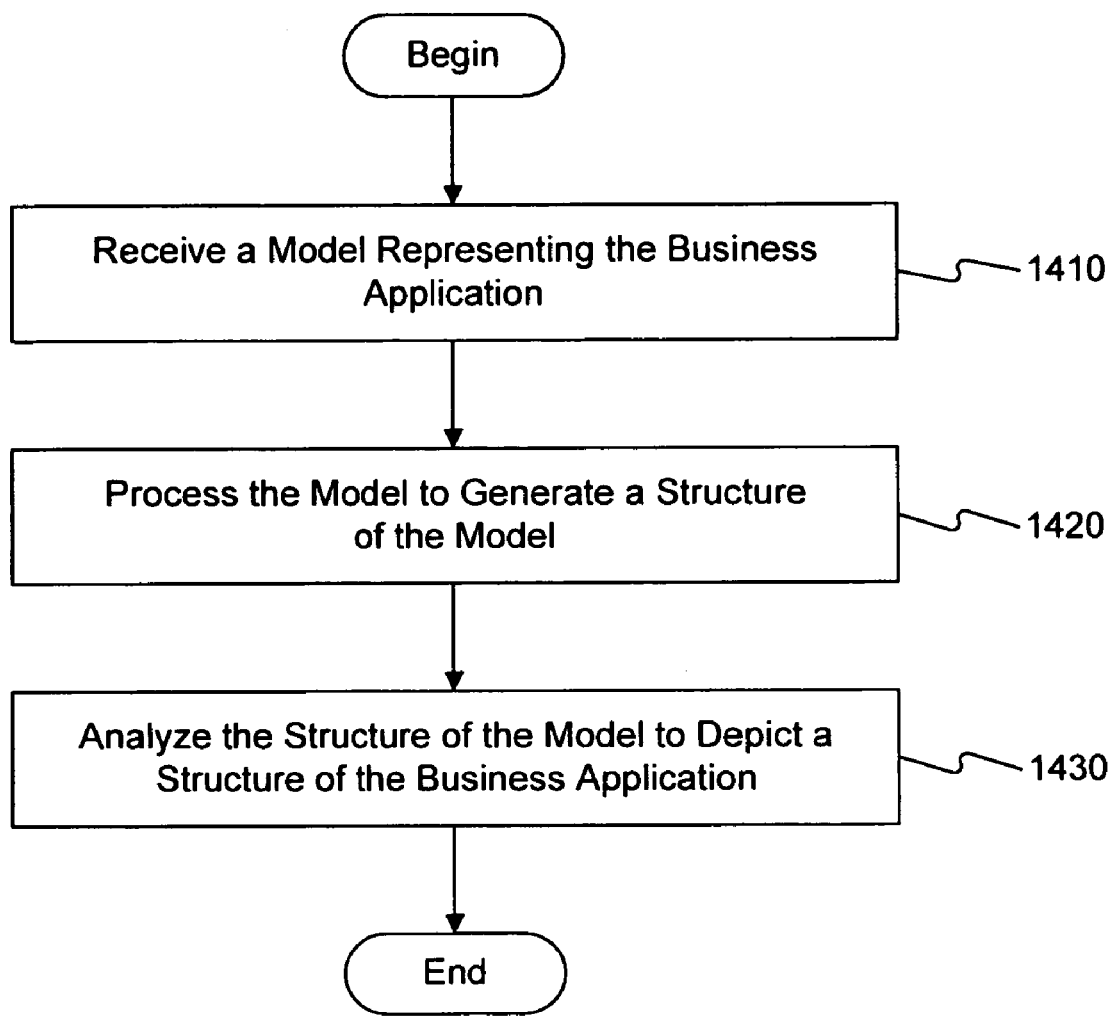

FIG. 14 is an exemplary flowchart of a process for analyzing and verifying an application configuration using CASE tools. In certain embodiments consistent with the present invention, a business application composed in a first programming format is analyzed by receiving a model representing the business application in a second programming format (step 1410). The first programming format may be, for example, a table-based format, and the second programming format may be, for example, an object oriented programming format. The model is then processed using CASE tools to generate its structure, including, for example, the structure of the business application configuration data and rules (step 1420). In another example, processing may include generating a diagram of the model's object classes which represent logic entities within the business application. The generated structure of the model may be analyzed to depict a structure of the business application (step 1430).

In certain embodiments, a table-based business application is represented by an object-oriented programming model. Because the model appears to contain object-oriented code statements, traditional CASE tools may be applied to it for a number of purposes, such as designing new structures (e.g., business application rules), testing proposed changes (e.g., a new tax category in the business application), and simulating a business application run (e.g., an end-of-month payroll run in the business application). Once these CASE tools have been applied to the model, the results can be applied back to the business application to make appropriate modifications to the business application.

Comparing and Merging Business Applications

Large, complex legacy systems require almost constant updating and maintenance to keep up with the changing business environment. These changes may include, for example, software patches fixing technical glitches or improving the usability or the performance of a business application; new code to support changing business rules or evolving user needs, etc. For example, changing tax laws in one of the countries in a payroll business application may require changing many business rules within the application. Each change to a business application may affect many logic entities within the business application, possibly changing an outcome, for example, an amount of calculated payroll.

Traditional table-based business applications do not have any simple mechanism for modeling changes or identifying changes between different versions of a business application. A user attempting to compare two different versions of a business application and identify, for example, different tables or differences in a code, would have to compare each business rule separately, one by one. Because the business application is large and complex, this process may be extremely time-consuming and require a user with extensive training. Even then, small but important changes may be hard to recognize in a large table-based application.

Methods and systems consistent with the present invention allow a user to compare different versions of a business application using a model of the business application. By transforming business application structures into structures, such as object-oriented language constructs, individual differences between versions of the business applications may be identified and displayed to a user, for example, on a user interface.

To aid users in identifying differences between different versions of a business application, multiple versions of a business application configuration may be stored in a database, such as a configuration control database like CVS. Each version of a business application may be stored in a configuration control database as a transformed corresponding object-oriented structure.

Using methods and systems consistent with the present invention, to compare an updated version of the configuration of a business application with its previous versions, a user may extract the latest control version of a model of the application from a configuration control database. Then, a user may extract the latest deployed version of a business application from a server database containing the deployed version of the business application, including recent updates, such as, for example, patches. The extracted deployed version may be transformed into a corresponding object-oriented structure. Finally, the user may extract a version of the business application including user-made current changes from the user's storage space. The models of the business application may be capable of autonomous existence from the business application. Having all three versions represented in an object-oriented structure may allow a user to perform a three-way comparison between the object-oriented structure edited by the user and two retrieved versions copied from the configuration control database and the deployed server database.

Using methods and systems consistent with the present invention, a user may automatically compare all three versions of the business application model in a visually enabled mode by, for example, selecting a "Show Changes" button. As a result, business objects, for example, wage types, that differ between the three configurations may be displayed on an user interface marked with an icon to show where changes have been made. In one example, an icon may be shown to highlight each change and list values of the business object before and after the change.

Comparing the structures of the model's three different versions, object-by-object, may allow a user to identify, for example, configuration data (e.g., wagetypes), business rules, schemas, and other logic entities where changes have been made. In each instance, a user may choose a value of the business object for preservation and subsequent storage as a new version of the business application model. Thus, as a result of the three-way comparison, a new version of the object-oriented structure may be created containing a user's chosen values for each business object.

When a user completes the three-way comparison and decision process, the newly-created version of the model may be transformed into a newest version of the business application. That version may also be tagged as the "latest" and forwarded to a configuration control database for storage and/or to a target business system for deployment.

Figure 15:
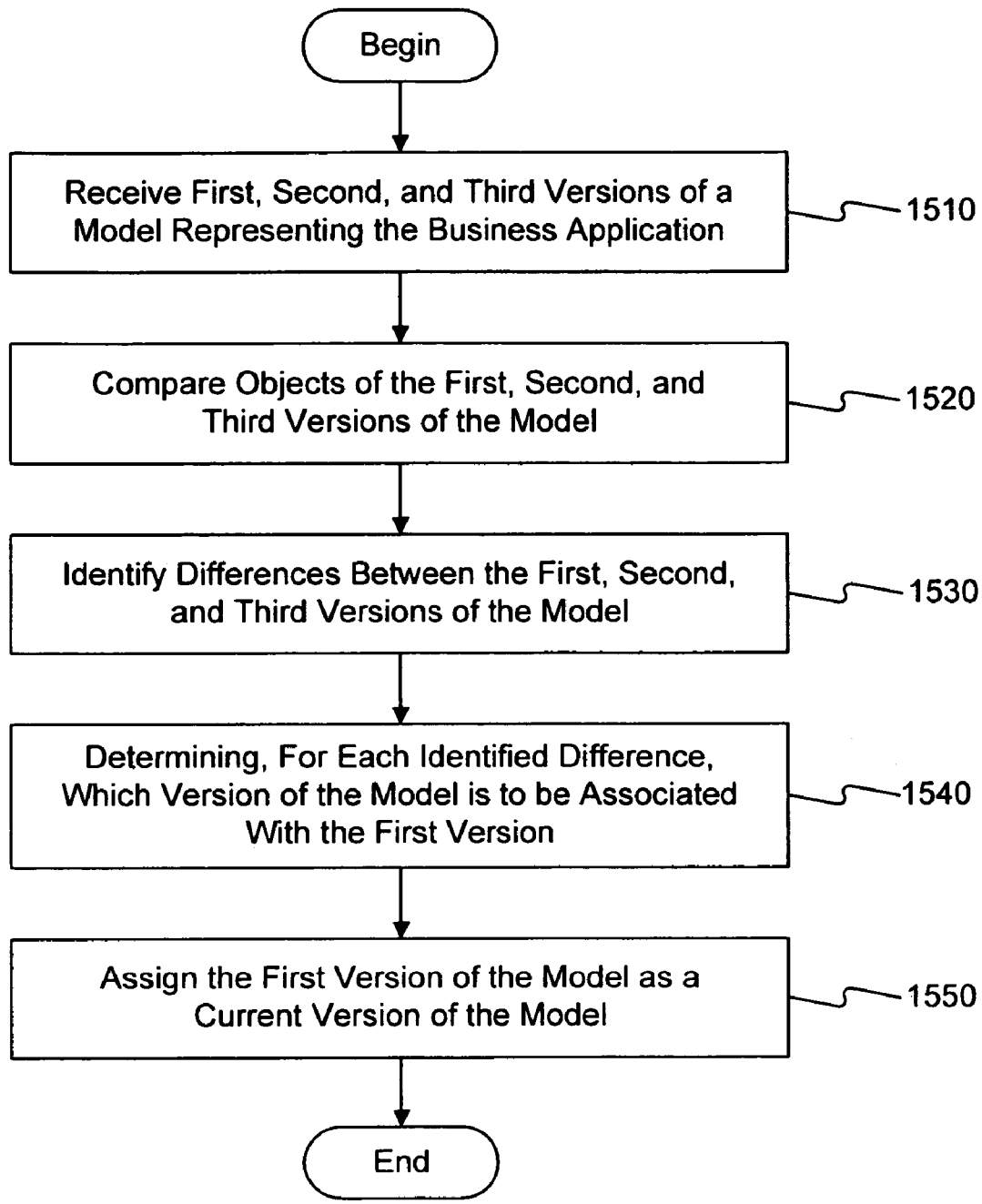

FIG. 15 is a flowchart of a process for comparing and merging versions of a business application using methods consistent with the present invention. A current version of a business application is determined by receiving a first version, a second version, and a third version of a model, such as an object-oriented programming model, representing the business application (stage 1510). The objects of each of the first, the second, and the third versions of the object-oriented programming model are compared (stage 1520) to identify differences between any objects in these models (stage 1530). For each identified difference, a determination is made as to which version of the model is to be associated with the first version of the model (stage 1540). The first version of the model is then assigned as the current version of the model (step 1550). Using methods and systems consistent with the invention, the current version of the model may be translated back into the business application format, thus creating a current version of the business application.

Customer Support

As described above, OOP language tools, such as compilers, analyzers, optimizers, etc. can be used to find errors or problems in the configuration model of a business applications. Such errors or problems may include errors in relationships, calls, interactions, design, etc. associated with the modeled null functions.

Figure 16:
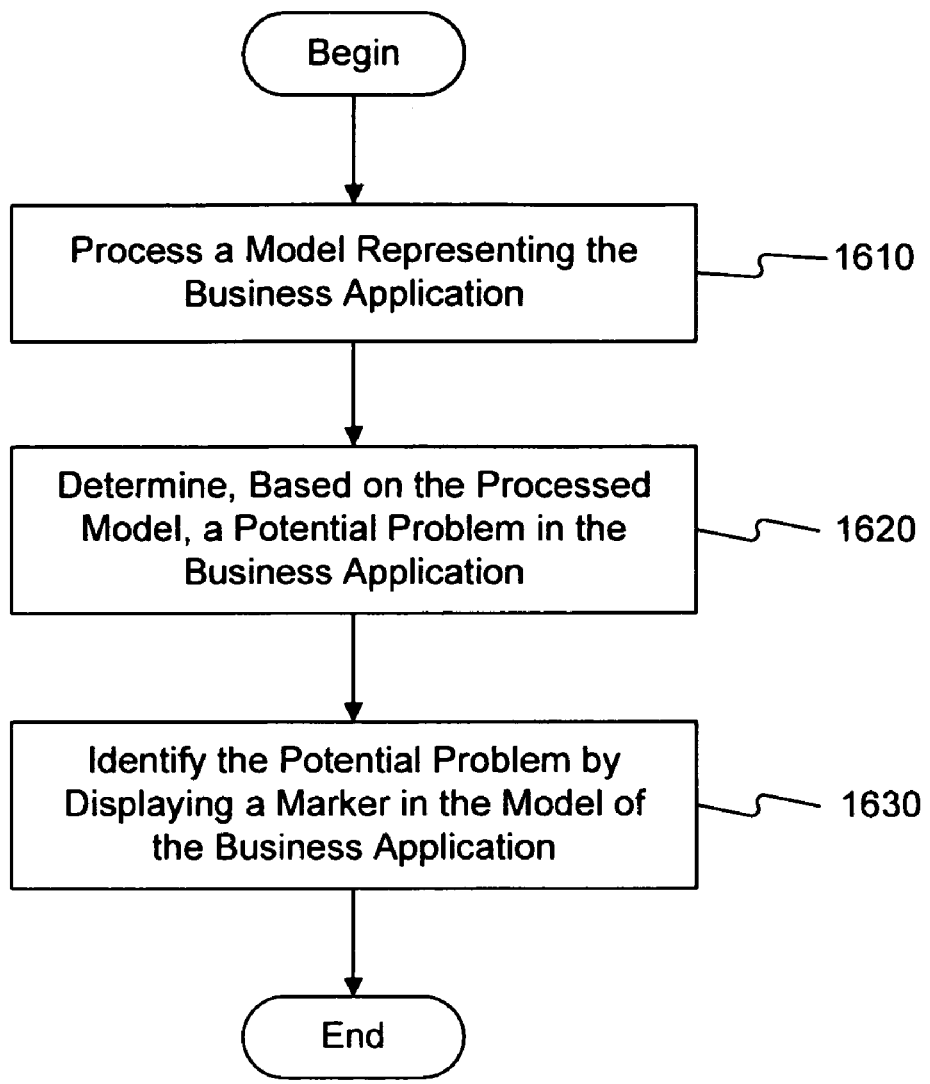
FIG. 16 illustrates an exemplary process consistent with the invention.

FIG. 16 is a flowchart of an exemplary process consistent with the present invention. As shown in FIG. 16, a model representing the business application composed in a second programming format is processed (stage 1610). Systems consistent with the invention may then determine, based on the processed model, a potential problem in the business application (stage 1620) and identify the determined potential problem by displaying a marker in the model of the business application (stage 1630). In exemplary embodiments, the marker may be displayed in the model at a location where the potential problem occurs. Furthermore, the displayed marker may be associated with information describing the determined potential problem.

User Interfaces

FIGS. 17 to 56 illustrate exemplary user interfaces consistent with the invention for enabling a user to process a model representing a business application, as described above with respect to FIGS. 1 to 16.

Consistent with methods and systems of the invention, a user interface displaying all the relevant information on one graphical and productive screen may be used. As shown in FIGS. 17 to 56, user interfaces consistent with the invention may enable a user to easily navigate within an object-oriented structure from one object to another. The user interface may provide an instant visual alert of a potential problem, for example, with a source code. The user interface may also provide an intelligent code assistance and wizards. For example, all the references to a selected object, such as a schema or a rule, may be instantly displayed facilitating an instant dependency analysis. In another example, a user interface may have superior error detection and reporting capabilities, such as instantly reporting errors or enabling a user to find an exact error location just after one click.

Consistent with methods and systems of the invention, a user interface shown in FIG. 17 illustrates auto-complete capabilities in an Integrated Configuration Editor (ICE) environment. As shown in FIG. 17, the user interface may list all the business objects and provides documentation for each of them. The user interfaces may depict grouping of the projects in ICE environment. The integrated configuration environment may include, for example, a series of windows displaying business application entities as a hierarchy of projects, rules, and schema. The environment may also include a model, such as an object-oriented model of a business application object displayed together with documentation pulled from the business application.

Figure 18:
Figure 19:
Figure 20:
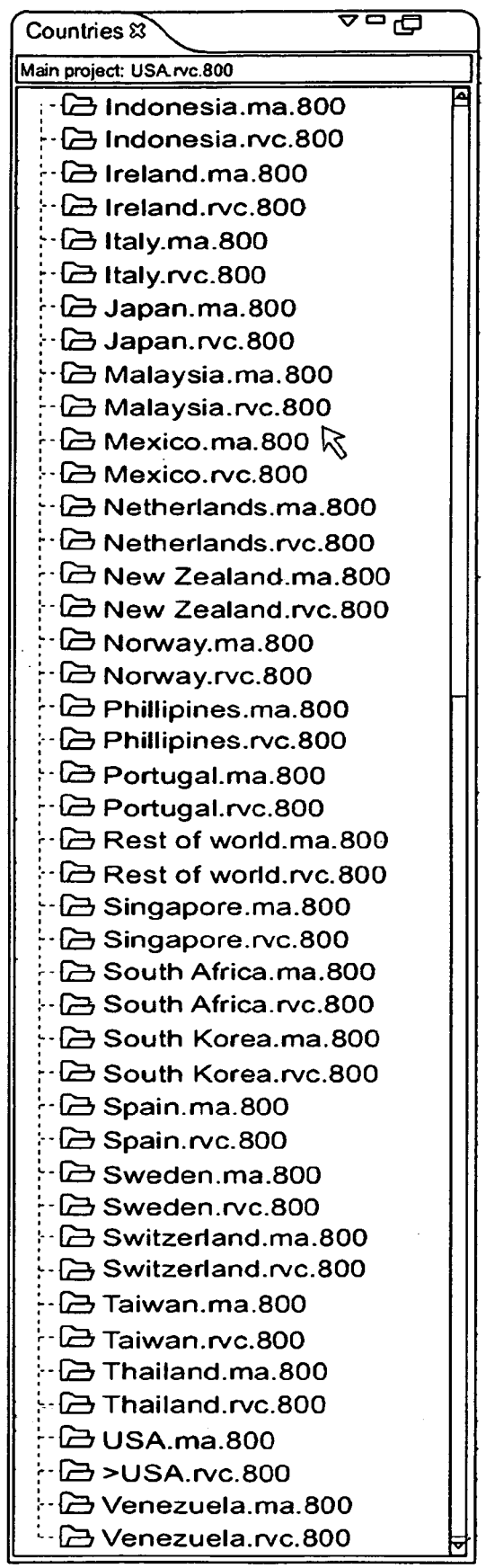

For example, FIG. 18 depicts grouping of the projects defined by a country, and FIGS. 19 and 20 depict grouping of the projects defined by a system and a client, respectively, which has the least possible amount of attributes allowing to enforce uniqueness for all managed objects within a project. For example, using three attributes as the minimum set of attributes to define uniqueness, as shown in FIG. 19, may allow the system to rearrange attributes and build hierarchies with better workspace organization. The user interface shown in FIG. 20 may depict a linear project layout when all key attributes are shown in a project name. A little block with a cross inside appearing next to a project type may indicate an existing potential problem or an error. For example, a block next to Germany on FIG. 18, may indicate that an error in object "Germany" exists.

Figure 21:
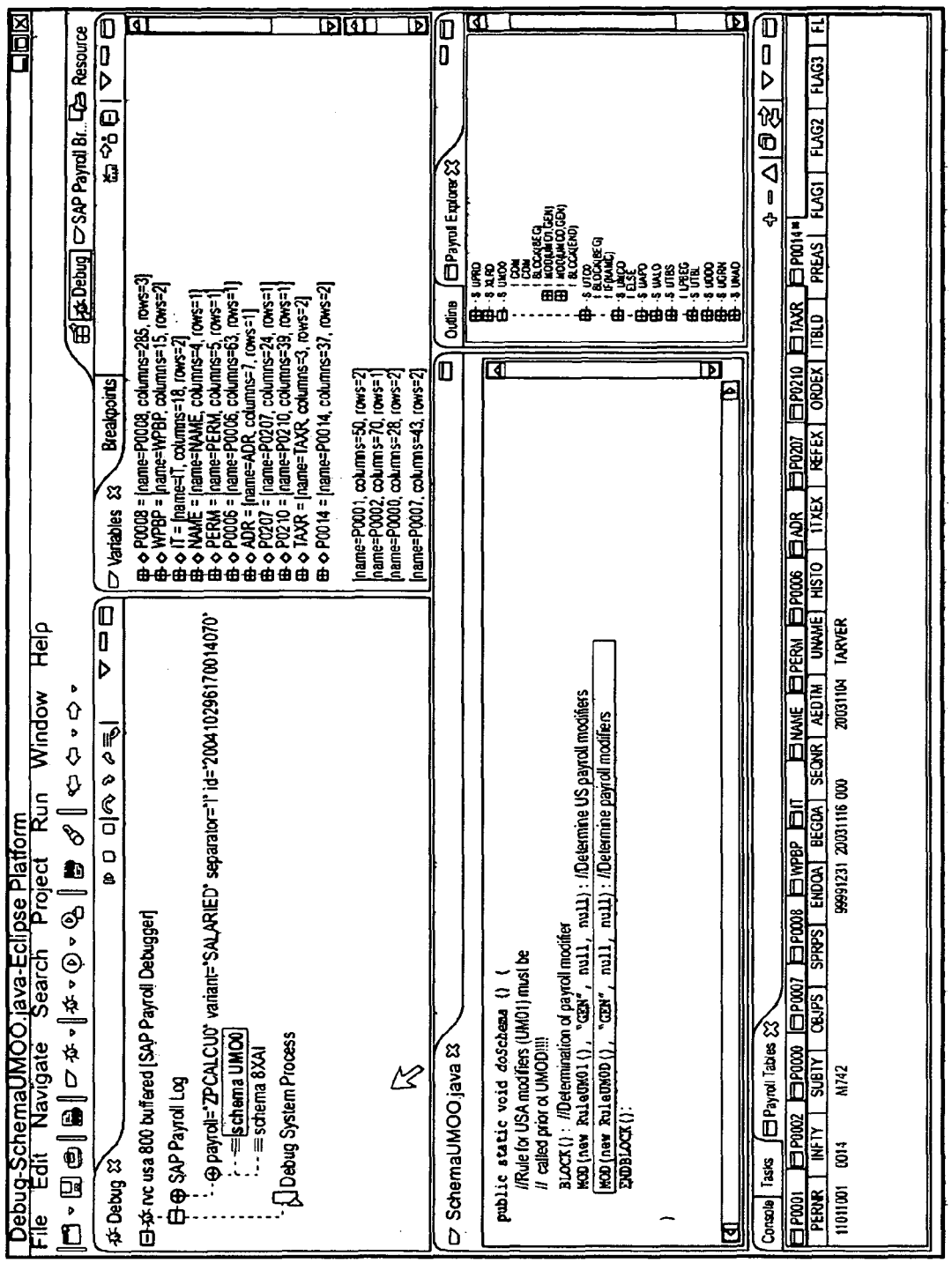

Consistent with methods and systems of the invention, a user interface shown in FIG. 21 may depict an offline debugger or log replay. Having an ability to see this screen may allow a user to look at dynamic and static views of payroll tables, full view of payroll steps, a source code displayed at a current execution point, and debugging controls.

Figure 22:
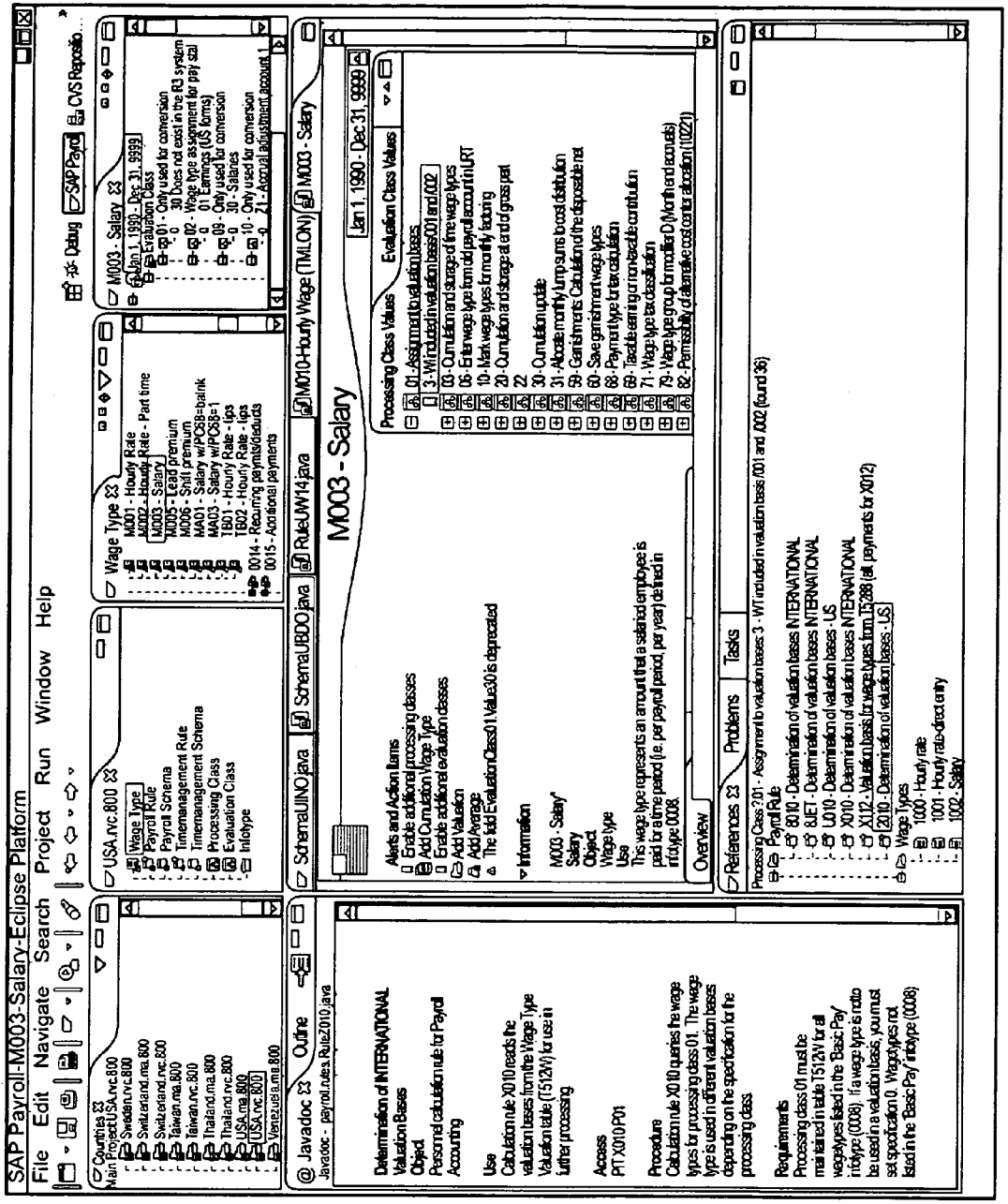

Consistent with methods and systems of the invention, a user interface shown in FIG. 22 may depict inter object relationships within a project. For example, a user highlighting processing class with value M003, such as salary wage type, may result in displaying different rules referenced to that wage type.

Figure 23:
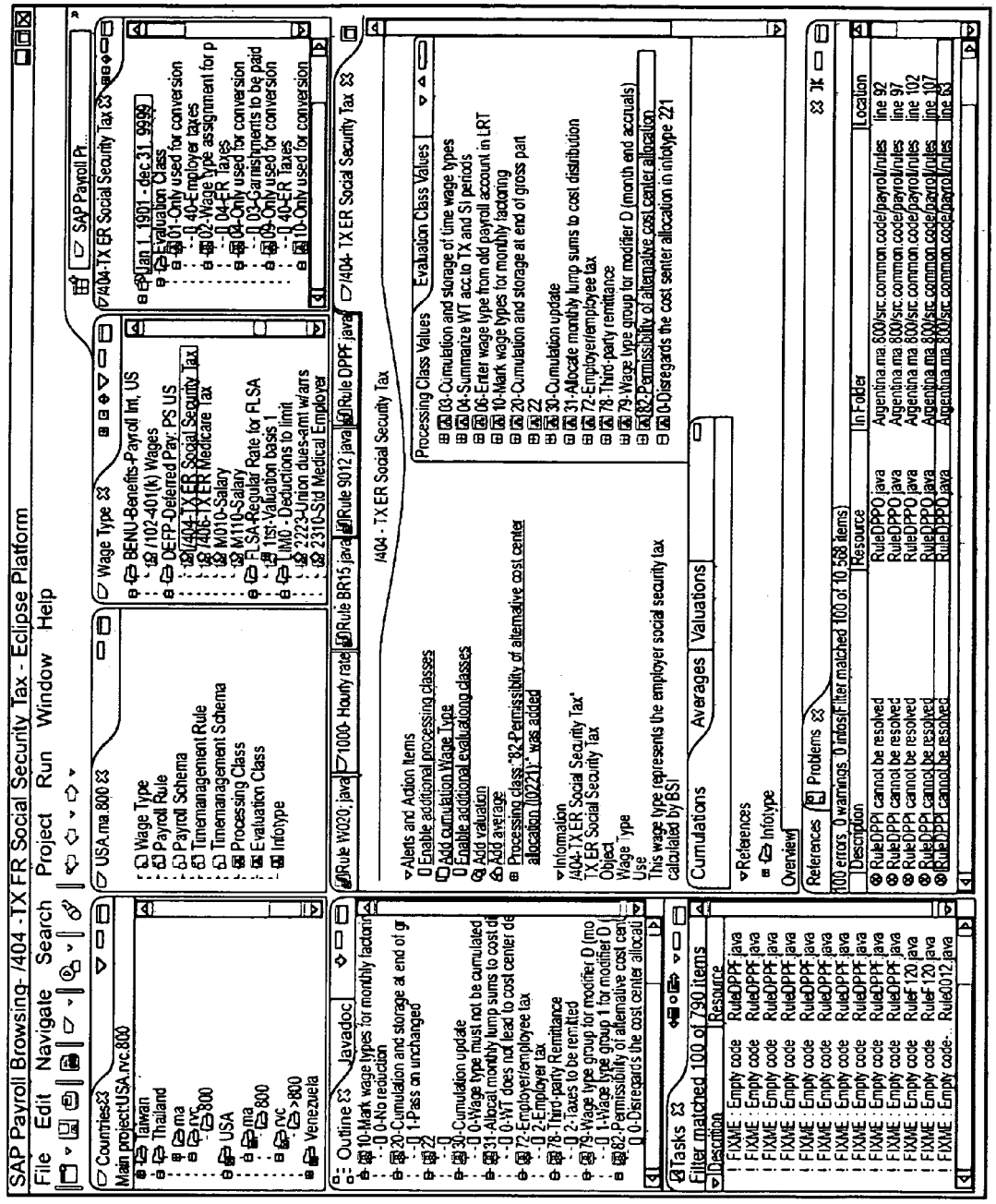

Consistent with methods and systems of the invention, a user interface shown in FIG. 23 may depict one or more problems or errors encountered when business application structures are transformed into structures. If during the conversion an error occurred, the error may be marked as a task for the user to fix. For example, if the user typed in an invalid syntax in a "RuleDPPF.java" module, a task of "Empty code" is listed for the user to fix along with a complete description of the error, which in this example is that "RuleDPP1 cannot be resolved."

Figure 24:
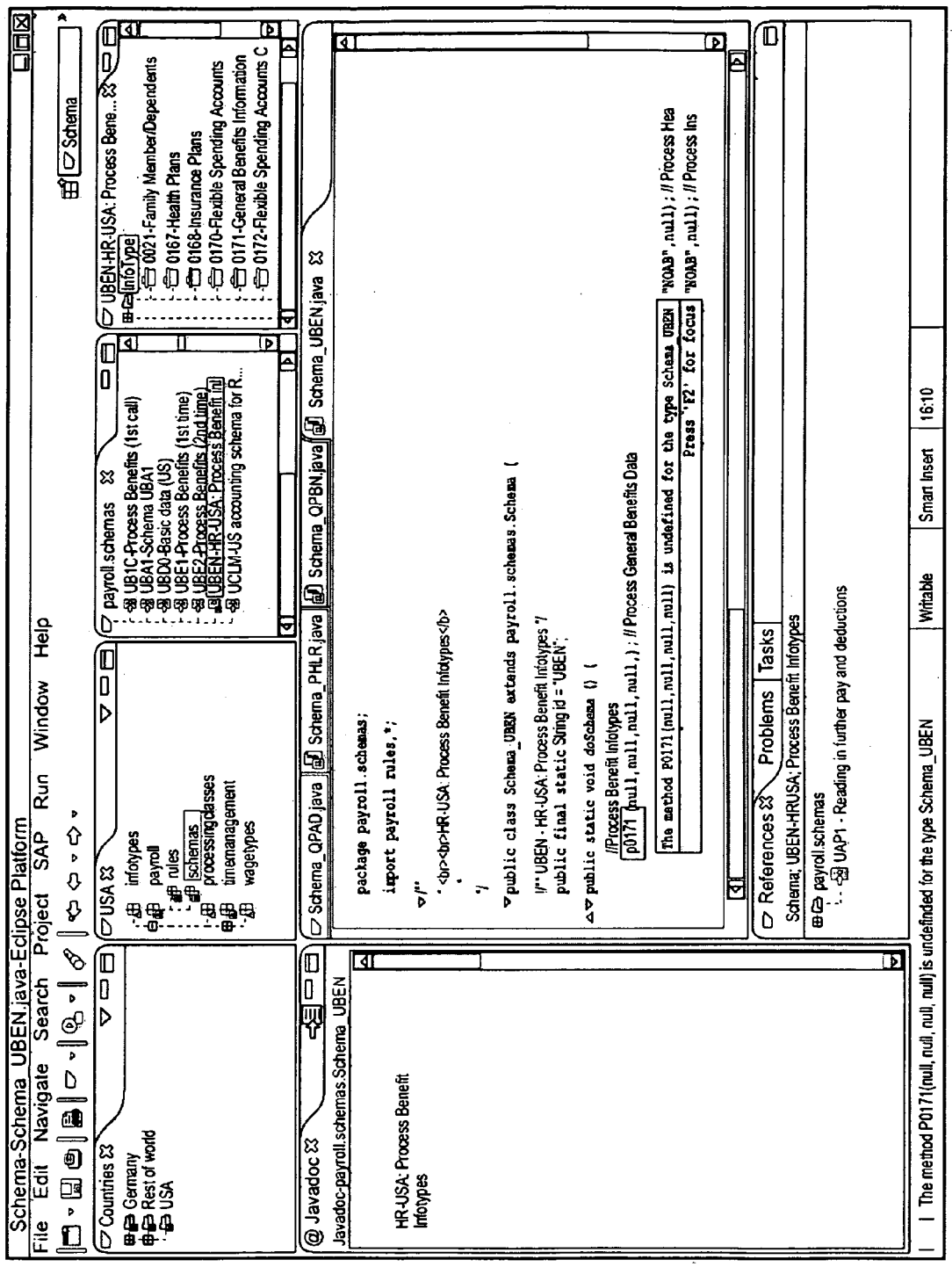

Consistent with methods and systems of the invention, a user interface shown in FIG. 24 may depict, in greater detail, one or more problems, or errors, encountered when business application structures are transformed into structures. If in FIG. 23 a user double clicks on a error, the schema where the problem exists is displayed for the user and the portion of the schema with the error is highlighted. When a cursor is placed above the marker, a pop-up box may show the details of the error. For example, the user may be notified that the method P0171 is undefined.

Consistent with methods and systems of the invention, a user interface shown in FIG. 25 may depict all the errors encountered in when business application structures are transformed into structures. Each error may be indicated by a marker (here a rectangular flag) on the far right of the user interface identified by a code debugger applied to the model. When a cursor is placed above the marker, a pop-up box may show the details of the error, and a click on the marker takes the user to the exact location of the error within the schema. For example, in the schema "RuleW020.java," errors are indicated by the marker on the right side of the screen. If a user places a cursor above the marker indicating the error, the details of the error "RuleWRFI cannot be resolved" is shown.

Figure 26:
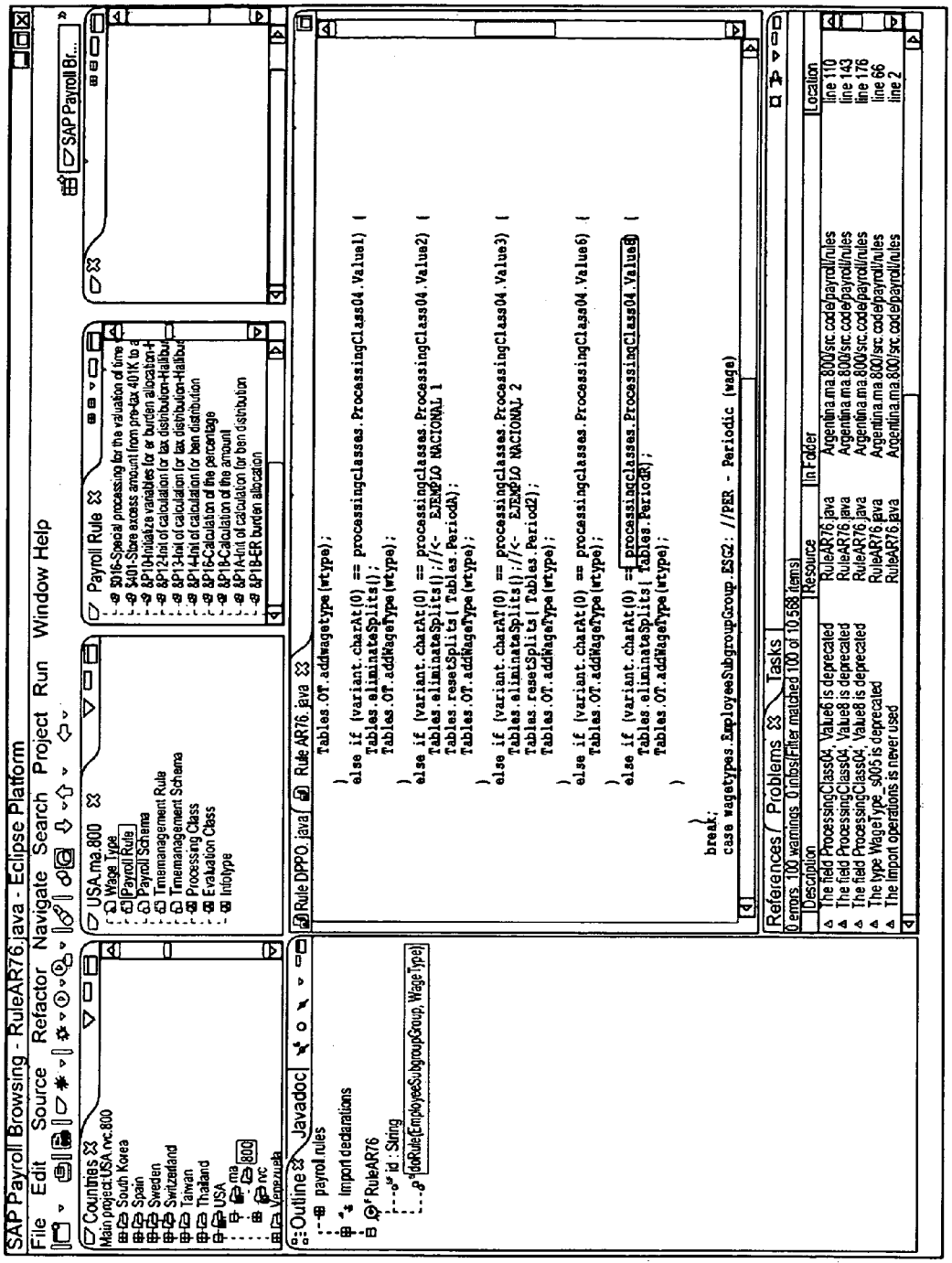

Consistent with methods and systems of the invention, a user interface shown in FIG. 26 may depict one or more warnings encountered when business application structures are transformed into structures. A warning may consist of informing a user that a part of a module may be referencing a rule or value that is no longer used by the system. The warning is not an error and will not stop the conversion of the R3 structures to the Java structures. For example, if within a module a variant is checked to determine whether it equals a certain value, i.e., "processingclasses.ProcessingClasses04.Value8," the system may inform the user that "The field ProcessingClass04.Value8 is deprecated," in other words, ProcessingClass04.Value8 may not exist or is no longer used within the system.

Consistent with methods and systems of the invention, a user interface shown in FIG. 27 may also depict a problem, or error encountered when business application structures are transformed into structures. The error is marked as a task for the user to fix with a description being given under the "Problems" tab. For example, the error of "empty code" is listed as a task for the user in the module "RuleDPPF.java" and the description of the error is that "Rule9112 cannot be resolved." Rule9112 may also be highlighted in the user interface.

Figure 28:
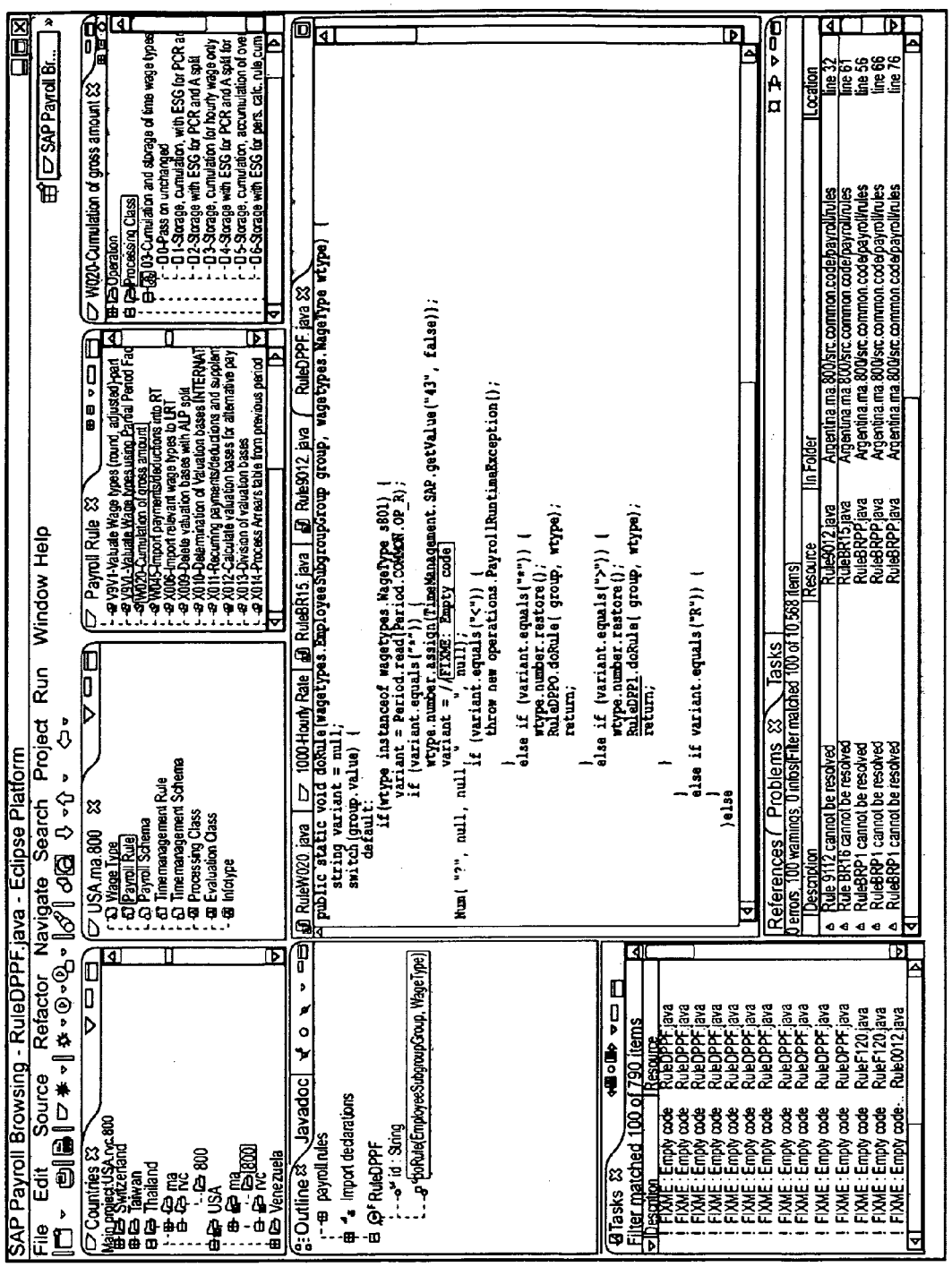

Consistent with methods and systems of the invention, a user interface shown in FIG. 28 may further illustrate details associated with a problem, or error encountered when business application structures are transformed into structures where a rule in the transformation may not produce any result. For example, if the user clicks on the description of the error, the user may be directed to the portion of the "RuleDPPF.java" schema where the error occurred. In this example, a variable "variant" is set equal to nothing; therefore the user may have to enter a value to resolve the error.

Consistent with methods and systems of the invention, a user interface shown in FIG. 29 may also depict all the problems or errors when business application structures are transformed into structures in one view. Each errors may be indicated by a marker on the far right of the user interface. When a cursor is placed above the marker, a pop-up box may show the details of the error. If a user clicks on the marker, the user is taken to the exact location of the error within the schema. For example, in the schema "RuleW020.java," there are problems indicated by the marker on the right side of the screen. If a user places a cursor above the marker indicating the problem, the details of the problem "RuleWRFI cannot be resolved" is shown.

Figure 30:
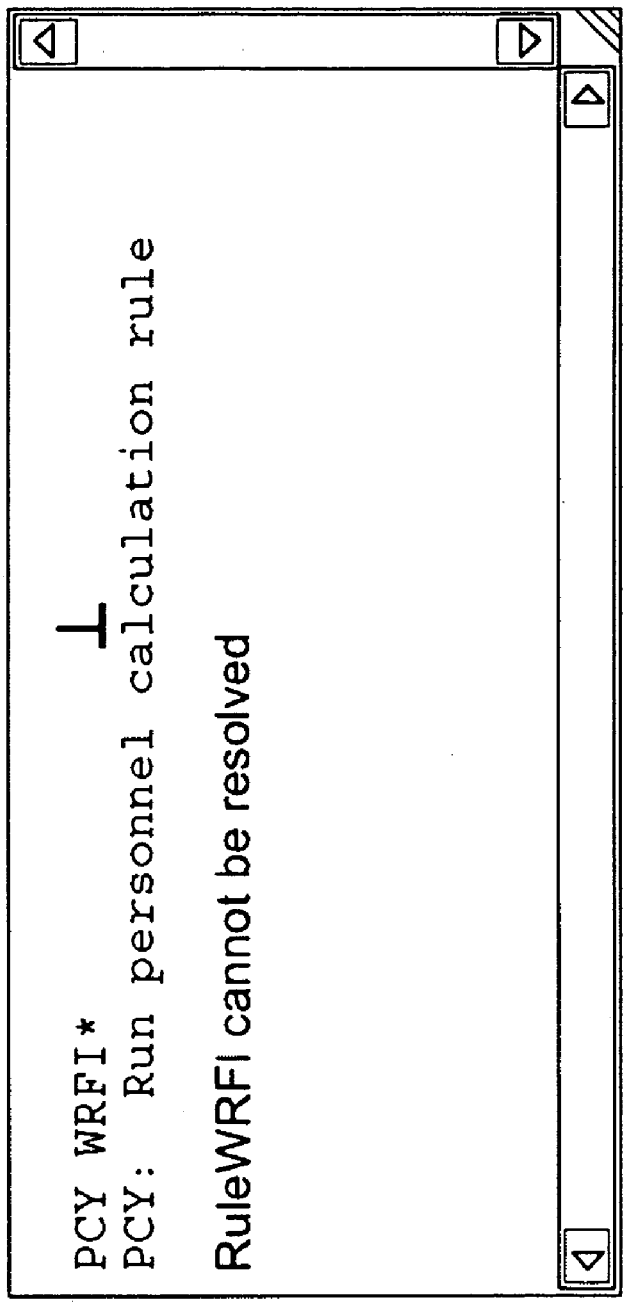

Consistent with methods and systems of the invention, a user interface shown in FIG. 30 may depict the object-oriented structure that has encountered an error during the transformation of the business application structures into the structures, and give a description of the error.

Consistent with methods and systems of the invention, a user interface shown in FIG. 31 may depict one or more evaluation classes within a project. A user may select an evaluation class business object, such as evaluation class 02, "Wage type assignment for pay statement," as shown in the upper center right pane with the tab labeled "Evaluation class." By processing the OOP object model of the business application using common OOP tools and methods, the system finds and displays all the business objects that are related to or reference the selected "Wage type assignment for pay statement" evaluation class 02 object, as shown in the bottom right hand pane with the tab labeled "References."

Figure 32:
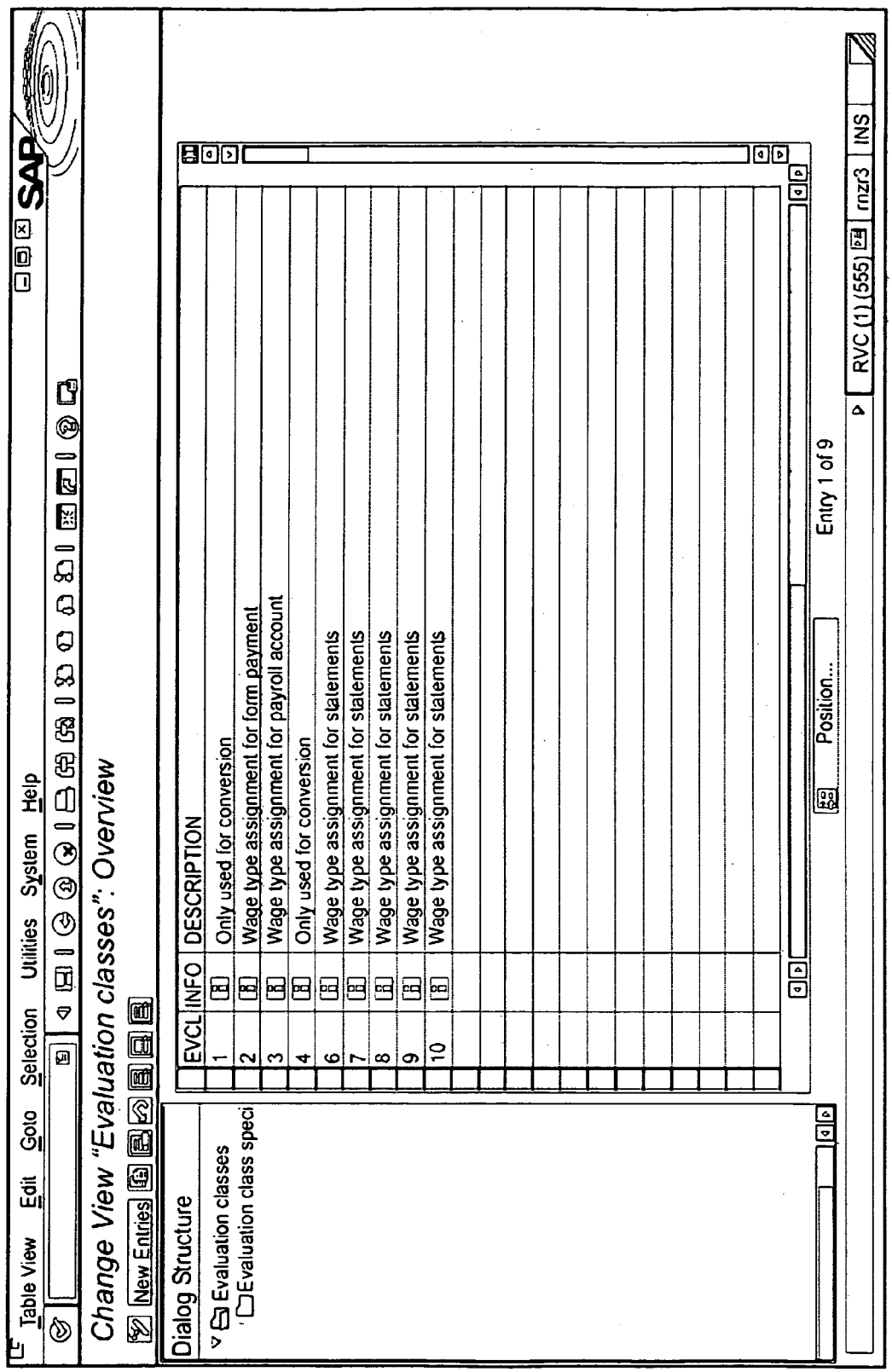

Consistent with methods and systems of the invention, a user interface shown in FIG. 32 may depict an Evaluation class within a project in an R/3 view.

Figure 33:
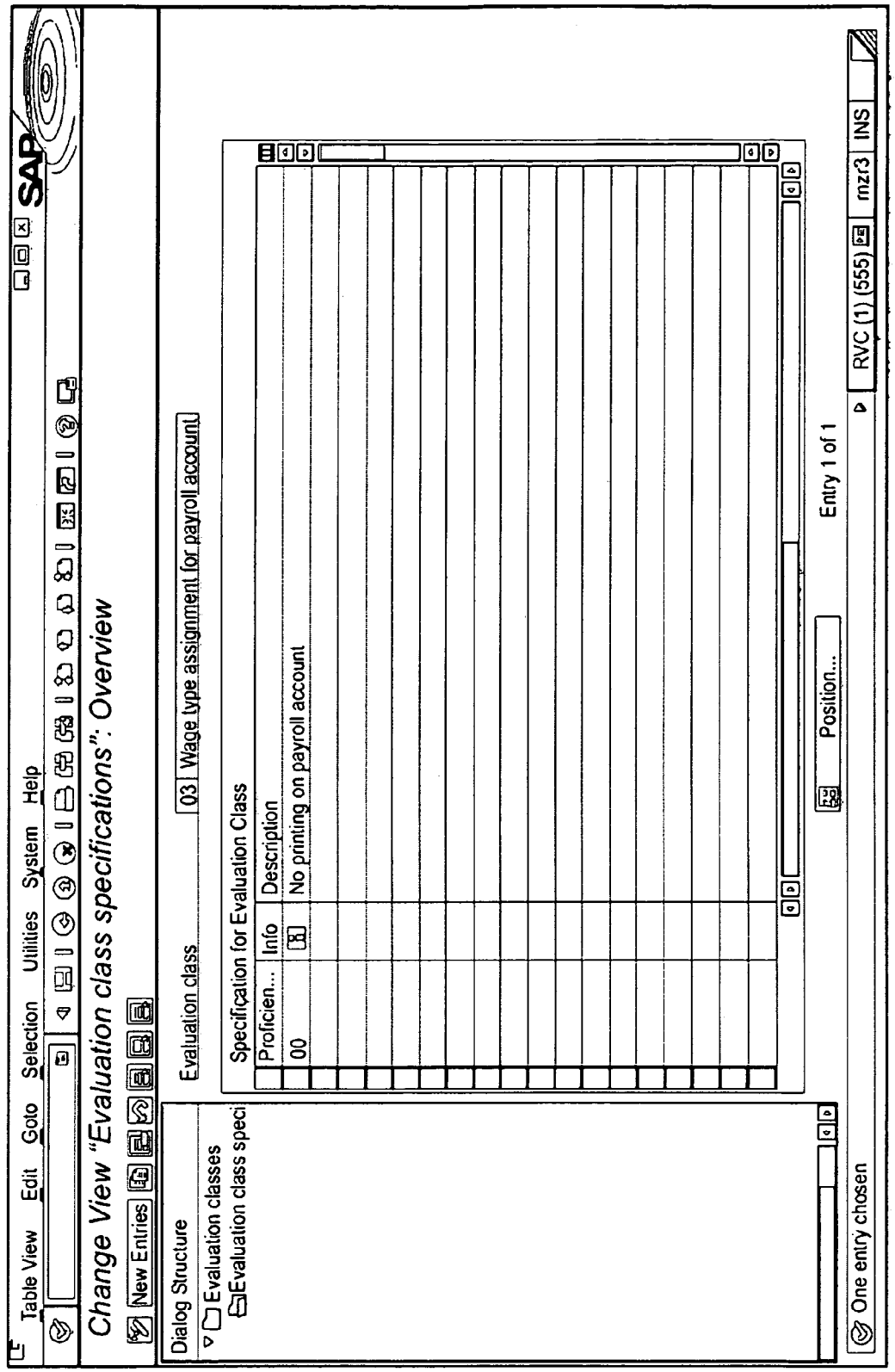

Consistent with methods and systems of the invention, a user interface shown in FIG. 33 may depict the specifications for an evaluation class business object such as an Evaluations class within a project in an R/3 view. For example, a user interface may depict the specifications of Evaluations class "Wage type assignment for payroll account."

Figure 34:
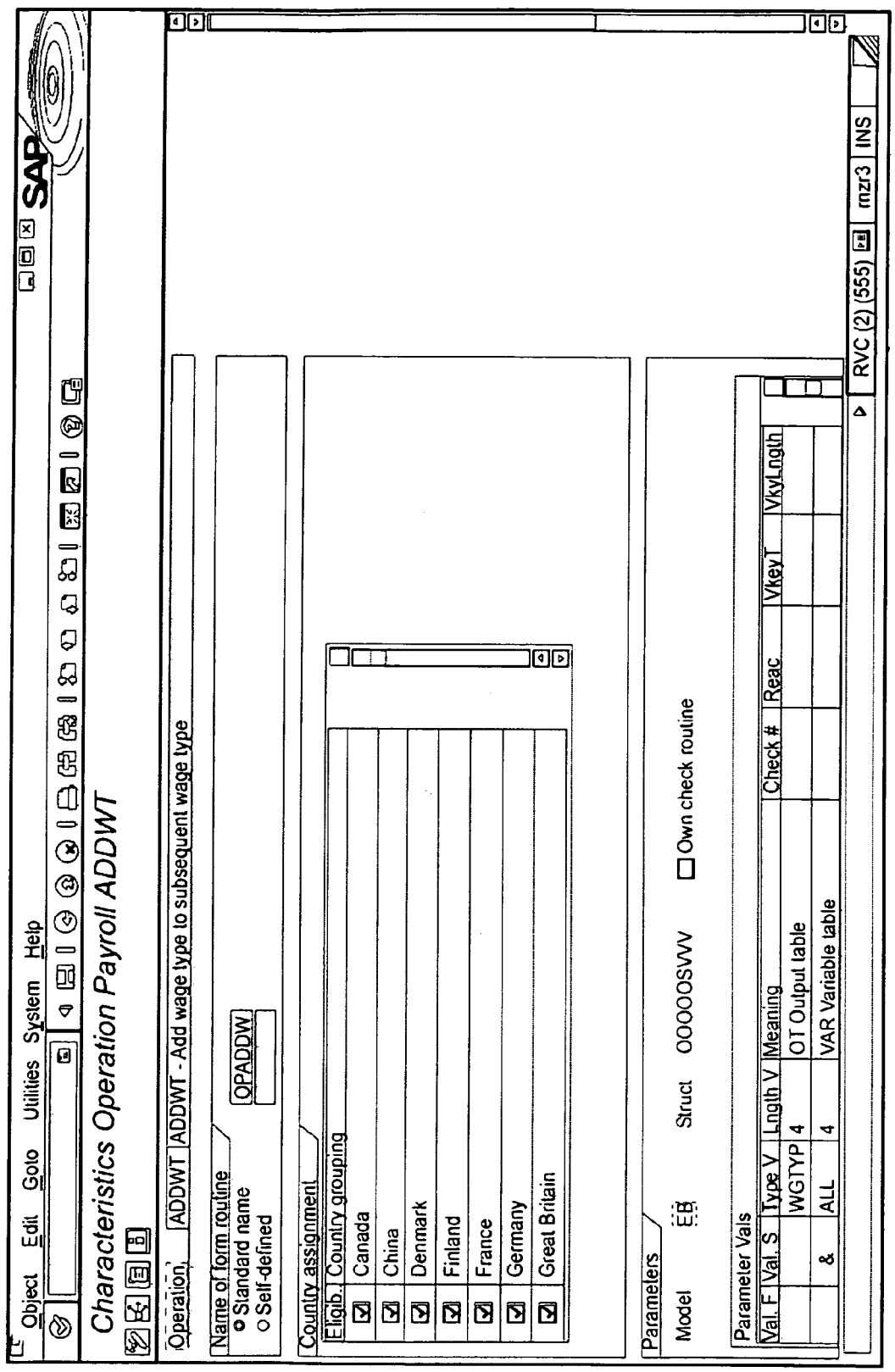

Consistent with methods and systems of the invention, a user interface shown in FIG. 34 may depict a screen where one or more operations are defined for one or more countries in an R/3 view. For example, the operation "ADDW Add wage type to subsequent wage type" may be defined for Canada, China, Denmark, Finland, France, Germany, and Great Britain. FIG. 35 is another user interface consistent with an embodiment of the invention.

Figure 36:
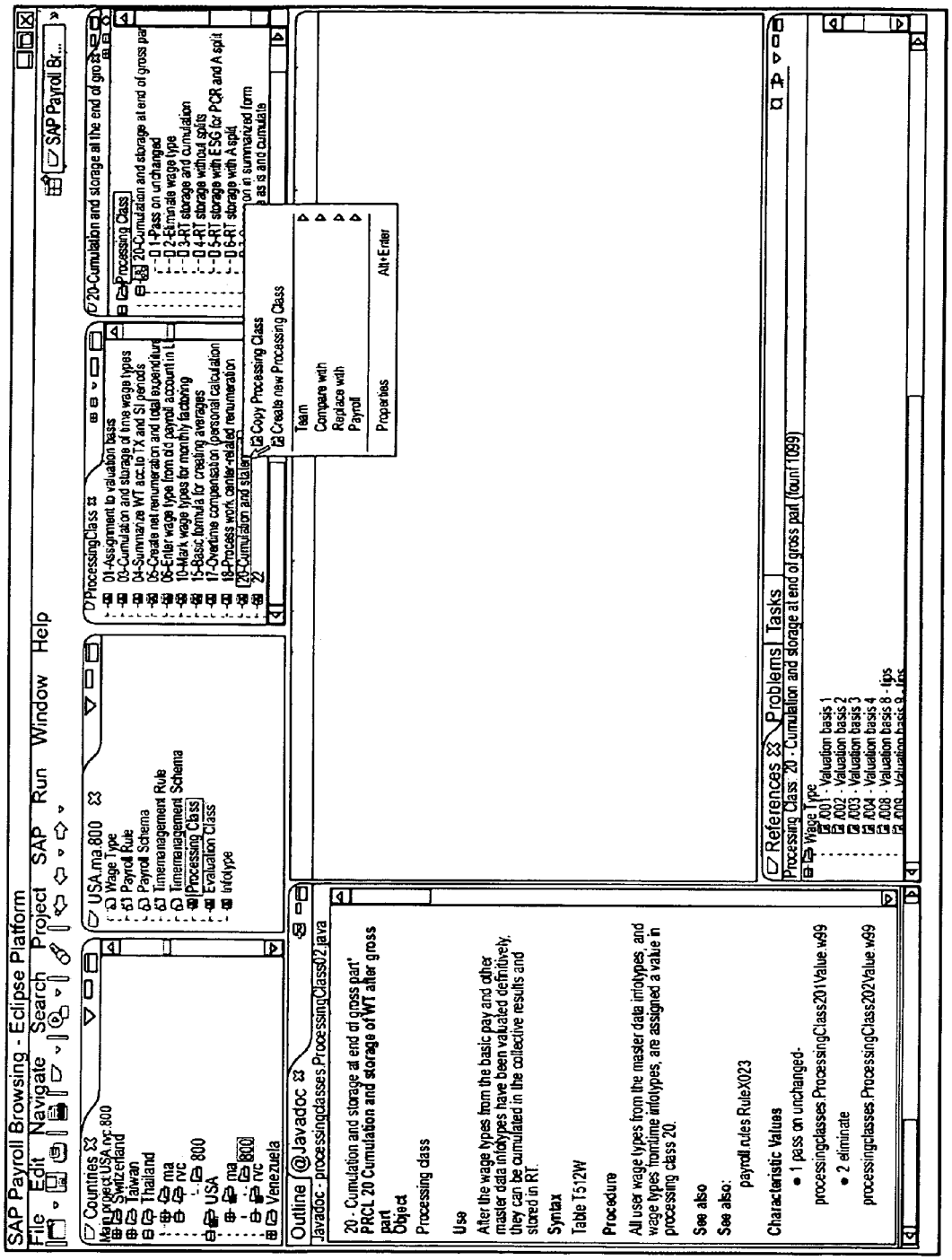

Consistent with methods and systems of the invention, a user interface shown in FIG. 36 may depict one or more processing classes within a project, and the various operations that can be performed on each processing class is also depicted. For example, the processing class "Cumulation and storage at end of gross part" is shown in the user interface, and with a right click on that processing a menu is shown where a user may choose from one of many options such as "Copy Processing Class."

Figure 37:
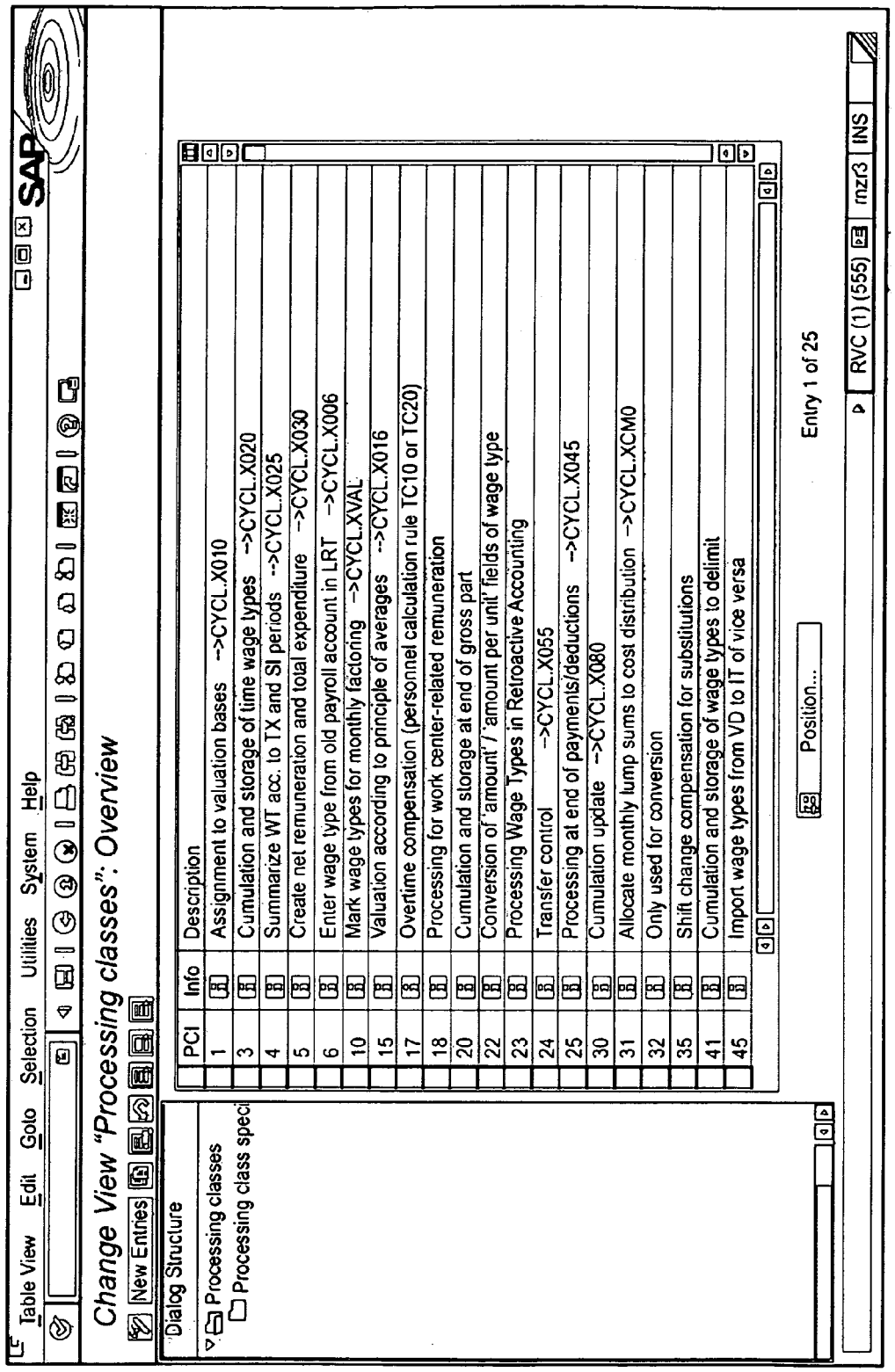

Consistent with methods and systems of the invention, a user interface shown in FIG. 37 may depict a Processing class within a project in an R/3 view.

Figure 38:
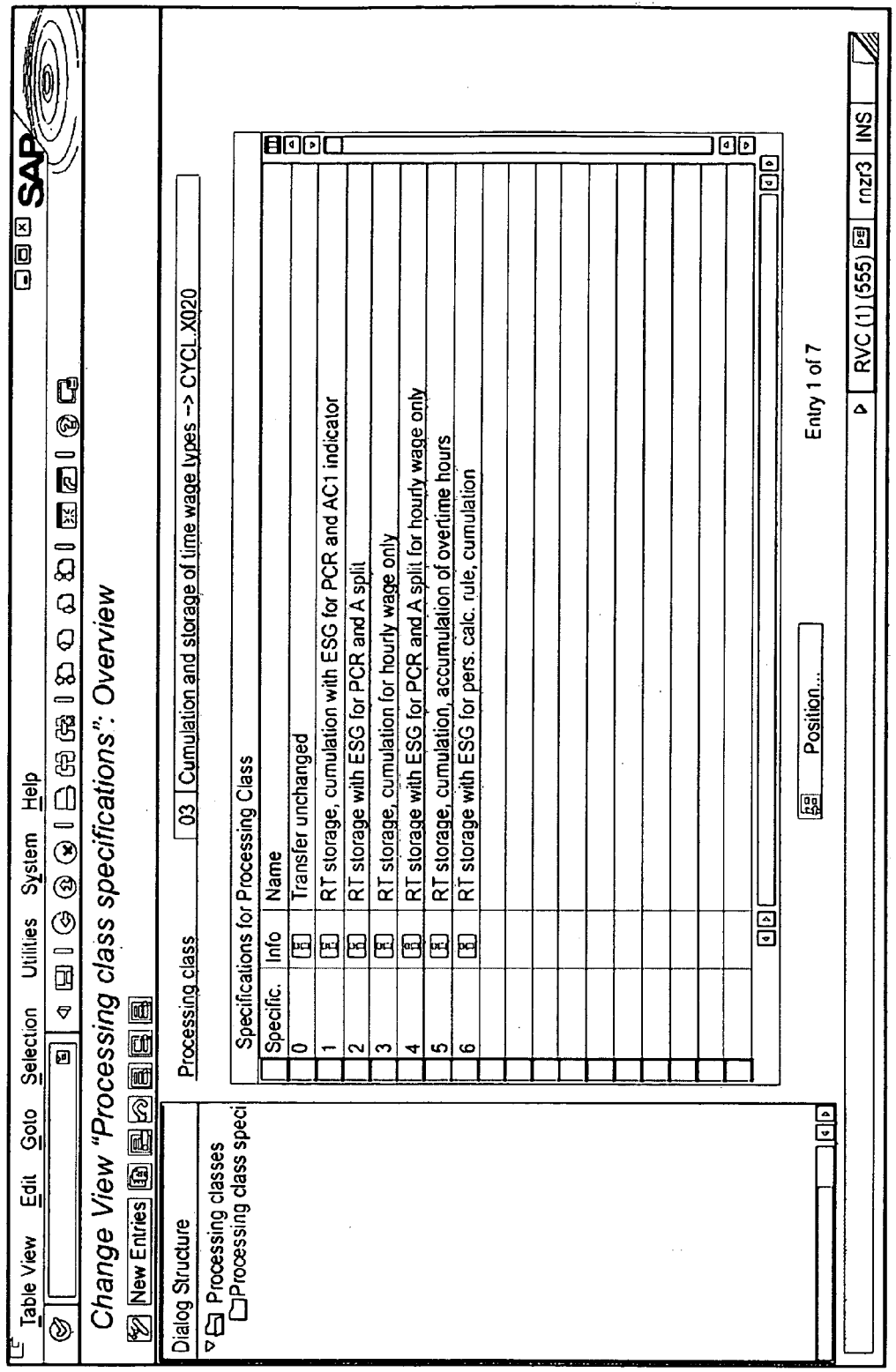

Consistent with methods and systems of the invention, a user interface shown in FIG. 38 may depict the specifications for a Processing class within a project in an R/3 view. For example, a user interface may depict the specifications of Processing class "Cumulation and storage of time wage types."

Figure 39:
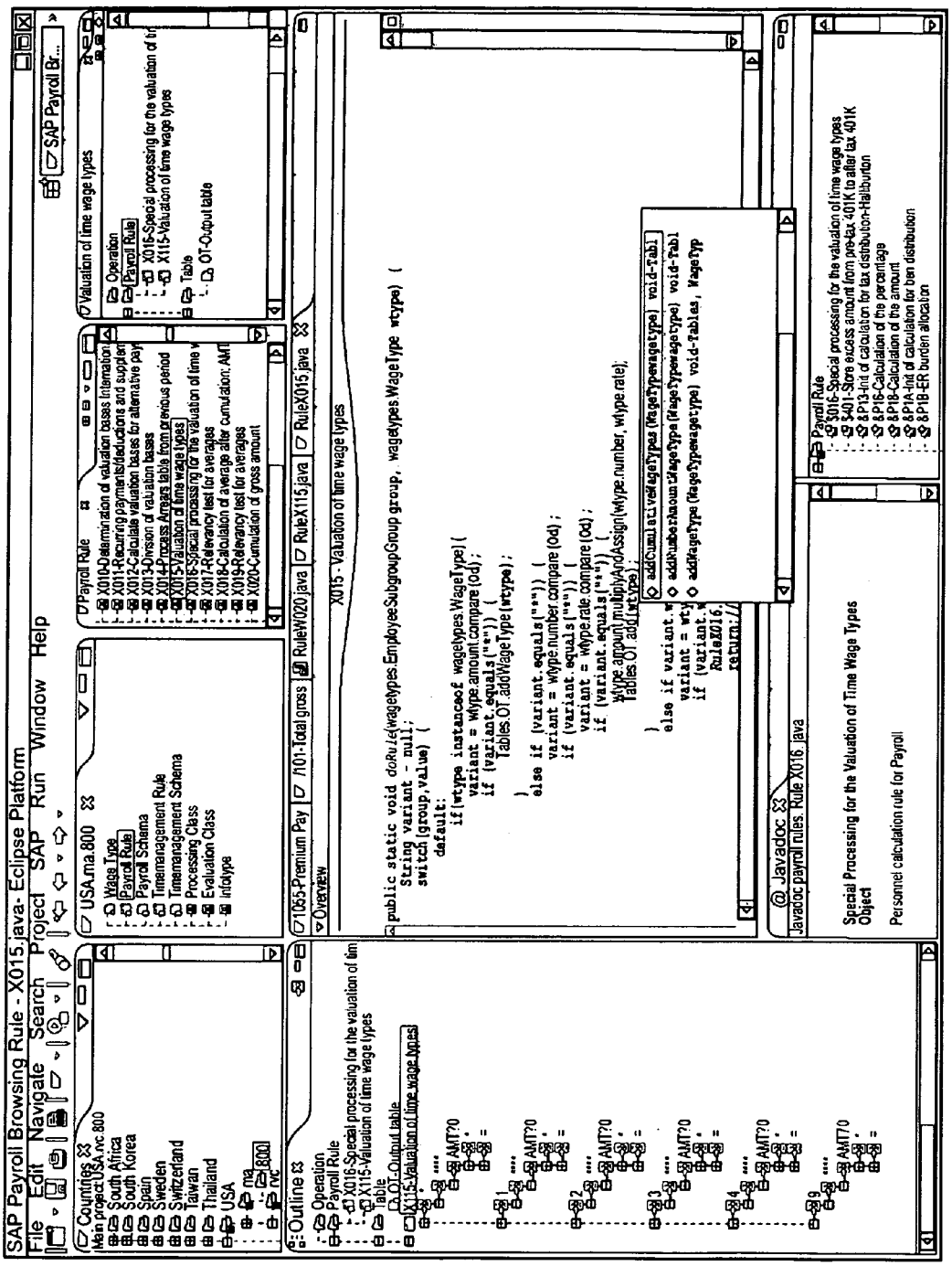

Consistent with methods and systems of the invention, a user interface shown in FIG. 39 may depict an R/3 outline view of a rule representation along with the converted object-oriented code. For example, for the Payroll Rule "X015—Valuation of time wage types" the business application outline is on the left hand side of the screen and the middle of the screen shows the converted object-oriented code for the same rule.

Figure 40:
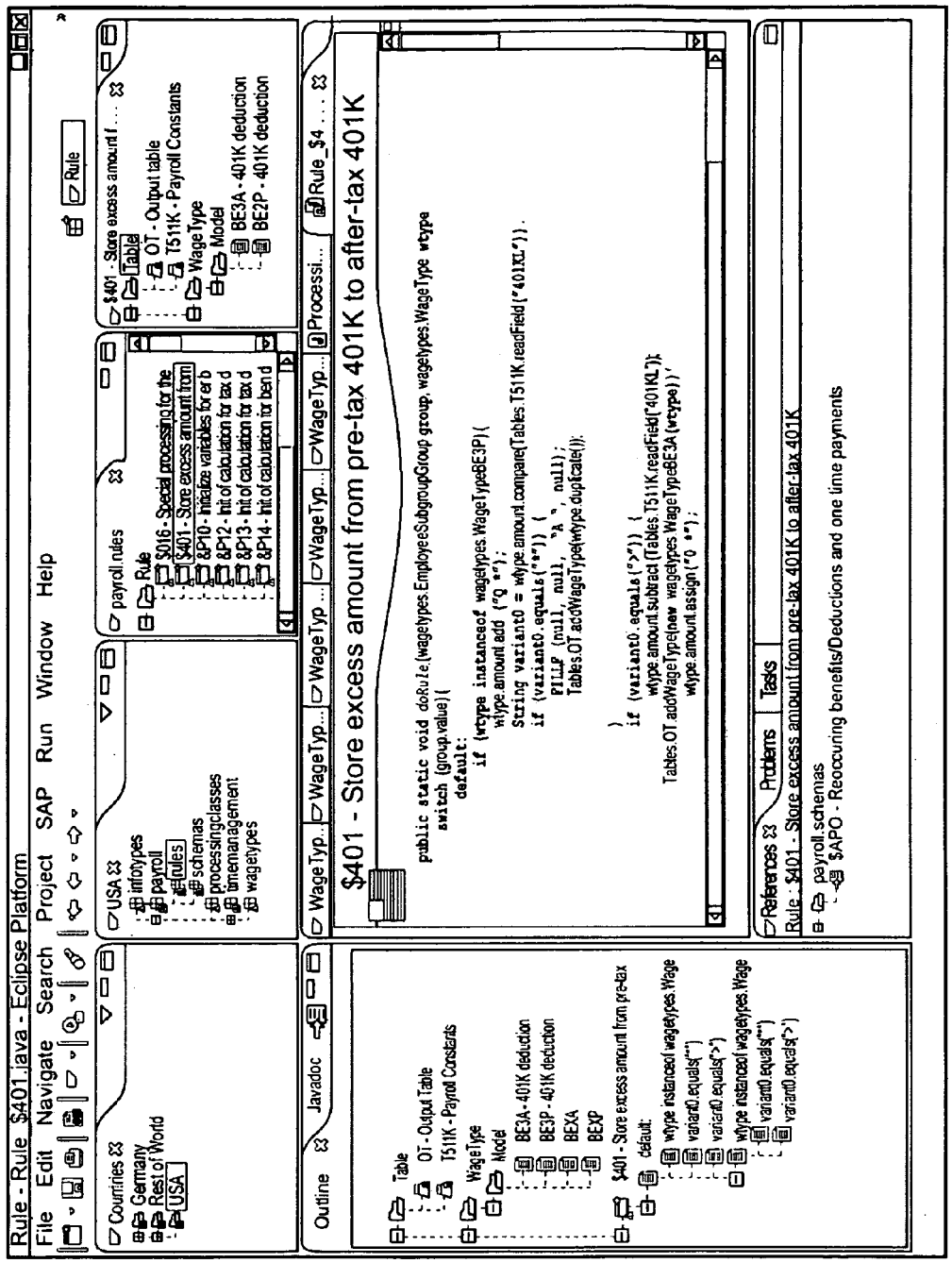

Consistent with methods and systems of the invention, a user interface shown in FIG. 40 may depict an object-oriented outline view of a rule representation along with the object-oriented code. For example, the object-oriented outline of the rule "$401—Store excess amount from pre-tax 4-01K to after-tax 401-K" is shown on the left side with the converted object-oriented code for the same rule is in the middle of the screen.

Figure 41:
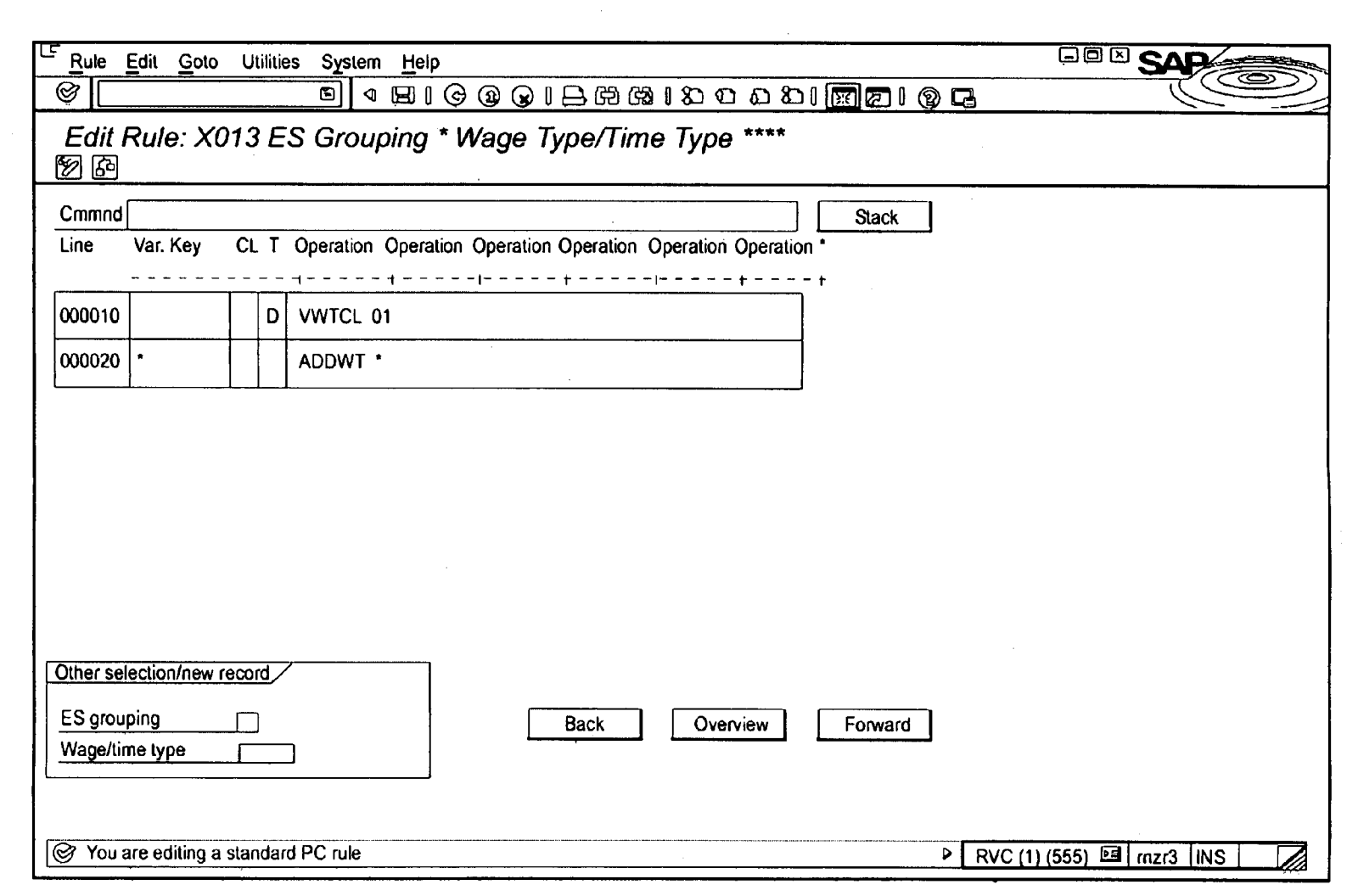

Consistent with methods and systems of the invention, a user interface shown in FIG. 41 may depict a rule in a business application view. For example, the rule "X013 Es Grouping" is depicted as an R/3 business application.

Figure 42:
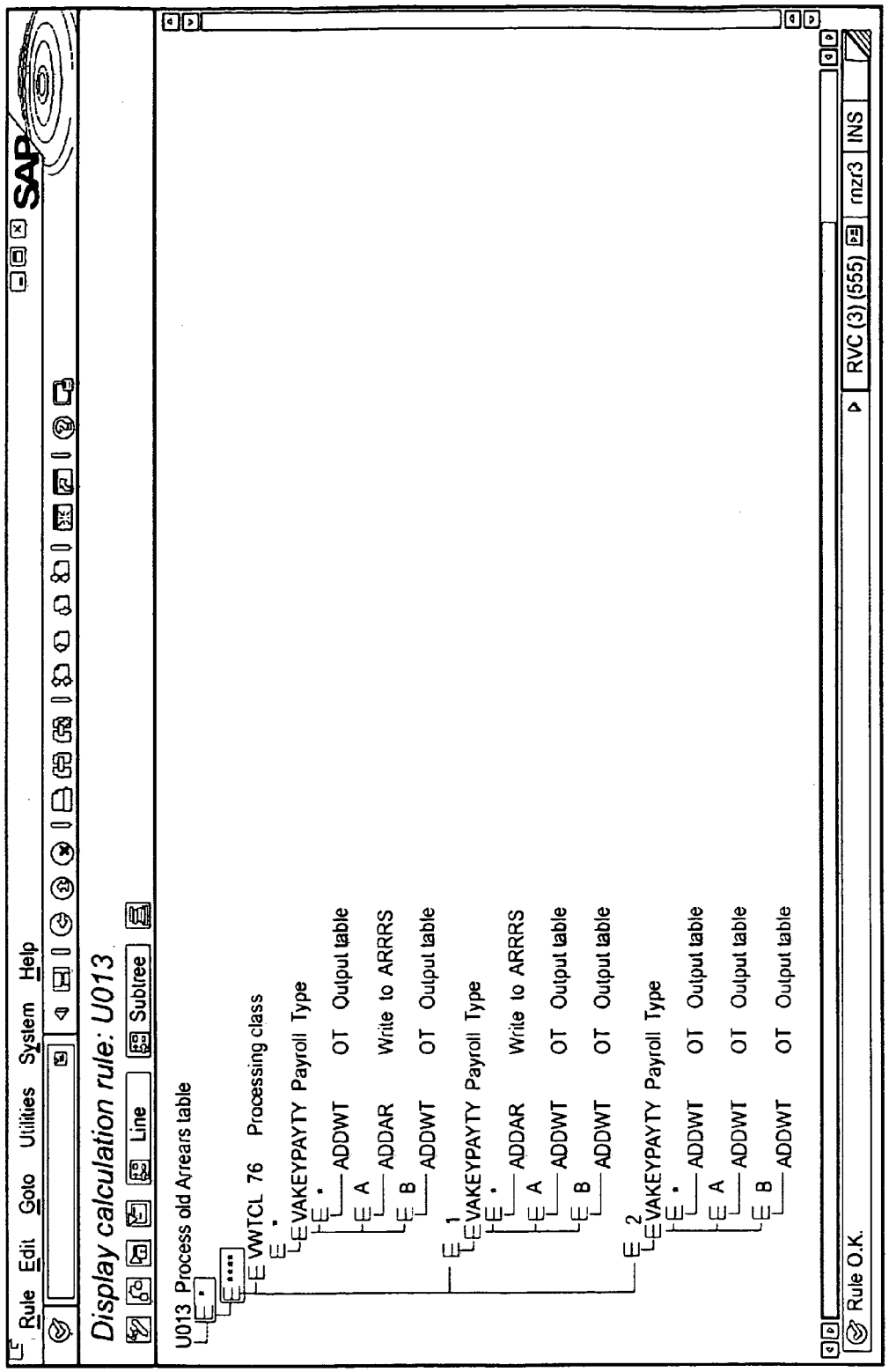

Consistent with methods and systems of the invention, a user interface shown in FIG. 42 may depict a table instance of the rule in a business application view. For example, a table instance of the rule "U013" is depicted as an R/3 data structure.

Figure 43:
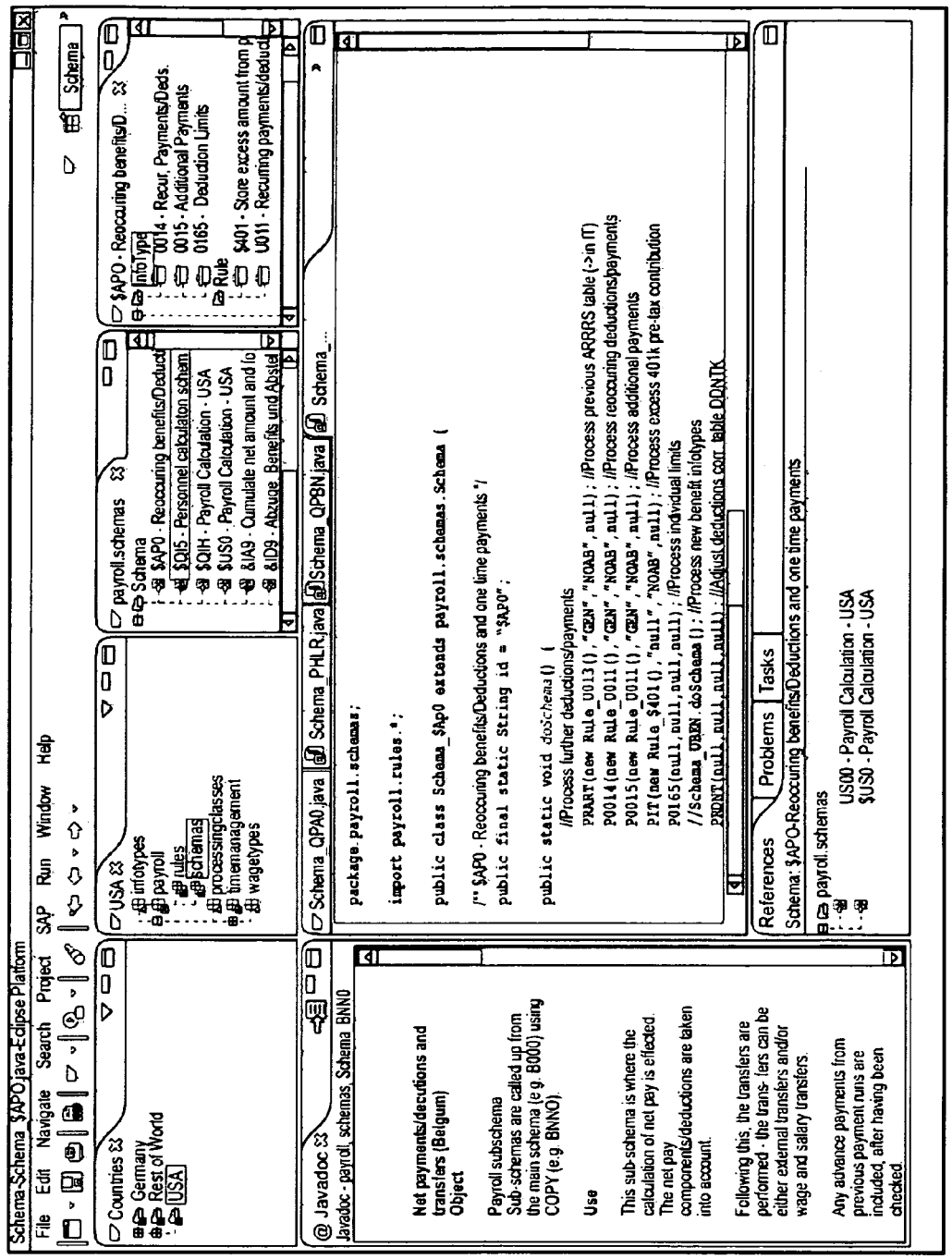

Consistent with methods and systems of the invention, a user interface shown in FIG. 43 may depict an R/3 data structure schema, the object-oriented code of that schema, and the various references where the schema is used. For example, the schema "$APO—reoccurring benefits/Deductions and one time payments" is depicted along with the references that use the schema, which are "US00—Payroll Calculation" and "$US0—Payroll Calculation."

Figure 44:
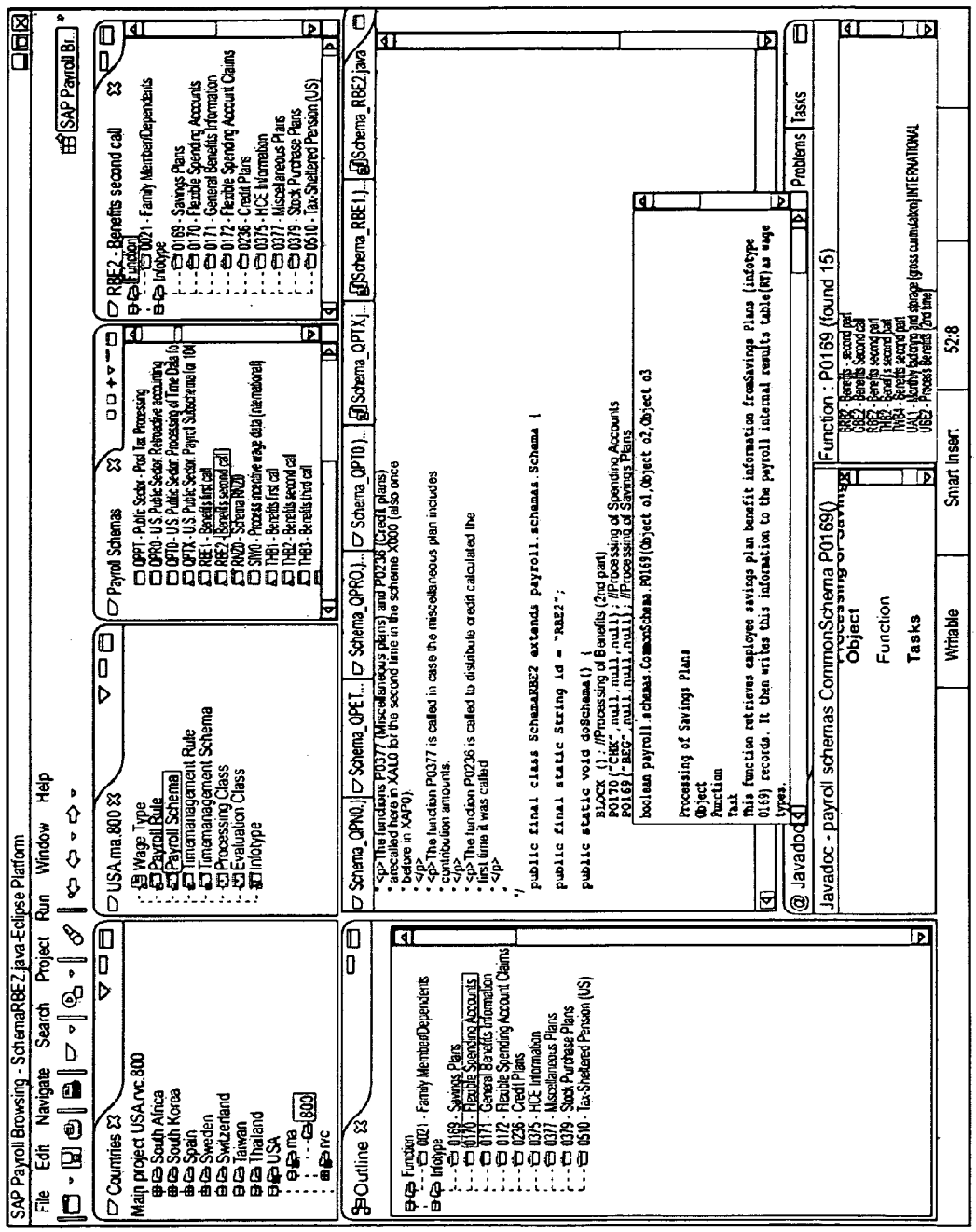

Consistent with methods and systems of the invention, a user interface shown in FIG. 44 may depict a function within an R/3 data structure schema, the implementation of the function, and other schemas where the function is used. For example, the function "P0377" may be shown along with the implementation of the function in the middle of the screen and the bottom right may show other schemas (ex: "BRB2," "BGE2," etc.) that use the function "P0337."

Figure 45:
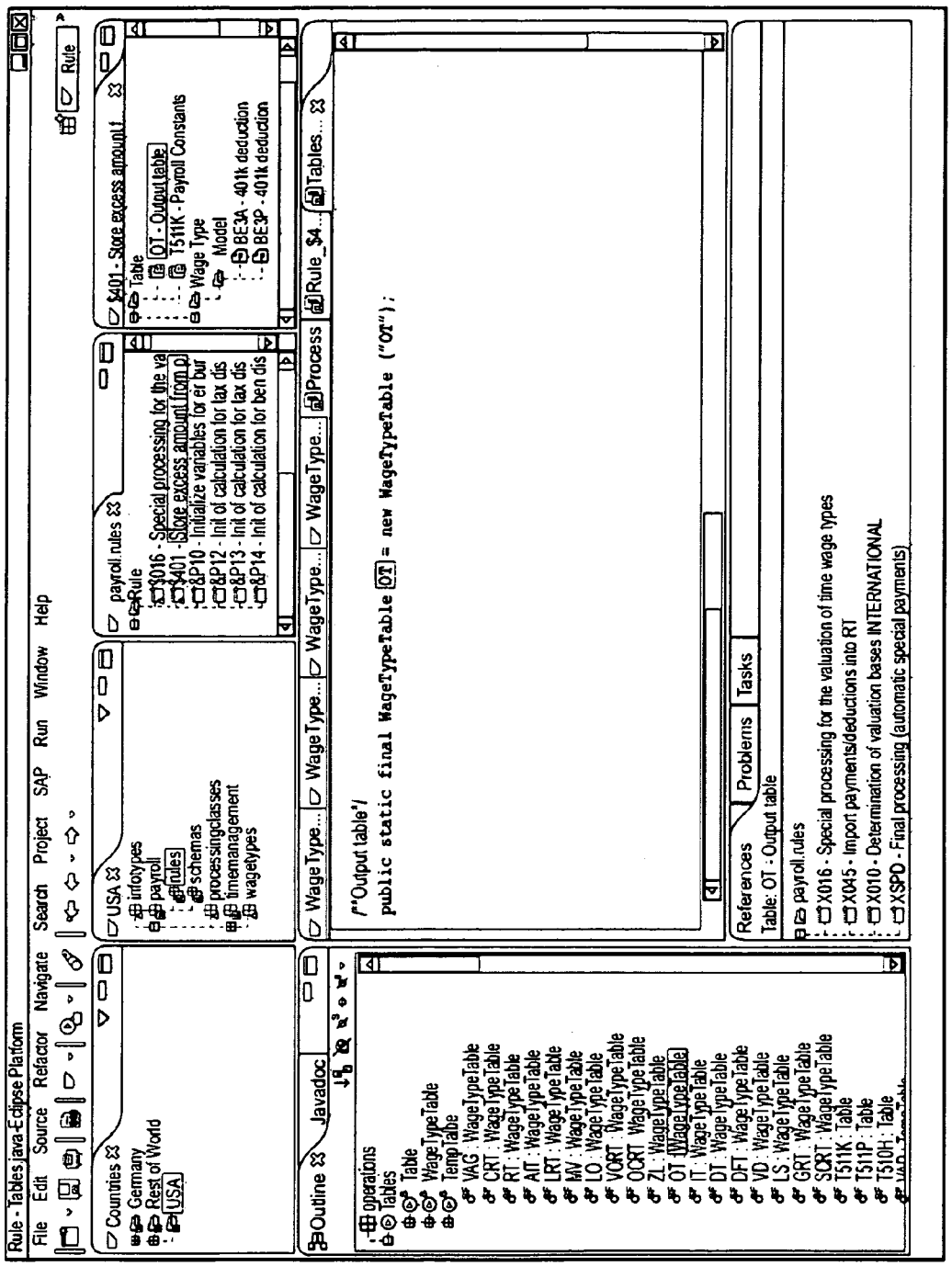

Consistent with methods and systems of the invention, a user interface shown in FIG. 45 may depict a table within a project and all the rules that use that table. For example, the table "Output table" is depicted and under "References," all the payroll rules that use the "Output table" are listed.

Figure 46:
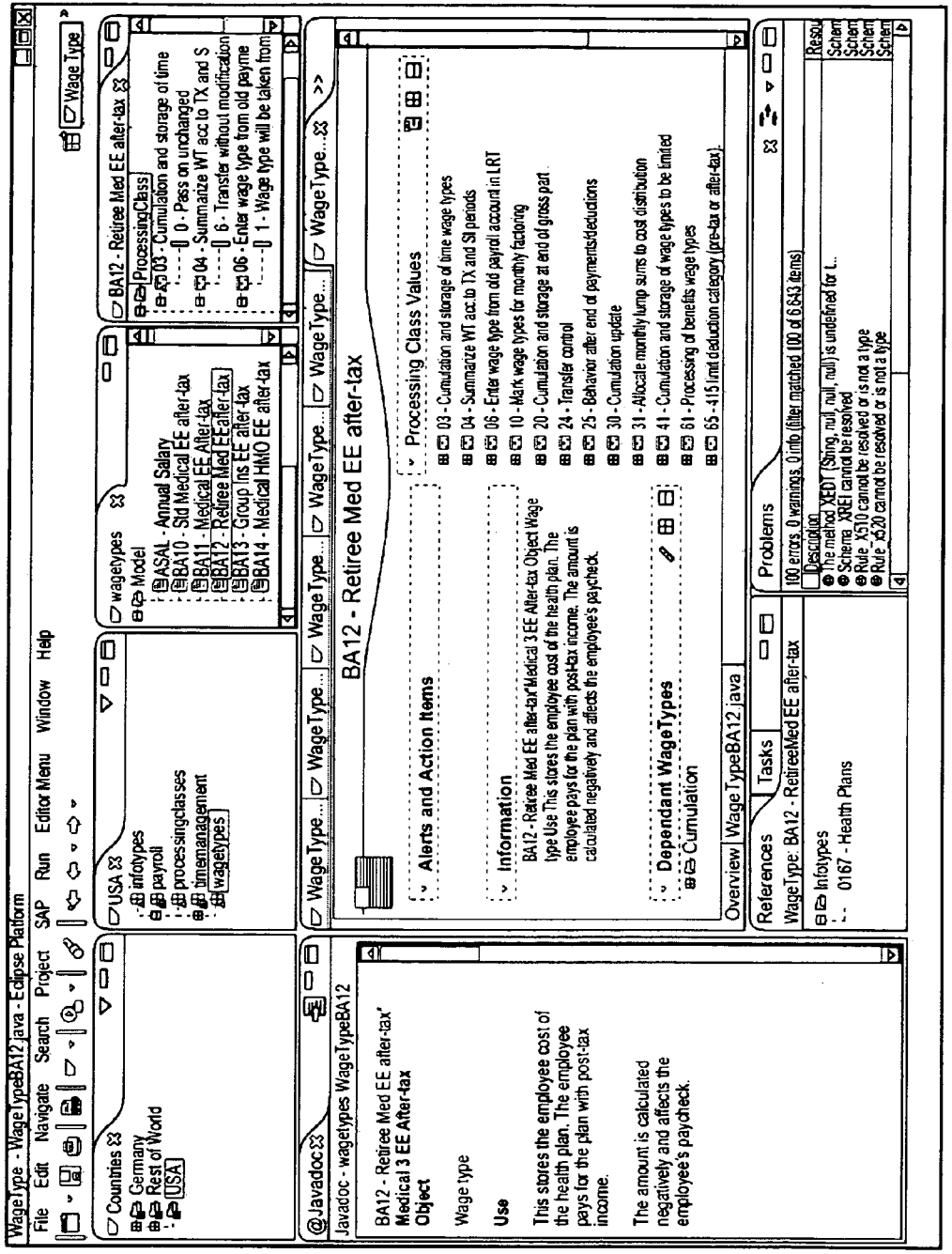
Figure 50:
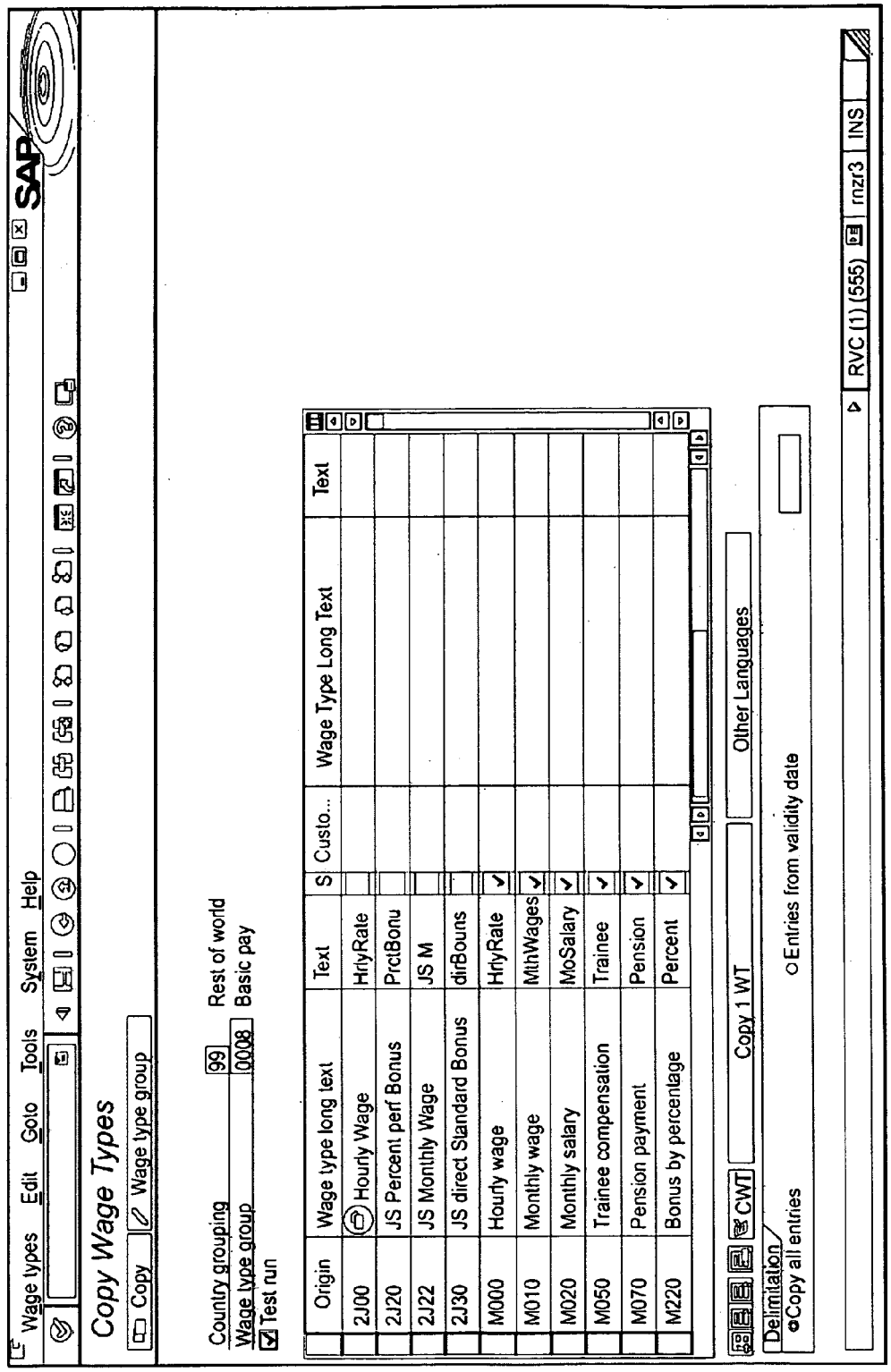
Figure 51:
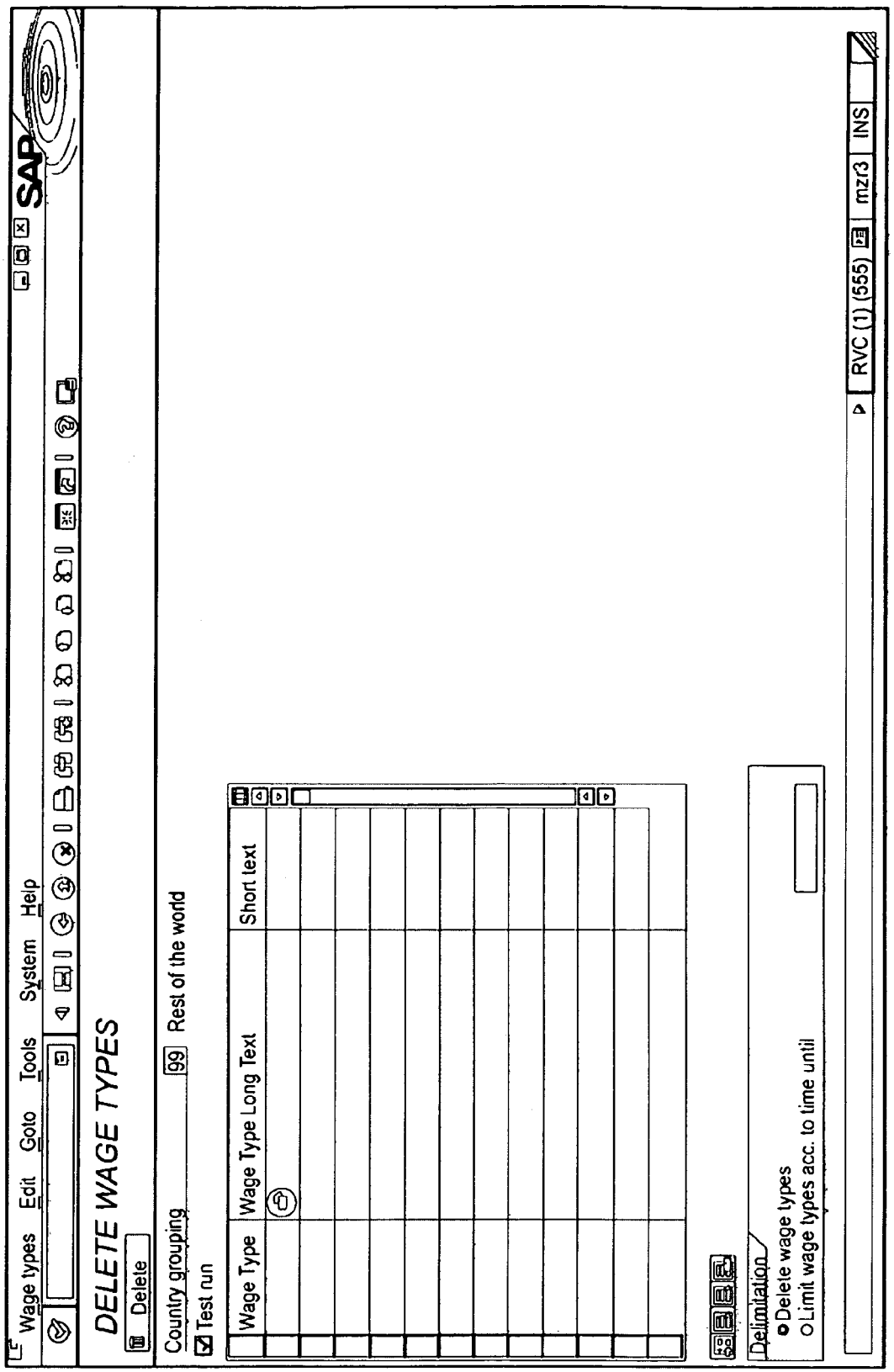
Figure 52:
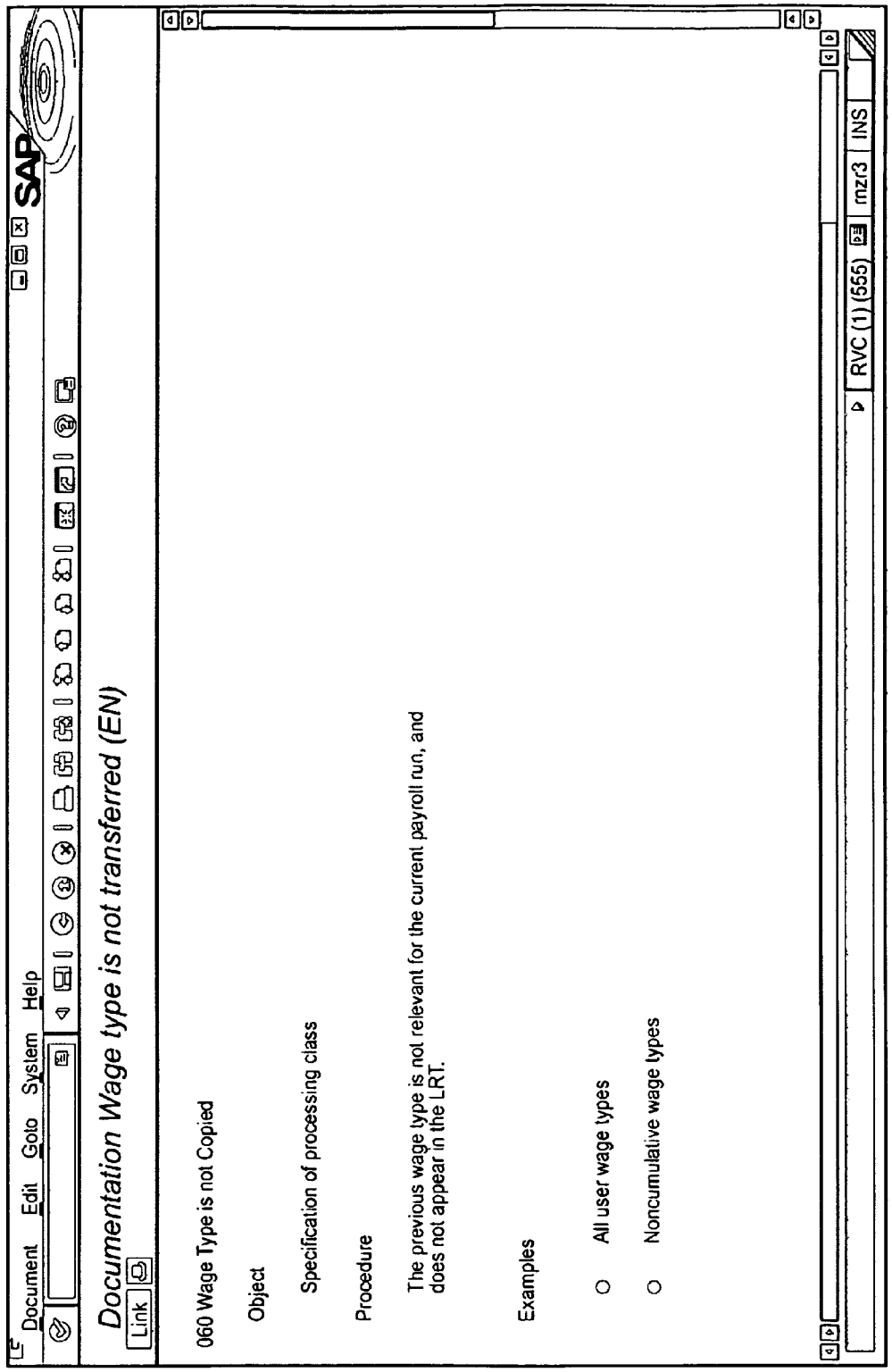

Consistent with methods and systems of the invention, a user interface shown in FIG. 46 may depict the object-oriented representation of R/3 data structure features shown in FIGS. 47-52.

Figure 53:
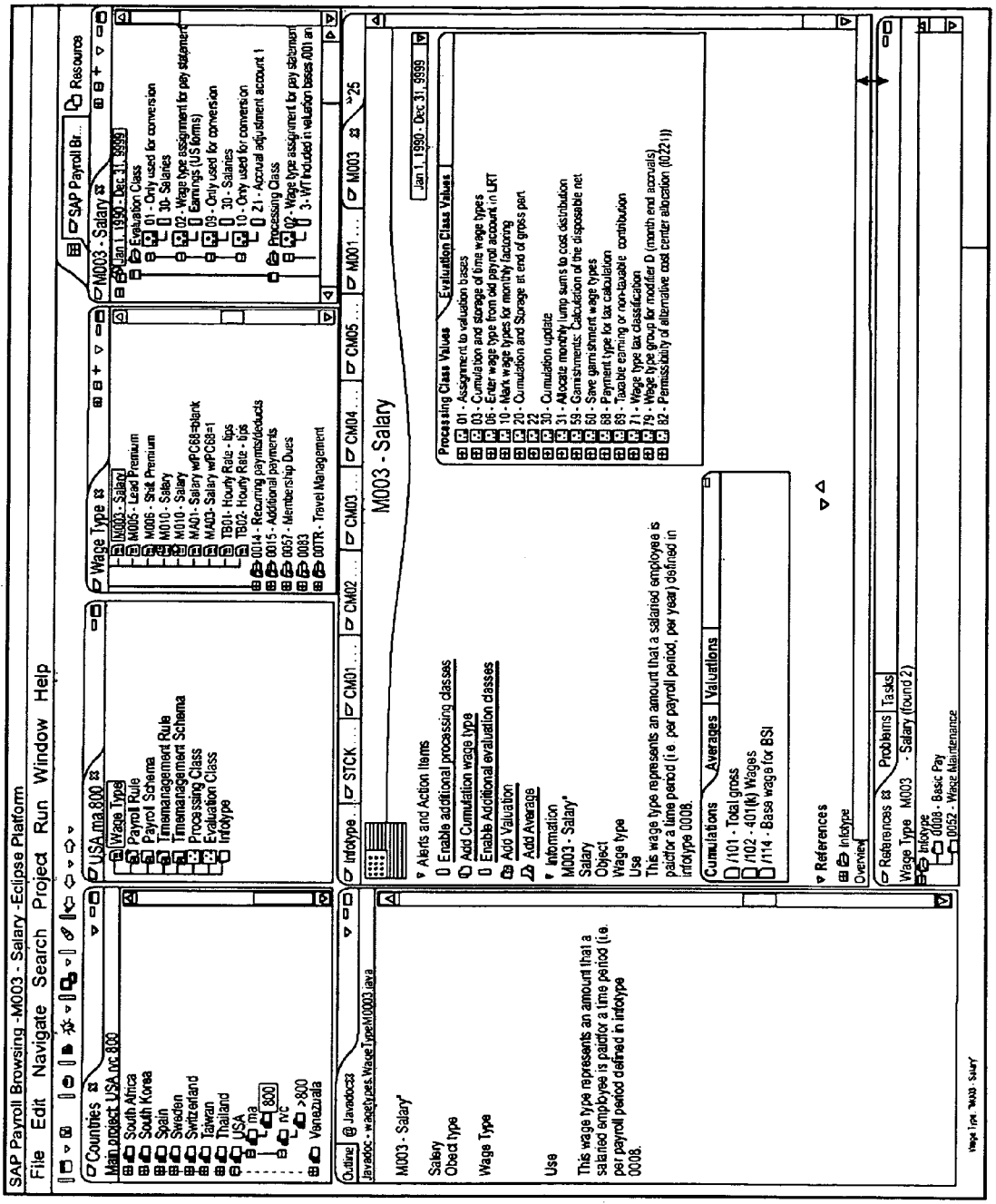

Consistent with methods and systems of the invention, a user interface shown in FIG. 53 may depict a wage type of a project. For example, the wage type "M003-Salary" may be displayed to the user. The references at the bottom of the interface may show others schemas that use this particular wage type within the same project.

Figure 54:
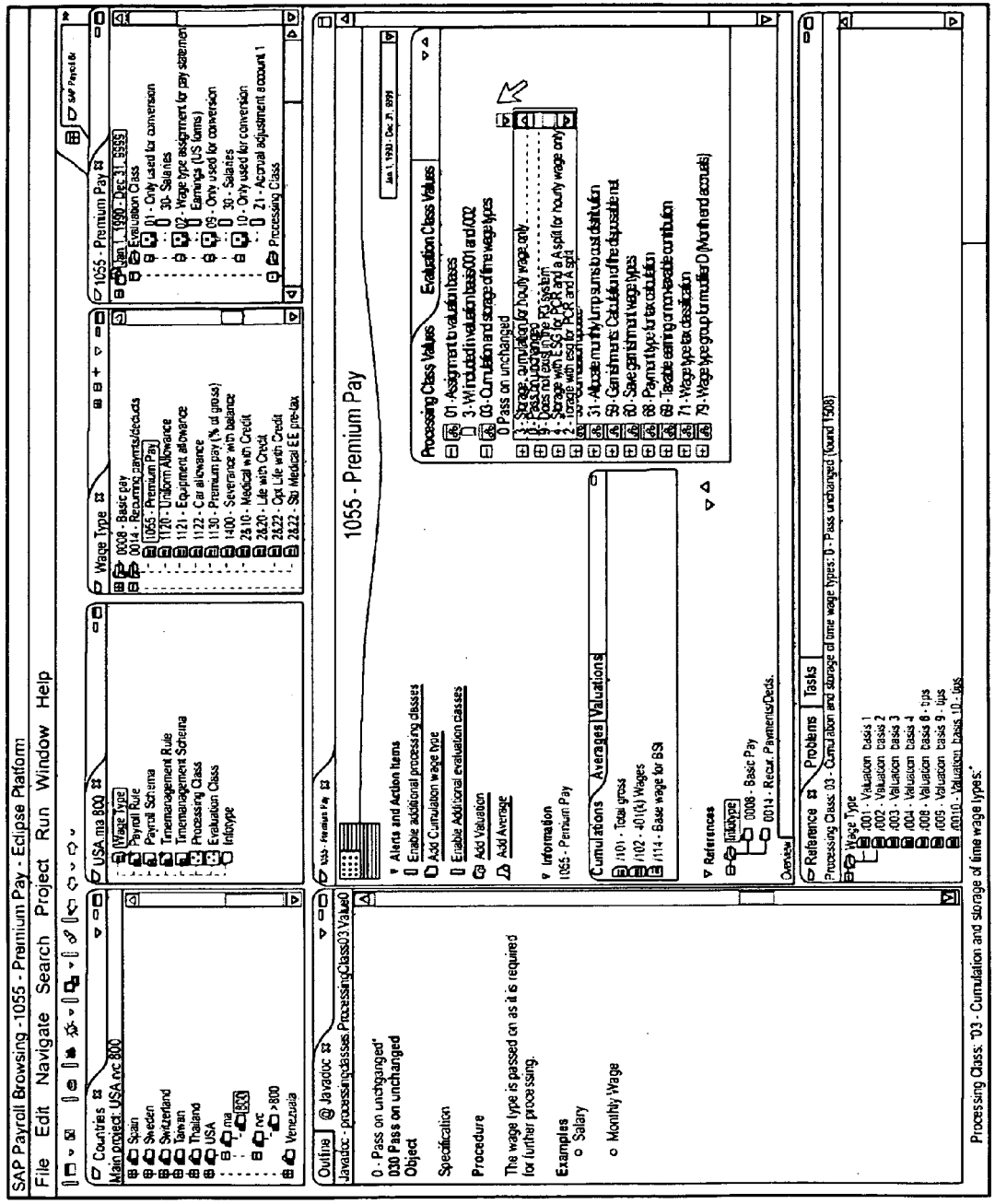

Consistent with methods and systems of the invention, a user interface shown in FIG. 54 may depict another example of a wage type of a project. For example, the wage type "1055—Premium Pay" may be displayed to the user. The references at the bottom of the interface may show other schemas that use this particular wage type.

Figure 55:
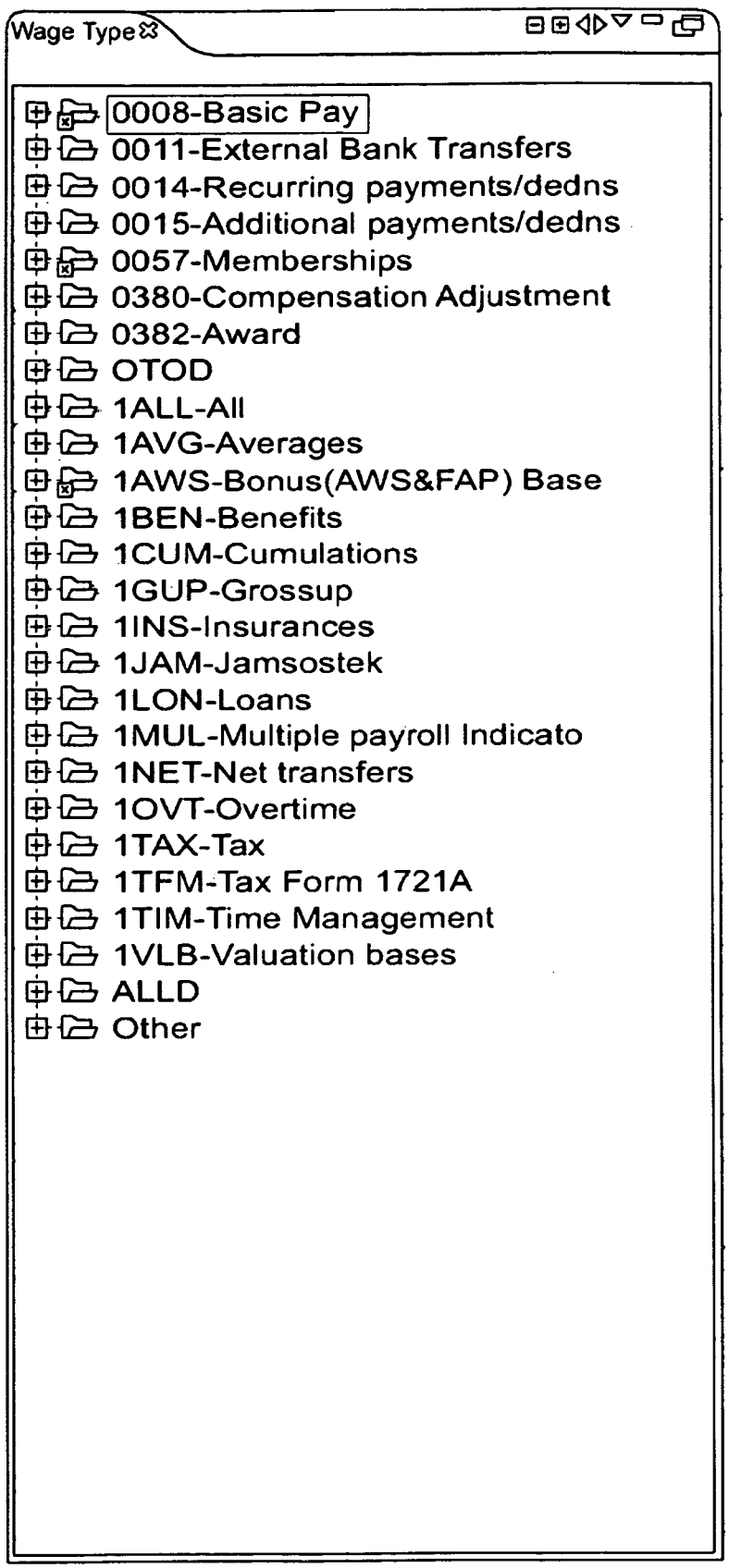
Figure 56:
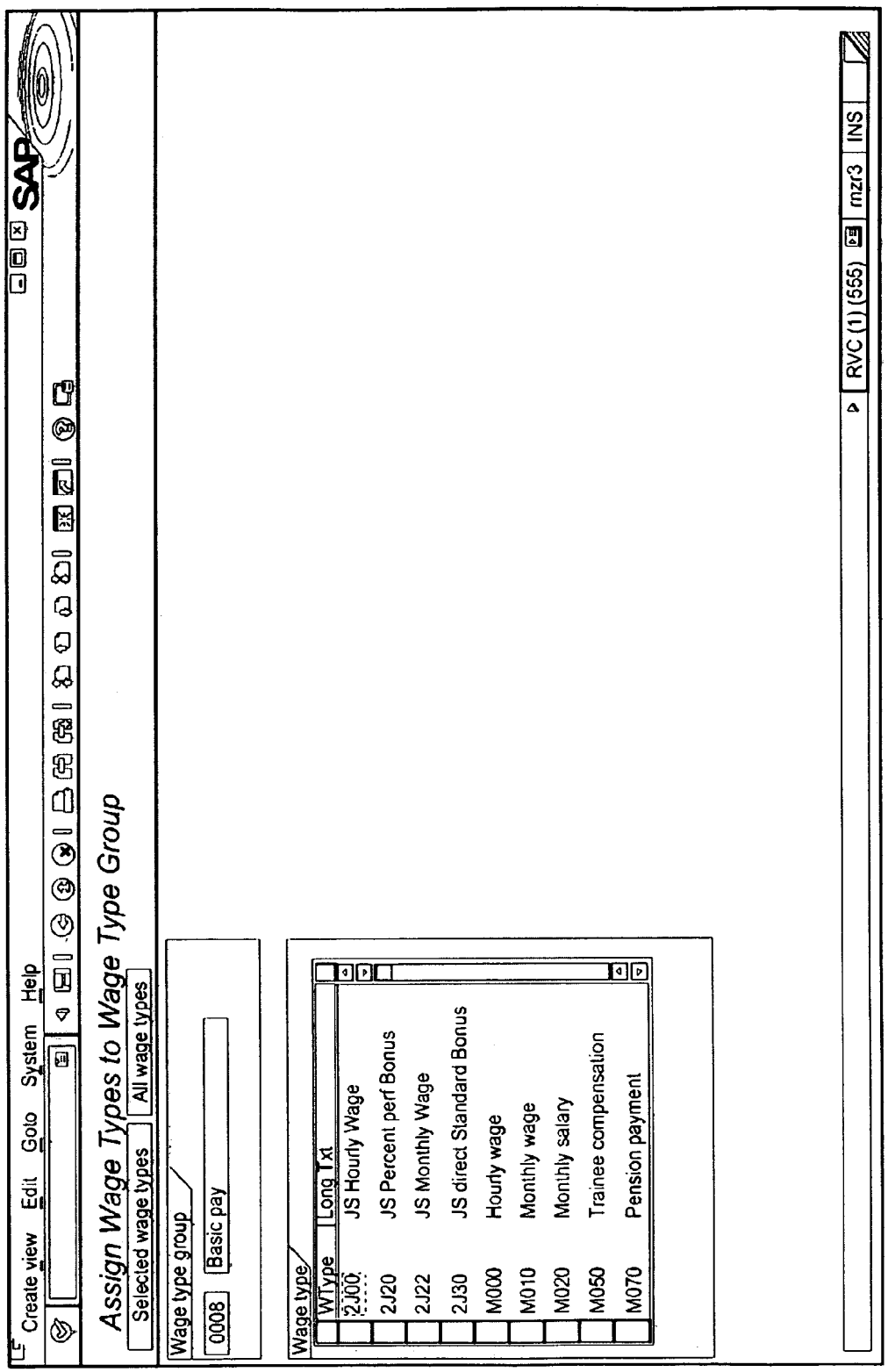

Consistent with methods and systems of the invention, a user interface shown in FIG. 55 may show an object-oriented version of the R/3 data structure "Wage type group" as shown in FIG. 56. Each wage type group may have one or more wage types associated with it. For example, the wage type group "0008 Basic Pay" may be associated with the wave types "SJ00 JS Hourly Wage, "2J20 JS Perfect perf bonus," etc.

Data-Focused Debugging and Tracing Capabilities

Embodiments of methods and systems consistent with the invention enable data-focused analysis of an application by reorganizing execution information generated by an application into groupings associated with the data objects used by, or representing, the application, and displaying or otherwise using the reorganized information for analysis, debugging, execution tracing, etc. of the application. Embodiments consistent with the invention reorganize and present application execution information from the data standpoint instead of from the execution sequence standpoint.

Traditionally, to locate, analyze, and/or debug a problem with an application program, a programmer steps through the program, operation by operation, and monitors changes in the data objects, such as changes in the value of a data object, variable, etc. This is often done as the program executes under the control of a debugger, or in some systems, after execution using a data event log recorded previously as the program executed. For example, the SAP R/3™ system generates a very detailed sequential log containing information about each operation executed by an application and each data object(s) affected by each operation.

More often than not, a problem manifests itself in, and can be traced by observing the manipulations of, a data object(s). For example, a problem in a business application that causes an incorrect output value in a data object that holds a paycheck amount may be traced and eventually solved by first analyzing each operation that manipulates the paycheck amount data object. But even with a modern debugger using helpful features such as breakpoints and watchpoints, analysis and debugging by walking through the execution operations of an application is extremely tedious, difficult, and time-consuming, especially for large, complex applications which execute thousands, or hundreds of thousands, of lines of code because most of the execution flow operations are unrelated to the data object(s) associated with the problem. In a system that relies on execution-flow data event logs for debugging, tracing, etc., such as an SAP R/3™ system running business applications for large organizations, it is even more difficult and time consuming to find the exact place where a particular problem or error occurs with an object by tracing through thousands and thousands of operations in execution order and examining the recorded values for every data object involved because there are few helpful debugging features.

Figure 65:
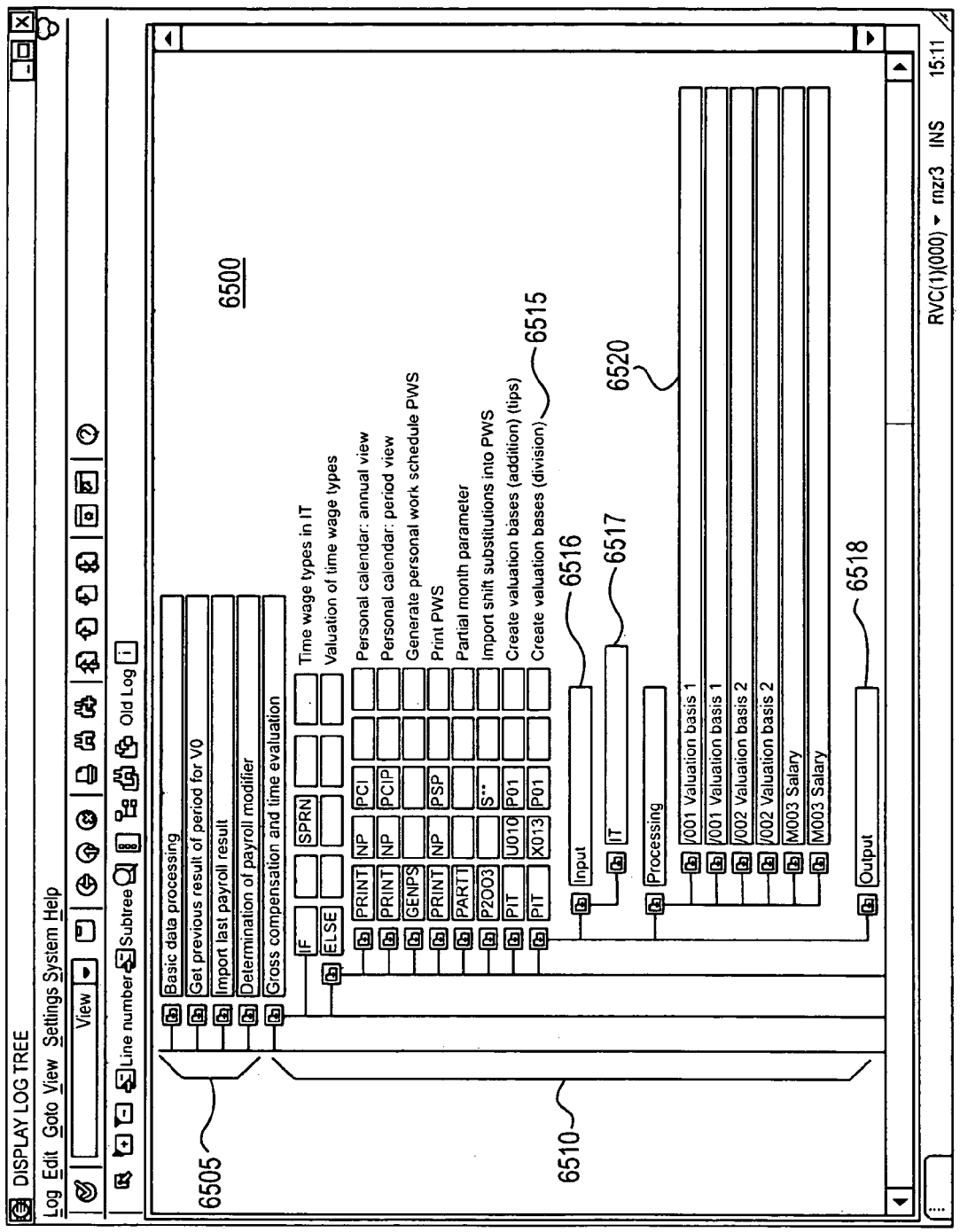

For example, FIG. 65 illustrates an exemplary screen from an execution-flow log, such as may be generated for a business application run on an R/3™ system. The entire execution log may be hundreds, or hundreds of thousands, of screens long organized in chronological execution order. In this example, the log information is displayed as a tree structure 6500 with operations represented as nodes arranged in execution order 6505 in the tree, and a user may drill down into certain nodes (i.e., the nodes with the plus sign "+" in the folder icon) to see the suboperations 6510 (e.g., the lines of code) that make up the operation in execution order.

Figure 66:
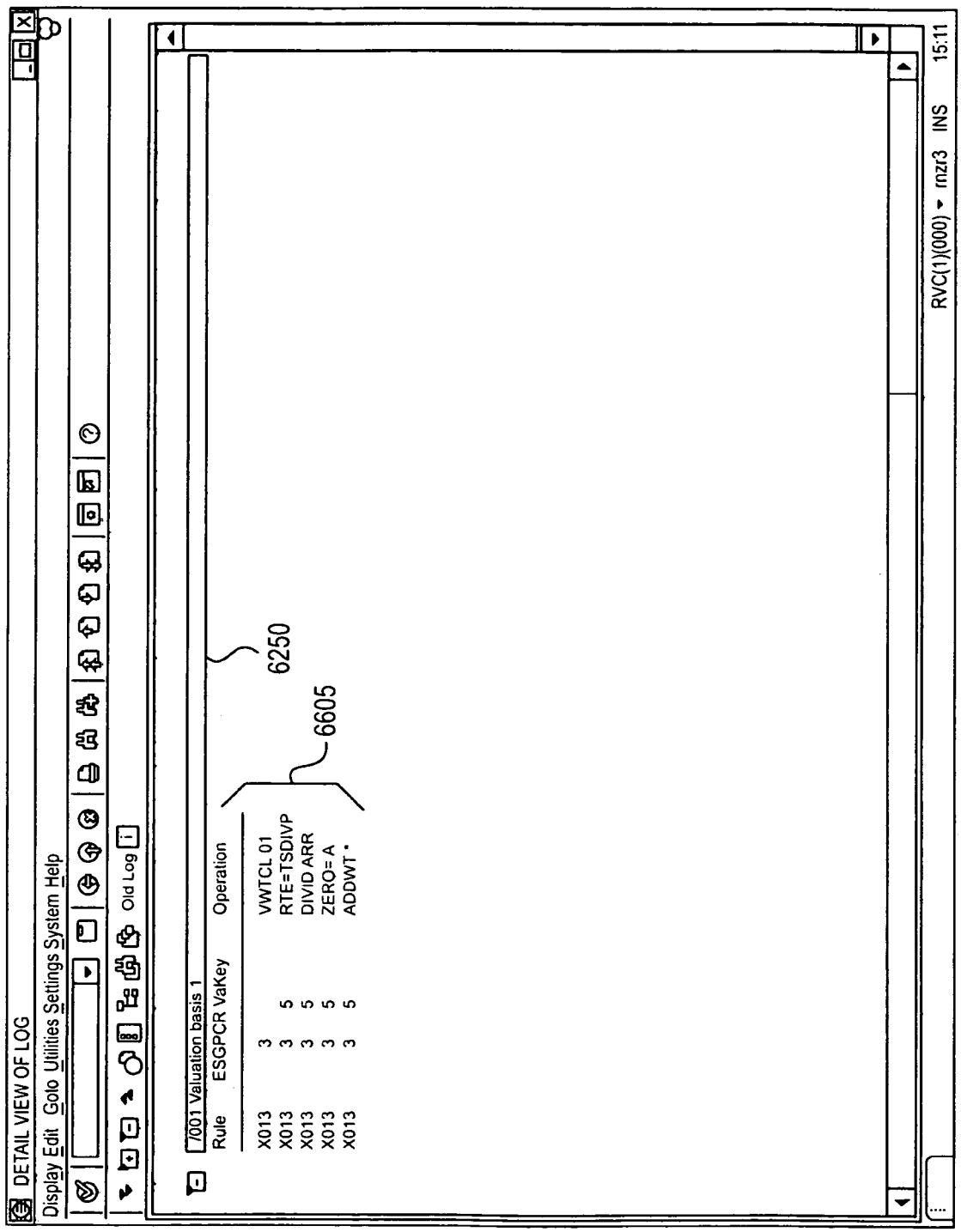

The illustrated execution log records the inputs, processing, and outputs of each operation or function. For example, for operation 6515, which creates valuation bases (division), the execution log includes information about the input 6516, processing 6517, and output 6518 of the operation. A user may drill down to see the details of information recorded about each of these. For example, a user may select the "valuation basis 1" processing operation 6520, and as shown in FIG. 66, the system will display detailed execution log information 6605 about the suboperations that were executed in performing the parent operation. As shown in FIG. 66, several suboperations that are part of Rule X013 were executed for the "valuation basis 1," processing operation 6520. As mentioned above, a programmer or other user trying to debug a problem using such an execution log faces the long and difficult task of walking through the execution log and drilling down to examine each object or rule individually, as shown in FIG. 66, to determine what operation(s) were performed on each object and how they affected the object. Moreover, for a data-rich application, such as a payroll application that generates many data objects and much information for each employee among hundreds or thousands of employees, it is very difficult to identify the exact operation(s) that caused a problem using an execution log such as is pictured in FIGS. 65 and 66.

Figure 70:
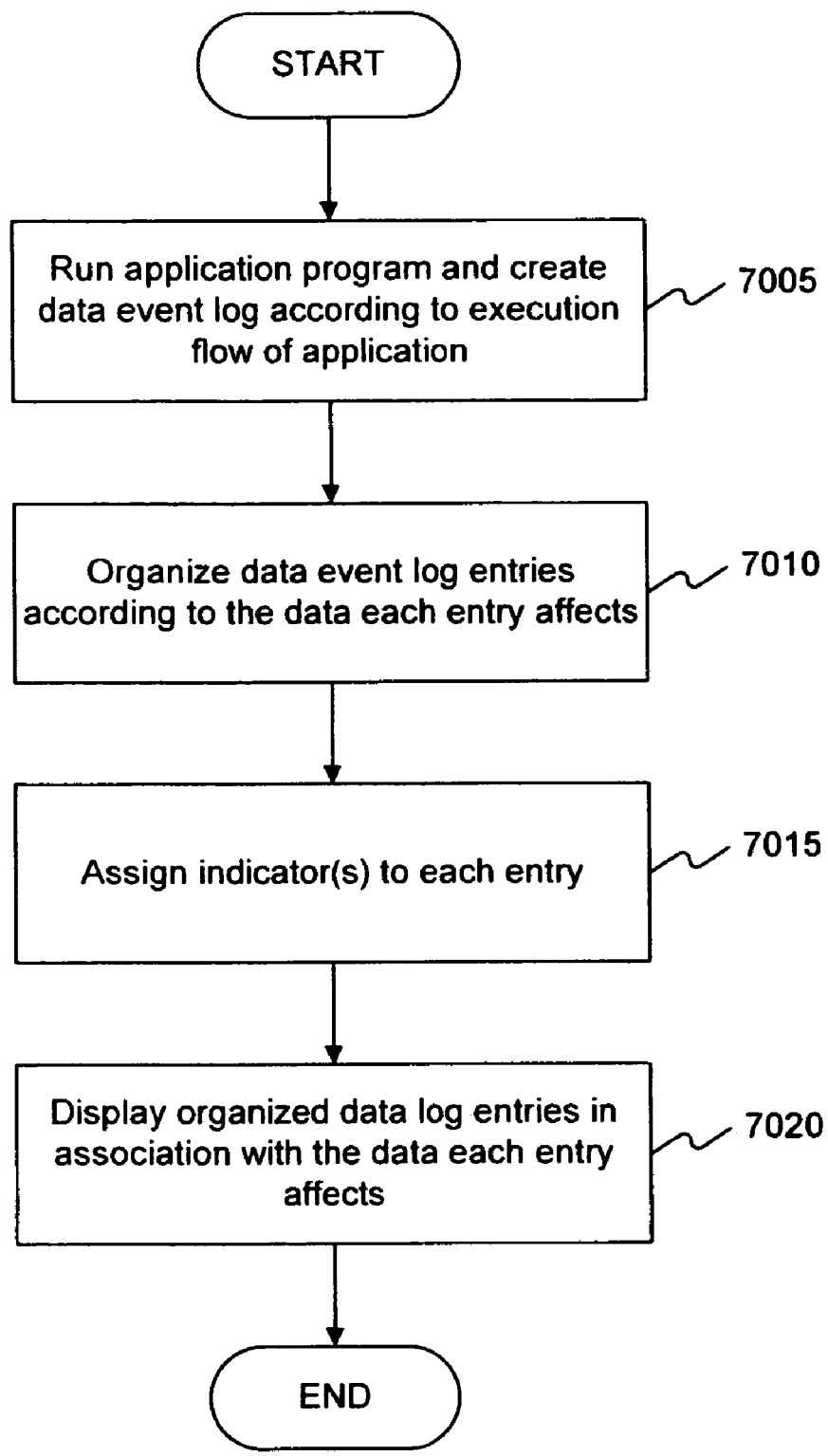

Exemplary methods and systems consistent with the invention enable data-focused analysis of an application by reorganizing the sequential execution information generated for an application, such as the information used to generate the execution log display illustrated in FIGS. 65 and 66, according to data object. For example, as shown in FIG. 70, which is an exemplary embodiment of a process consistent with the invention, an application program is run, creating an execution data event log according to the execution flow of the program (stage 7005). In one embodiment, the process is performed by a system including at least one computer. In some embodiments, the application is a business application, such as an accounting application run on an SAP R/3™ system.

In one embodiment, as the application program runs, it generates data and/or data objects. The operations that generate the data objects and data are recorded chronologically (i.e., in the order they are executed) in the execution data event log along with the generated data and objects. In some embodiments; the application program itself creates the execution flow data event log, while in other embodiments, a separate program creates the execution log. The data and data objects may include initial variables, results, or objects; intermediate variables, results, or objects (e.g., results used in future calculations); final variables, results, or objects; etc. In some embodiment, the execution log may be very extensive—for example, the SAP R/3™ system execution log records everything that happened during execution at every code line or configuration point. In other embodiments, the execution log may contain less information.

In the process shown, the system next organizes the entries in the data event log according to the data affected by each entry (stage 7010). In one embodiment, the system categorizes the log information according to data object classes, associating log entries where a data object of a given class was accessed (e.g., created, deleted, changed, read, etc.) with a category for that given class.

In the process shown, the system then assigns an indicator(s) to each log entry to show how the entry affected the data object (stage 7015). For example, one indicator or marker may signify that the entry created a certain data object, a second indicator may signify that the entry changed the contents or value of the data object, a third indicator may signify that the entry deleted the data object, a fourth indicator may signify that the entry read the contents of the data object, etc.

After all the entries are organized according to data object and assigned indicators, the system displays the reorganized data log entries as organized by data object (stage 7020). In other words, the system displays all the log entries caused by execution of operations in the application code that affected a data object, sorted or indexed by object instead of in the original execution order.

Using the data-focused, reorganized, execution log information to analyze or debug a problem with the application, a user may, instead of tracing the execution flow of the application through accesses to multiple data objects that are not of interest, concentrate on only the relevant data object(s) and the life cycle events that affected the relevant object(s). Life cycle events include where and how in an application (e.g., what operations) a data object was created, what operations modified the data object, what operations accessed the data object, what operation deleted a data object, what operation moved or copied a data object from one place to another or to another instance, etc.

One of ordinary skill will recognize that stages may be added to, deleted from, or modified in the process shown in FIG. 70 without departing from the scope of the invention. For example, stages 7010 and 7015 may be combined into a single stage.

Figure 57:
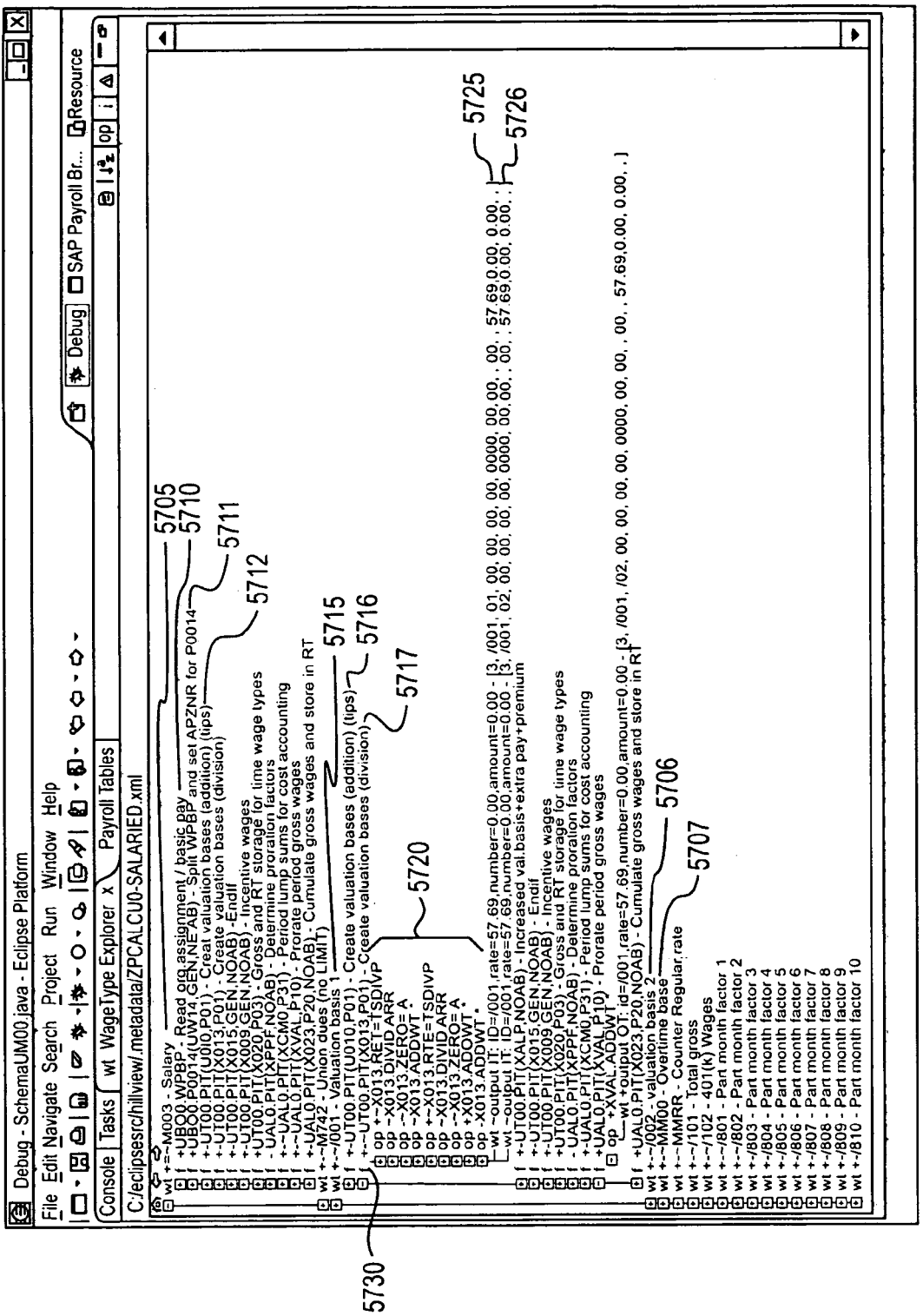
Figure 59:
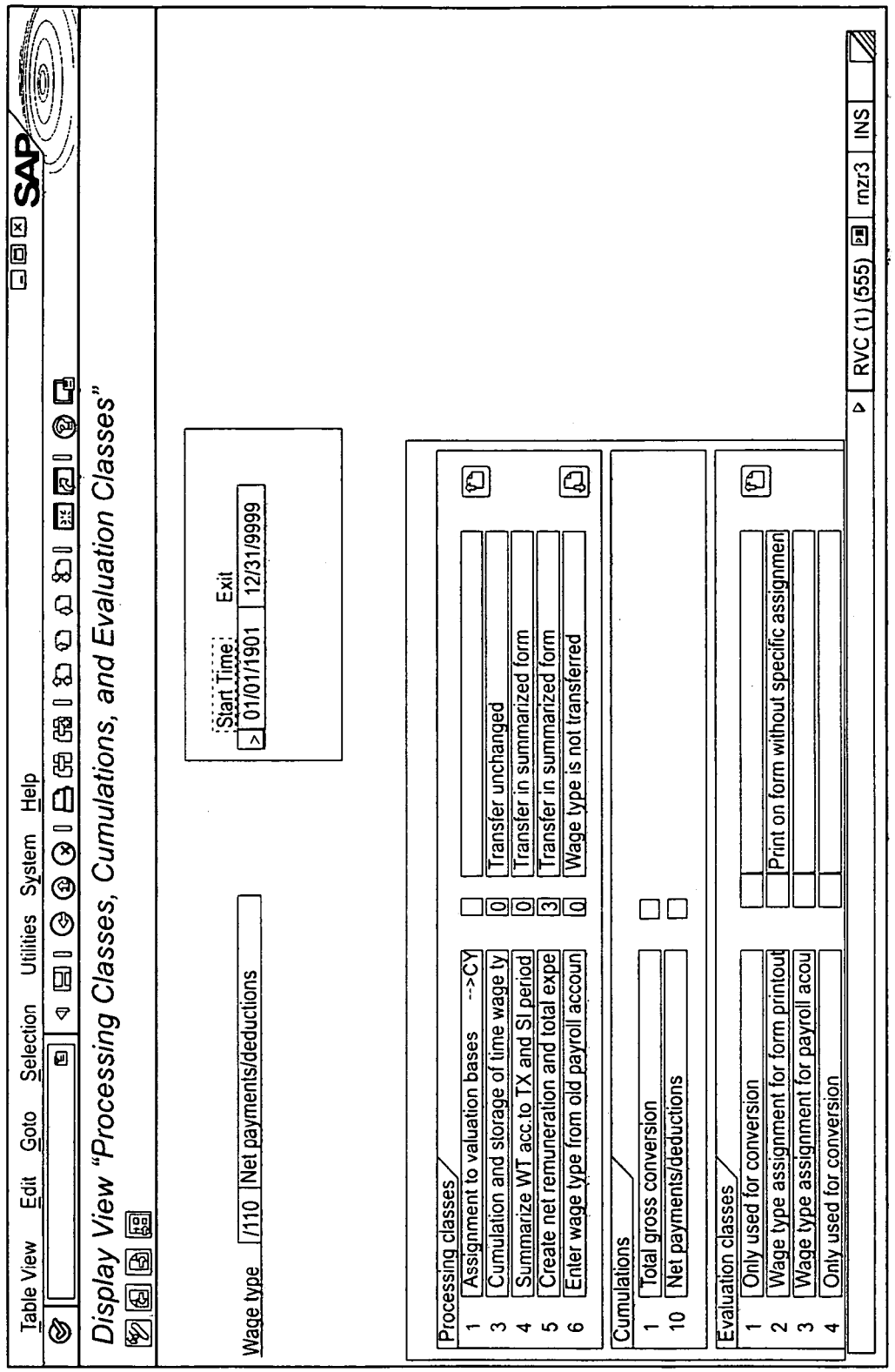
Figure 60:
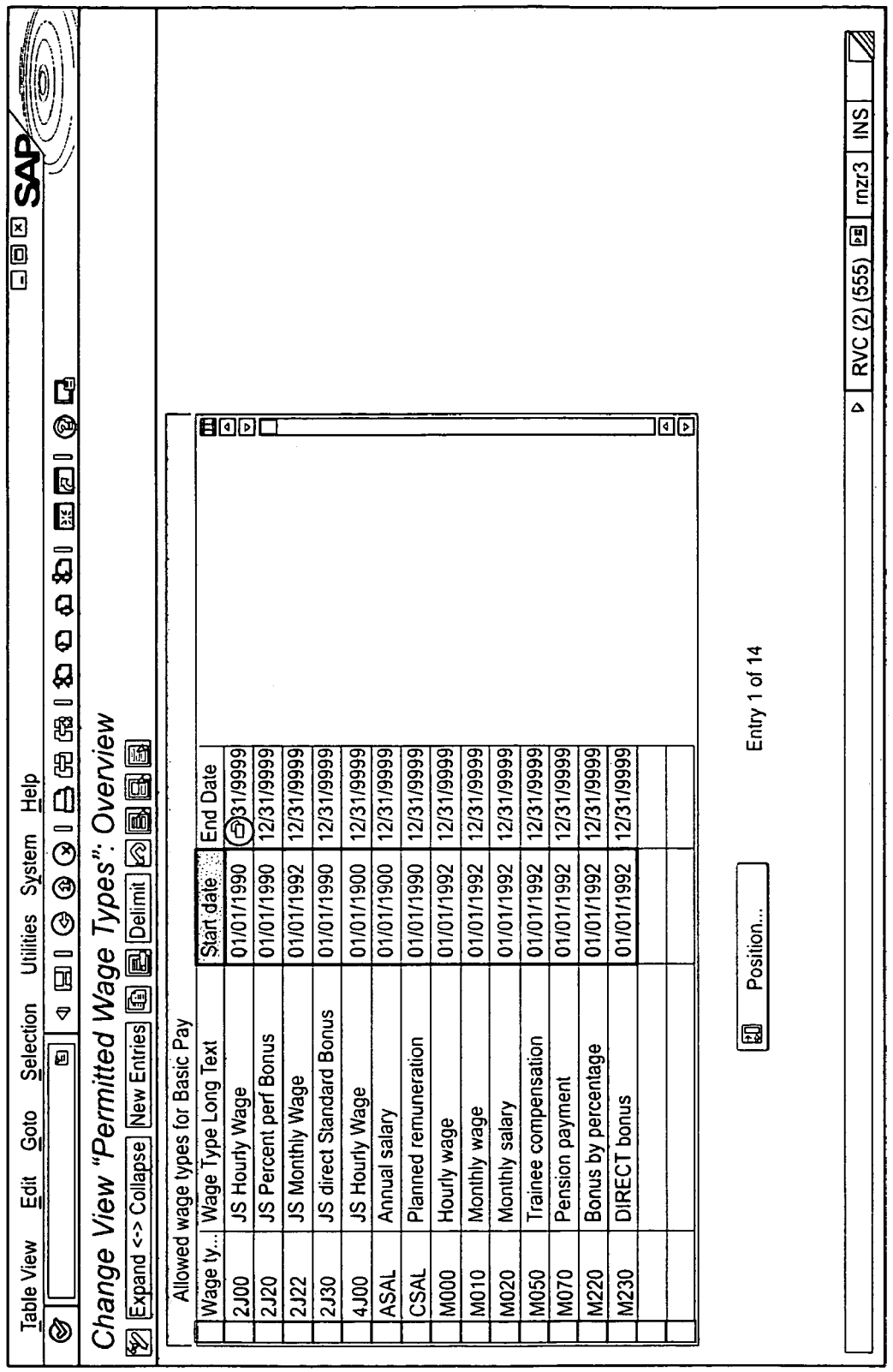

FIG. 57 shows an exemplary user interface with a data-focused display of data event log information organized according to data object, such as might be used in connection with stage 7020 of FIG. 70. In one embodiment, the user interface is an interactive browser that includes standard abilities such as scrolling, mouse control, text searching, etc. As shown in FIG. 57, the execution log information is reorganized and displayed so that data classes (for example, data classes 5705, 5706, and 5707) are the top level of organization and the operations (for example functions 5710, 5711, and 5712) that affect instances of these data classes are organized underneath in execution order, allowing a user to see exactly how the objects of each data class have been accessed and manipulated during execution of the application.

More specifically, in the embodiment shown in FIG. 57, "M003" is a data object class 5705, which may, for example, be a wagetype which carries salary information for an employee (this example is from an SAP R/3™ payroll business application). The function UBDO.WPBP 5710 is the first operation from the payroll application that use data class "M003" 5705—the function creates an instance of data class "M003" 5705 for further processing, for example, using salary information for an employee input into the system by human resources personnel. The functions UBDO.P0014 5711, UT00.PIT 5712, and so on were executed next and performed further operations using data class "M003" 5705, such as using the "M003" salary data class 5705 to calculate net pay, gross pay, etc. for an employee.

Similarly, "/001" is another data class 5715. As shown, the function UT00.PIT 5716 is the first operation from the payroll application that uses data class "/001" 5715, creating an instance of this class (e.g., an R/3™ wagetype) for use later. Next, the "/001" data class 5715 was processed by function UT00.PIT 5717 (an R/3™ rule). A user may drill down into this rule to see the exact operations 5720 that were executed affecting an object of data object class "/001" 5715. A user may further drill down into an operation and see the exact values of instances of this particular class with its values 5725—with how the values changed 5726. Thus, a user interested in analyzing what happened to the data class "/001" 5715 during execution of an application does not have to trace through hundreds or thousands of operations in an execution log to find the ones related to the data class "/001" 5715 because all the related operations (e.g., operations that affected an instance of this class) are organized and displayed in association with the class.

In one embodiment consistent with invention, the system may assign an indicator or marker to each entry in the reorganized data event log to show the type of action performed in association with the entry on the data object, such as reading the data object, creating the data object, modifying the data object, deleting the data object, copying the data object, etc. For example, as shown in FIG. 57, an indicator or indicators 5730 may be displayed with each entry to indicate the action that occurred, such as a plus sign (+) to indicate creation of a data object or object attribute, a minus sign (−) to indicate deletion of a data object or object attribute, a tilde (~) to indicate modification of a data object or object attribute, and no indicator to indicate reading of a data object or object attribute, among others.

In one embodiment consistent with the invention, the system may assign indicators to each object based on an evaluation of execution data event information. For example, referring for a moment to FIG. 65, using the information from the execution log, the system may compare the data objects input 6516 and output 6518 for a function or process 6517, and assign an indicator accordingly. For example, if a data object exists in output 6518 that did not exist in input 6516, then the system assigns a creation indicator for that data object to function or process 6517. For another example, if a data object has value X as input 6516, and a different value Y as output 6518, then the system assigns a modification indicator for that data object to function or process 6517.

In one embodiment, as shown in FIG. 57, indicators may propagate up through levels of the data-focused display, so that classes display the indicators of their subclasses, which display the indicators of their associated functions, which display the indicators of their constituent operations, etc. The indicators shown in FIG. 57 are merely for illustration. A skilled artisan will appreciate that many other means and methods may be used to indicate access, creation, modification, deletion, etc. of a data object.

Figure 61:
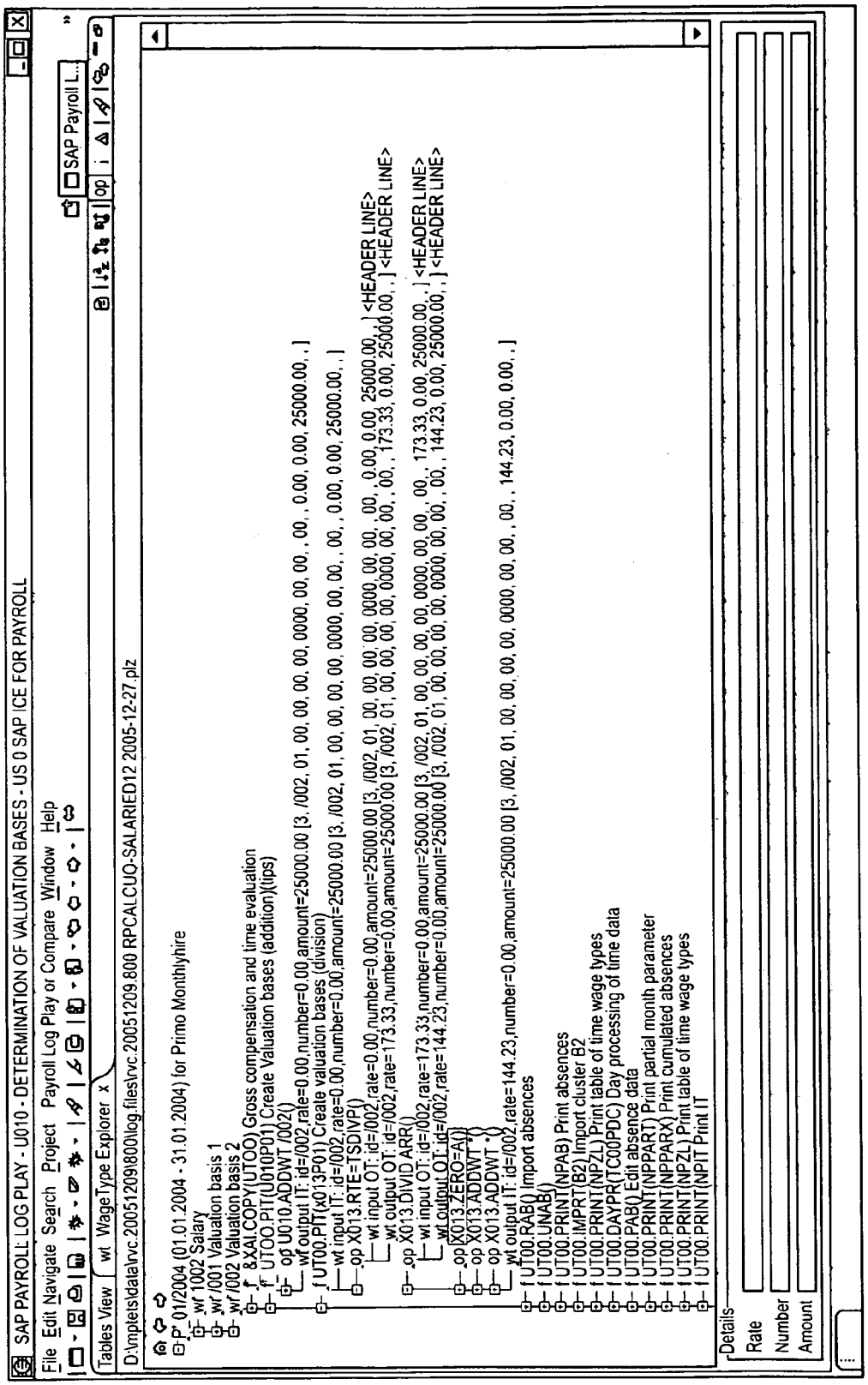

FIG. 61 shows another exemplary user interface with a data-focused display of data event log information categorized by data object. As explained above with respect to FIG. 57, the reorganized data event log shown in FIG. 61 provides a data-focused view of the application that allows a user to easily see and examine every point executed by an application that processed a data object of a given class.

In the embodiments shown in FIG. 57 and FIG. 61, the data-focused display is the result of shuffling the information in an execution flow log to group it by data object classes so that a user can easily find the places where the data objects of a given class have been used and see the actual values stored in the instances. This display allows a user to efficiently trace how a data object is changed during execution of an application, determine where a problem occurs, and debug the application.

Figure 71:
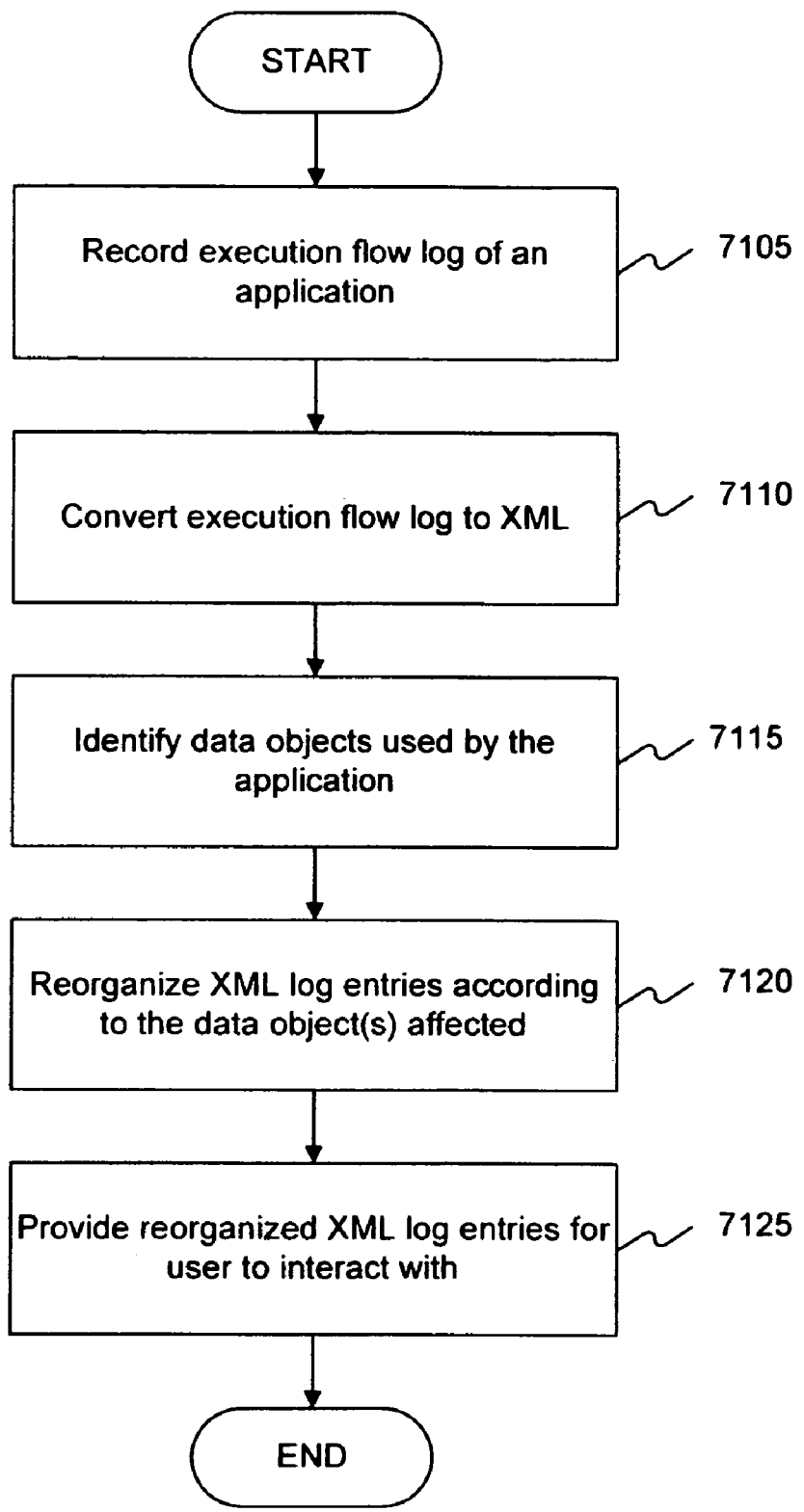

FIG. 71 is a flow chart of an exemplary process for creating a data-focused execution log consistent with one embodiment of the invention. As shown, the process begins with recording an execution flow log of an application (stage 7105). Examples include the table-based execution flow log recorded by an SAP R/3™ system when an application is run, such as is shown in FIG. 65. In the R/3™ log example, the execution log is basically a collection of multiple tables with information about each execution operation. For understandability purposes, as shown in FIG. 65, the log may be displayed as a tree structure which mimics the execution flow (e.g., showing nesting levels as functions call other functions, etc.). The nodes of the tree show the data involved or being processed for a particular execution flow element. For example, a function 6515 is displayed as a node and under this node are displayed nodes for the different types of objects entering this function and exiting this function.

In one embodiment, the execution flow log includes an entry (e.g., a line) for each operation or code line executed by the system when running the application, and records the values of the input and output of data objects before and after execution of the operation. Other embodiments include execution flow logs with coarser levels of detail.

Referring again to the embodiment of FIG. 71, the process next converts the execution flow log into XML statements (stage 710). At this stage, the information in the log is still linear according to the execution flow of the application. In this embodiment, XML is used as a common format to start from for the stages that follow in the process. That is, execution flow logs from many different sources (applications) of many different types and formats may come from stage 7105, and converting them to XML format allows the use of the same means to perform the later stages of the process.

Next, the process identifies data objects used by the application and recorded in the XML execution log (stage 7115). In one embodiment, the process knows all the possible data object classes used by the application in advance. In this embodiment, the system implementing the process may analyze the XML log to identify which of the possible data objects or classes were actually used in the recorded execution run of the application, and then use the identified objects or classes to later sort or reorganize the log information. In another embodiment, the system implementing the process may analyze the XML log to determine the data object classes used by the application without any advance knowledge of the possible classes.

As shown, the process next reorganizes the XML log entry information according to the data object(s) affected by each entry (stage 7120). In one embodiment, the XML version of the execution log is read into memory for faster processing and grouping algorithms are employed to reorganize the log entries by identifying the class(es) of the data that is being used by each entry, and grouping each entry under that class(es). In other words, the log entries are reshuffled or sorted from the original execution flow organization into a data-focused organization. In one embodiment, if an entry affects more than one data class, it may be copied or flagged so as to belong to the groups corresponding to each of the more than one data class.

In one embodiment, the log entries contain information indicating how the entry affects the objects of each data class that it uses. For example, as shown in FIG. 65 and explained above, the affect of an operation may be determined from information regarding what data objects and values are input 6516 and output 6518 from a function 6515. After the affected object(s) are determined from this information, the function is grouped under those objects' data types. In one embodiment, the reorganized entries are grouped in sequential execution order under the appropriate data object or class. In one embodiment, the data classes themselves may be organized chronologically according to the order in which an instance of the class was first created during application execution.

Referring again to FIG. 71, in stage 7125, the process provides the data-focused, reorganized log for a user to interact with. For example, as shown in FIGS. 57 and 61, the data-focused log entries may be displayed using an interactive browser.

One of ordinary skill will recognize that stages may be added to, deleted from, or modified in the process shown in FIG. 71 without departing from the scope of the invention.

Figure 68:
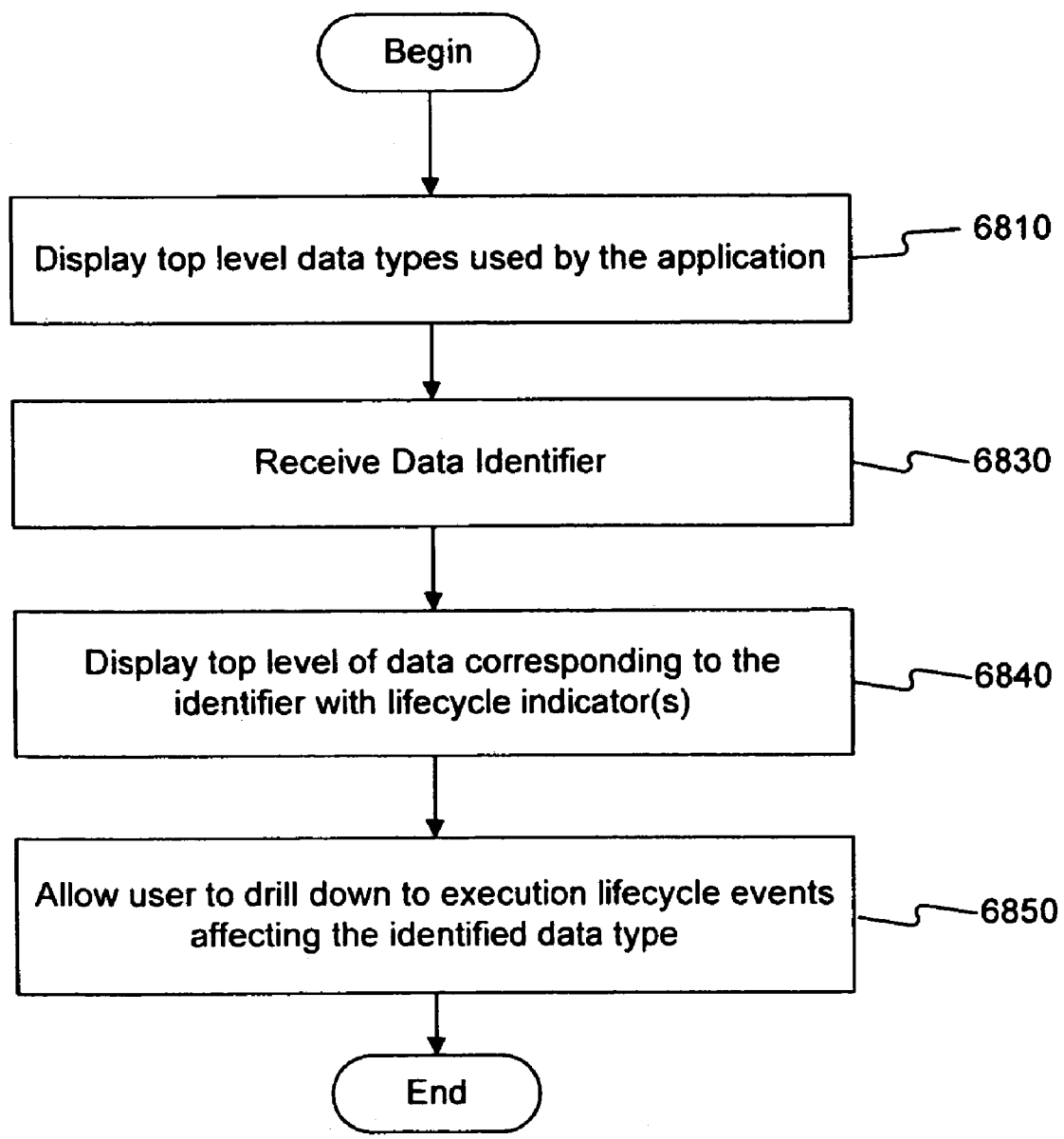
FIGS. 68 to 74 illustrate exemplary processes consistent with the present invention.

FIG. 68 is an exemplary flowchart of a process for analyzing the execution of an application consistent with an embodiments of the invention. As shown in FIG. 68, to begin, the top level data types used by the application are displayed (stage 6810). For example, in one embodiment shown in FIG. 62, a list of data classes 6205 used by the application may be displayed in an interactive browser window (ignoring for this example the displayed items that are not part of 6205).

Next, the process may receive a data identifier (stage 6830) that identifies the data of interest. For example, a user may identify data by typing the name of a data object, attribute, or class used by the application into a pop-up search window. The user may select the data class based on a suspected problem with the application, among other reasons. For example, if an employee receives a pay stub or other salary record with an error, such as no taxes withheld, he may report the problem to his employer's human resources department, who may in turn contact a consultant, analyst, programmer, etc. after determining that the problem seems to lie in the application program. Based on the description of the problem, the analyst may enter the name(s) of the data class(es) involved in calculating withheld tax during stage 6830 as a logical place to begin analyzing the problem.

Based on the received data identifier, the process displays the top level of the desired data, such as the identified data class or data object (stage 6840). In one embodiment, the process may display a list of one or more top level data classes that correspond to the received identifier criteria, such as the list of data classes 6205 shown in FIG. 62 (again ignoring for this example the displayed items that are not part of 6205). In one embodiment, the process may also display lifecycle indicator(s) 6210 with each top level data class, which indicate how the data objects of the class were accessed during execution of the application. For example, as described above, a plus sign (+) may be used indicate that an object was created, a triangle or delta (Δ) may be used to indicate that the data in an object was modified, etc.

Figure 62:
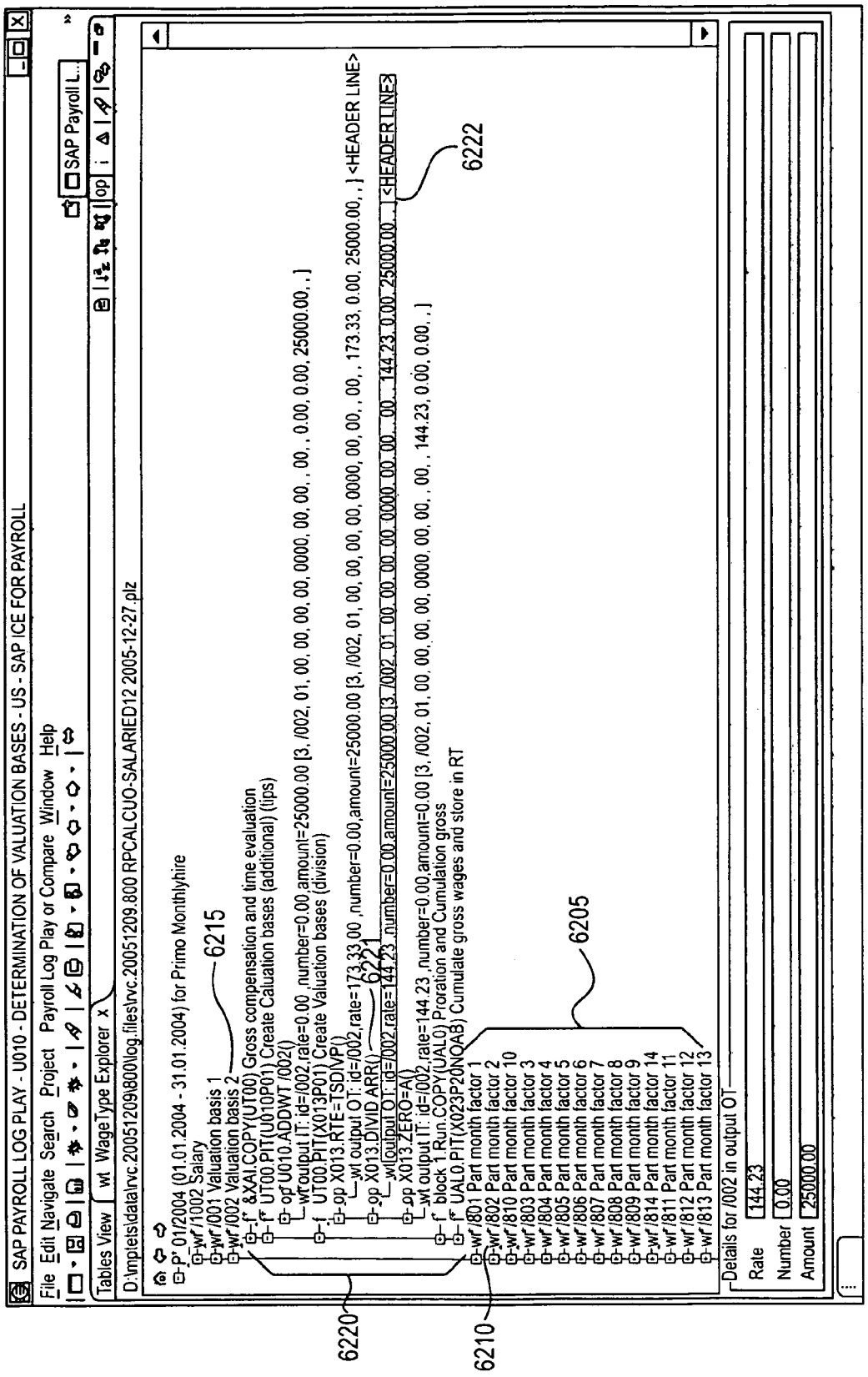

Next the process of FIG. 68 allows the user to drill down to display execution events and operations, related data objects, etc. that affected data objects of the identified type during execution (stage 6850), which enables the user to efficiently trace, analyze, and debug the lifecycle of a particular data object in the application program. For example, as shown in FIG. 62, if a user was interested in examining data class "/002 Valuation basis 2" 6215, the user could click on the displayed item to drill down and display all the functions 6220 that affected data class "/002 Valuation basis 2" 6215 during execution of the application. Similarly, as described above, the user could also drill down into each function to see the operations (e.g. operation 6221) executed by the functions related to the identified data class, and drill down into the operations to see the values of the data objects (e.g. data object values 6222) as they were processed during application execution. As shown in the embodiment of FIG. 62, the process may display lifecycle indicators (+, −, Δ, etc.) with the function and operation level display entries. Using the described displays and processes, a user may easily trace through the lifecycle of any given data object in an application without the distraction of information related to the other data objects in the application.

In one embodiment consistent with the invention, a user may edit a function, operation, data object, attribute of a data object or class, etc., using a display like FIG. 62 and the changes may be transferred to a model, such as an object-oriented model of the application, which may in turn be transformed into a working version of the application, as described in previous sections.

One of ordinary skill will recognize that stages may be added to, deleted from, or modified in the process shown in FIG. 68 without departing from the scope of the invention.

One of ordinary skill will also recognize that although some exemplary embodiments are described in the context of the SAP R/3™ system and its applications, the principles of the invention may be applied to many systems and applications. For example, many applications (e.g., a Java™ program application) may be configured to generate, (or utility programs can be used to generate), execution flow logs (or live execution information) containing information regarding affected data classes and the lifecycle of data objects during application execution. And many applications, especially those written in object-oriented languages, may be easily analyzed to determine the data classes and objects used. With this information, systems and methods consistent with the invention can produce data-focused execution information consistent with the invention.

Applying Intelligent Filters

Typically, users configuring large, complex business applications must spend large amounts of time identifying and correcting errors caused by, for example, customization of the application. For example, consultants configuring a business application for a company may create custom functions, create new classes or objects, copy classes or objects, etc. to customize the business application according to the company's needs. If during the customization process the consultant makes an error, such as copying a business object into another class but forgetting to include an attribute of the object into the copy procedure, the application will not run correctly. For example, if a user misconfigures the currency type attribute of a net pay object in a payroll application, the system may default to a type of currency that is incorrect for the business (e.g., default to U.S. dollar for a Canadian business). The resulting paycheck amounts will be corrupted when the payroll application is run, and as a consequence, some employees may be overpaid or underpaid.

In conventional systems, to determine the source of such an error, a user would need to methodically examine a log of executed actions, operation by operation, to search for the error (e.g., a missing object attribute). For example, in typical table-driven systems, a consultant may have to search for an error (e.g., an incorrect or missing currency attribute) in each relevant table. This is often done as the program executes under the control of a debugger, or in some systems, after execution using a data event log recorded previously as the program executed. For example, the SAP R/3™ system generates a very detailed sequential log containing information about each operation executed by an application and each data object(s) affected by each operation.

The consultant would need to determine each relevant table using the execution log, examine each relevant table, look for the appropriate attribute within each table, and then within the attribute, look for the absence of the correct data, a process which may be extremely time consuming, tedious, and difficult to perform. Even with a modern debugger using helpful features such as breakpoints and watchpoints, analysis and debugging by walking through the execution operations of an application is extremely tedious, difficult, and time-consuming, especially for large, complex applications which execute thousands, or hundreds of thousands, of lines of code because most of the execution flow operations are unrelated to the data object(s) associated with the problem. In a system that relies on execution-flow data event logs for debugging, tracing, etc., such as an SAP R/3™ system running business applications for large organizations, it is even more difficult and time consuming to find the exact place where a particular problem or error occurs with an object by tracing through thousands and thousands of operations in execution order and examining the recorded values for every data object involved because there are few helpful debugging features.

Exemplary methods and systems consistent with the invention enable data-focused analysis of an application by filtering a reorganized data-focused log of the sequential execution information generated for an application. In one embodiment, the system may include a preconfigured intelligent filter that may be used to filter a data-focused log based on certain object(s) and including the operations that affected the object(s). For example, a user may select an option (e.g., the triangle or delta (Δ) button shown in FIG. 61) to automatically filter the data-focused log of FIG. 61 using the preconfigured intelligent filter. As a result of the automatic filter, a user interface may automatically display only those objects that were changed, deleted, etc. during execution, as shown in FIG. 62, along with operations that changed those objects. In another embodiment, the filtering may pull the only operations that acted on objects specified by filter parameters, as described in more detail below. In another embodiment, the filter may pull only the operations that affected specific data objects where thresholds associated with object attributes exceeding a specified range (or with the range, or below the range, etc.) as discussed in more detail below.

In one embodiment, systems and methods consistent with the present invention allow a user to filter application execution information associated with specific data objects to identify lifecycle events and use the filtered execution information to expose such errors. For example, the user may filter execution information to see all data objects containing salary data with an amount reaching more than one million dollars, which may, in the user's judgment, indicate an error (e.g., that an incorrect currency type was configured for the company's payroll application.)

Figure 69:
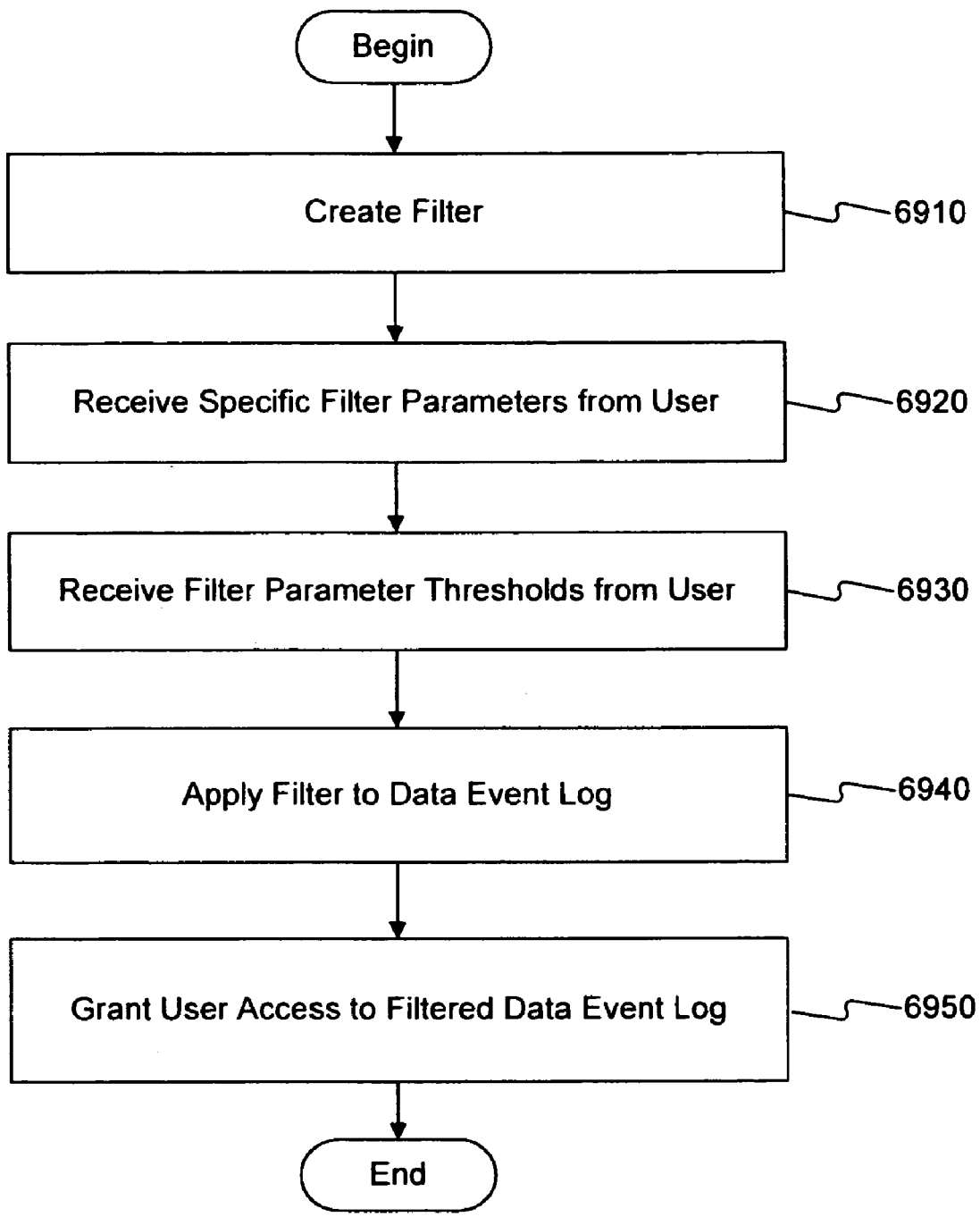

FIG. 69 is an exemplary flow chart illustrating a method for applying intelligent filters to application execution information. A filter is created (step 6910) and displayed to a user, for example in a graphical user interface. In one embodiment, a user interface such as an ICE may allow a user to create a customized filter to identify lifecycle events.

Next, the user may specify the parameters of the filter (step 6920). Alternatively, the user may use default parameters or a preconfigured filter, as discussed above. Referring for a moment to the embodiment shown in FIG. 63, for example, a user may enter parameters by data object or wagetype ("Search Wage Type" 6330), function ("Search Function" 6335), or operation ("Search Operation" 6340). As shown in FIG. 63, in one embodiment, the user may specify various filter parameters, which may be object attributes such as a wagetype name, number, rate, rate currency, amount, or amount currency, by selecting checkbox(es) 6301 associated with the desired filter parameter(s).

In one embodiment, as shown in FIG. 69, the filter may also accept specific thresholds or other values for each filter parameter (step 6930). For example, as shown in FIG. 63, a user may search for specific wagetype objects by selecting a parameter 6305 "Rate" with a threshold 6310 equal to 0, a parameter 6307 "Number" with a threshold 6308 "greater than 25," and a parameter 6315 "Wage Type Name" with a value 6320 equal to "/844." The filter parameters, thresholds, and values shown in FIG. 63 are merely for illustration, and a skilled artisan will appreciate that many other means and methods may be used to specify filter parameters, thresholds, and values.

As shown in FIG. 69, once the filter parameters and thresholds are defined, the filter may be applied to application execution information, such as a data event log (step 6940) to retrieve business objects according to the specified filter parameters and thresholds. In one embodiment, the filter may be applied to a data-focused log, such as the reorganized data event log of FIG. 61, which is described above. The filter may be used to focus the log, extracting the objects relating to the specified parameters and thresholds to create a filtered data event log.

Figure 64:
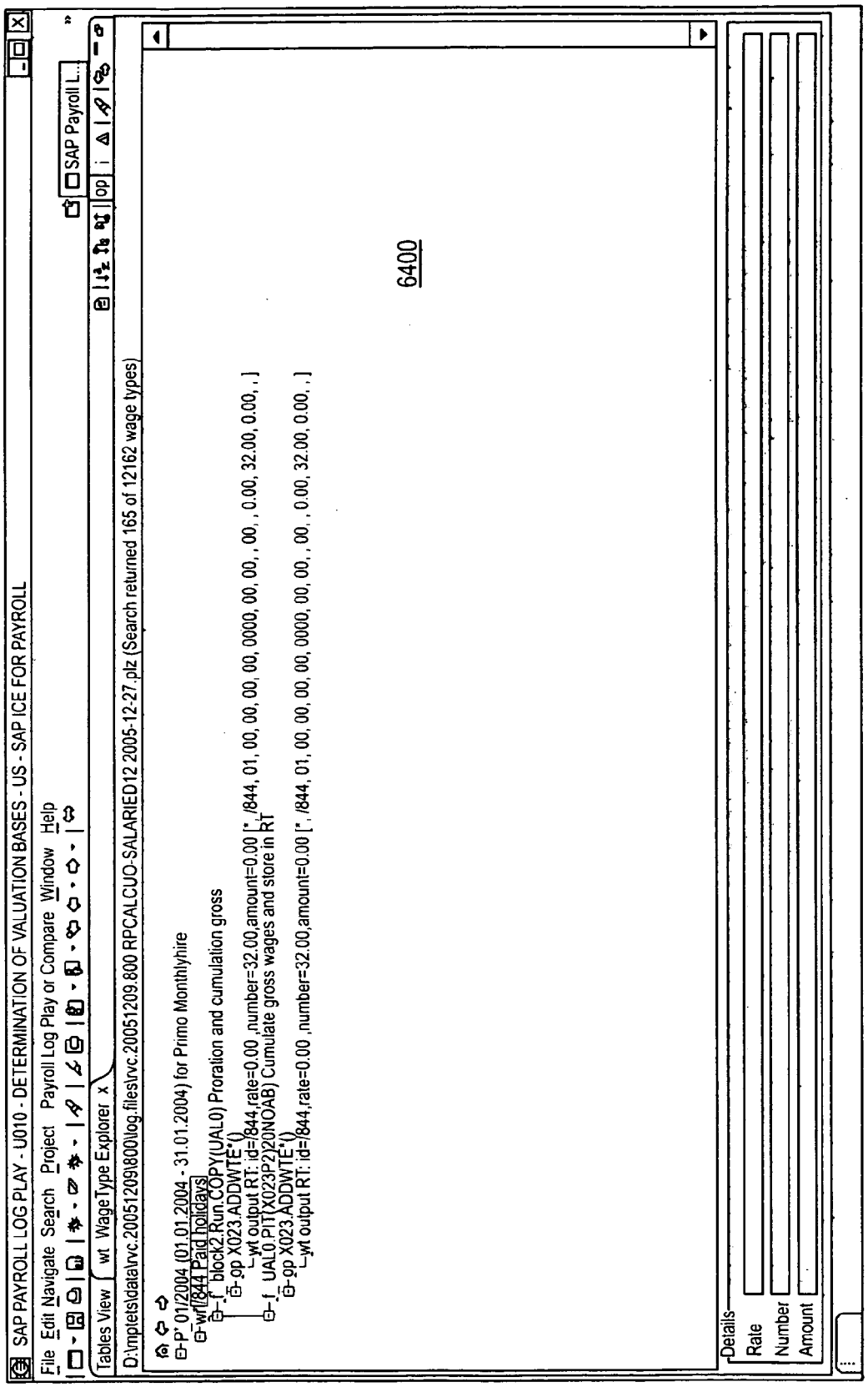

The user may access the filtered data event log (step 6950). As shown in FIG. 64, for example, a graphical user interface that is part of an ICE may display the filtered data event log 6400. Filtered data event log 6400 may include only those objects relating to the requested filter parameters and thresholds, so that a user does not need to sort through a vast amount of data. For example, the ICE displaying filtered data event log 6400 only includes objects relating to the wagetype named "/844" with a "number" greater than 25 and a "rate" equal to 0, as specified by the filter of FIG. 63.

In one exemplary embodiment, filtered data event log 6400 may be sorted chronologically, so that the user may see operations on an object in order of execution. In another exemplary embodiment, filtered data event log 6400 may identify the developer who modified, accessed, created, or deleted an object or class. In yet another exemplary embodiment, multiple filters may be created, applied, stored, shared, and reused. A user may also repeatedly modify filters using, for example, the user interface of FIG. 63. A skilled artisan will appreciate that many other means and methods may be used to create and modify filters.

Providing an Interactive Business Application Configuration Environment

Most business applications can perform many different types of functions and operations, some of which may not be appropriate or absolutely necessary for the business using the application. Consequently, a business application may need to be configured or customized for the needs of the business. For example, a German company using a payroll application to create monthly paychecks for part-time, non-salaried employees may need a different configuration for the payroll application than an American company using the application to create weekly paychecks for full-time, salaried employees.

Additionally, some business applications are simple to configure, but are not practical for different company's needs. For example, a simple payroll application may have a configuration environment that includes a user interface with only a few check boxes, so that it is only configurable to print standard paychecks for salaried employees who live in one area of the country. One disadvantage of these simple business applications is that they are not adjustable. For example, simple business applications could not be configured to print paychecks for non-salaried employees in another state.

Other, more complex business applications, as discussed above, often involve large, table-based systems and evolve over many years as businesses grow and change. One advantage of these more complex business applications is that they may be configurable for many types of companies, offices, employees, and different countries. Unfortunately, one disadvantage of more complex business applications is that frequently, they cannot be easily configured (e.g., simply by using checkboxes in one interface) because the systems are too complex. Due to the complexity of these business applications, it may take years to appropriately configure the business application for a company.

Because of their legacy nature and highly customized usage, complex business applications typically have limited configuration tools to assist in the configuration and maintenance of the applications. Typical configuration environments are not integrated with the business application, so a person modifying the configuration of the application (e.g., a consultant) may not see the effect of a change until the modified system is run. For example, in the SAP R/3™ system or in other applications, option screens may be available to a user to configure the application. For example, a user may need to configure a business application for a company, but may not immediately be able to determine which objects may be affected by the change in the underlying business application, in part because business objects in the application may have been created by another developer. With hundreds or thousands of lines of code, and with hundreds of different screens to display each small section of code affecting the business application, a user may have great difficulty understanding and keeping track of the relationships between objects that could be affected by any single change to the system. Thus, users may need specific tools to configure applications, and traditional tools, such as form windows with parameter check boxes, are not suitable for configuring complex business applications.

Further, different programmers may develop custom tool sets or configuration screens in their own ways, so that configuration screens and tools created by different developers are not consistent throughout the system. The programmer or consultant who configures an application after development (i.e., the person who uses the screens) may not have the necessary insight into, or knowledge of, the relationships between the underlying business objects, classes, functions, etc., to properly configure the application.

For example, as discussed above, in typical table-driven business applications, a user needs to understand relationships between the tables before he can configure the application. Using tools such as an execution log, the user may see a list of tables or rules, as shown in the R/3™ log of FIG. 65 and as described above. However, the log may not show a table's relationship to other tables, rules, schemas, etc. When configuring a business application, the user may manipulate or affect thousands of tables, hundreds of rules, hundreds of schemas, and hundreds of other parameters that affect the execution of the application and the final result. Using existing tools, it may be virtually impossible for a user without prior knowledge of the system to examine every one of the tables, rules, schemas, and parameters relevant to a change individually, and determine their integral relationships within the business application's configuration.

For example, turning to FIGS. 32-35, a user configuring a table-driven business application would need to examine each table or log of tables separately, to begin to resolve the relationships between the tables. The user would have to use each screen separately to configure, for example, a wagetype as shown in FIGS. 32-33, or a rule operation, as shown in FIGS. 34-35. Since each of these screens presents very little information, and is limited to just the one screen, the user cannot tell that the tables, rules, attributes, operations, etc., are actually linked to, interact with, affect, depend from, etc. other tables, and the user cannot see that changes made to one object affect another. Further, in a table-driven configuration environment, a user has no central viewpoint to see an overview of the tables in the application. In SAP's R/3™ system, for example, an IDE is built in, and a developer can manipulate the source code and structure of the program, such as a particular table's content. However, a wagetype, for example, is stored in twenty tables, so a consultant using the IDE cannot see the big picture or the relationships between the tables. A consultant who configures a company's R/3™ system, or another table-driven business application, must have his own understanding of how each table in the system relates to other tables, because the configuration environment does not help the consultant to determine those relationships.

When the table-driven business application is transformed to a model, such as an object-oriented model, however, a user (e.g., a consultant) may more easily configure the application, because the relationships between objects may be enforced, managed, and displayed using a single, integrated configuration environment (ICE) that operates on the model. Integrated display environment capabilities may be made available to the user to configure the business application, and may provide a single view to the user.

For example, in FIG. 36, a user can see several panes within one window showing relationships between objects. As shown in FIG. 36, a user interface with object-oriented elements of a business application are integrated and presented in one configuration environment. Using this ICE display, a user configuring the modeled application can see what objects are interrelated and affected by his changes because the model includes the interrelations between objects. In contrast, in a table-driven business application, it is virtually impossible for a user to determine the relationships to other tables from individual configuration screens, as shown in FIGS. 32-35.

To assist in the configuration and management of such business applications, systems and methods consistent with the present invention enable a user to configure and maintain business applications using an ICE, customizing the application for a customer's needs.

In one embodiment, the ICE is implemented using a platform designed for building an integrated development environment (IDE), such as the Eclipse Platform, which is an open source community project maintained by the Eclipse Foundation. As described above, an IDE is a type of computer software that assists computer programmers to develop software. IDEs enable users to design and manipulate code, such as object-oriented code, in an easy-to-understand manner. An IDE may include multiple programs that are run from a single user interface. For example, programming languages often include a text editor, compiler and debugger, which are all activated and function from a common menu. Other IDE tools may include a version control system, a graphical user interface (GUI) tool, a class browser, an object inspector and a class hierarchy diagram, for use with object-oriented software development. IDEs are available for specific programming languages, for example, a Visual Basic IDE, or for multiple languages, for example, an Eclipse IDE. In this way, source code can be re-factored, viewed in the editor, renamed, etc.

Figure 73:
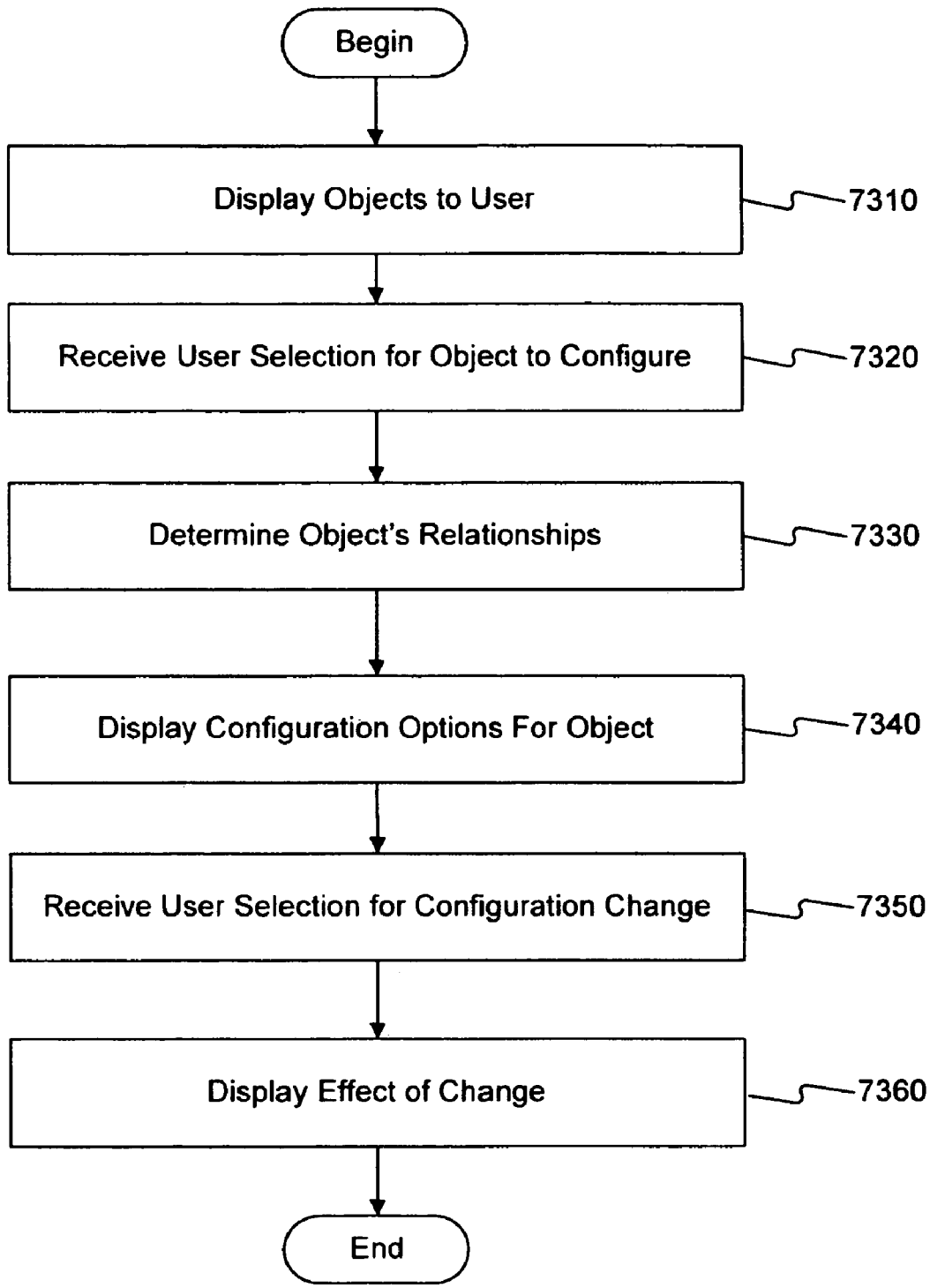

In one embodiment consistent with the invention, an ICE is a configuration environment that may be used like an IDE to configure a business application for a specific company's needs. FIG. 73 is an exemplary flowchart that illustrates a process 7300 for using an. ICE to expose a business application object and its relationships to other objects. The ICE may specify the tools available for use with an application model. For example, an editor may be associated with objects in the underlying business application, actions may be associated with the objects, and an interface may be associated with objects to display them to a user (step 7310). As shown, a user may select a type of business object, such as a rule (step 7320), and the ICE may determine the object's relationships to other objects or rules (step 7330). For example, the ICE may determine that object 4105 "0170—Flexible Spending Accounts" as shown in FIG. 44, is related to "RBE2—Benefits Second call," which is related to "Payroll Schema," which is related to "USA.rna.800." The ICE may display or make available a set of configuration options for the selected object (step 7340). For example, turning back to FIG. 36, the ICE may show configuration options such as option 3605 "2—Eliminate wage type" for processing class 20. Next, the ICE may receive a user's selection for a configuration change (step 7350). After receiving the selection, the ICE may dynamically recalculate the model including the effect of the change on all related objects, and display the effect of a potential change (step 7360).

In one embodiment, the ICE integrates and displays a business application or a model of the business application using a single, interactive display, allowing a user to configure a model that has been extracted from the business application and understand relationships between objects used in the business application. The interactive display may simplify navigation from one object to another object and may allow a user to validate different aspects of a configuration.

The user may configure a model using the display by, for example, creating a new rule object. Changes to the model, however, do not necessarily affect the actual business application. Thus, the user may preview the potential effects of the new configuration without changing the modeled business application. For example, the user may see how a change to one rule may affect various objects within the business application. In one embodiment, if the user is satisfied with the change, the user may then apply the new or modified rule in the entire business application. In another embodiment, if the user accepts the changes, the underlying code may be automatically updated with the changes. In this way, users may easily analyze, test, and manipulate all aspects of a business configuration using an integrated configuration environment, without immediately affecting the underlying source code.

In a payroll business application, every rule, every object, every schema, and everything else may include a country attribute. The country attribute may not have been originally programmed to be enforced, but a user may designate the attribute as enforced, see the effect the designation would have on the business application using the ICE, and then apply the change. In another example, a user may want to change particular attribute's range of values from 0 to 9 to 0 to 6. In typical systems, a consultant would have to write a special program to test the effect of this change. The ICE may immediately display the specific rules that would be affected by this change, so that a consultant may check relationships between objects, and immediately test a modification to an object in the business application, without affecting the underlying code.

In one embodiment, systems and methods consistent with the present invention also provide a consultant with the capability to build a customized user interface for the configuration by combining different types or objects, or different views for a particular task. For example, a user may choose which objects to view and manipulate at the same time. The user may set up one viewing pane to see references to a particular object when the object is displayed in another pane. For example, while a user is configuring a rule, the user may at the same time see the object(s) that may be manipulated with the rule. In this way, a user configuring an application may have a tool set similar to that of a code developer in an environment that understands the meaning of the configuration objects. So, a consultant who develops the configuration has features that developers have in an IDE, such as autocomplete, instant reference resolution, error recognition, and others, all in a single integrated environment. The ICE may act as a guide for the user, who may click on an object and see how it is connected to other objects or rules.

In one embodiment, the application model used by the ICE may be separated from the actual application that it represents. The model may act as metadata of the application. Using the ICE, a consultant can manipulate configuration aspects of the application without affecting the actual application itself.

In one embodiment, the ICE extends the IDE by including the actual business meaning of the objects that are exposed. With an IDE, a user works at the code level, to, for example, refactor code, manipulate the code, and show the code. An ICE operates at the level of the business objects used for the particular application, so that a user is not trying to optimize the code representing a wage type, but instead changes or configures the wagetype's values for business purposes. The ICE allows a consultant to configure a business object itself, and to see how the configured object relates to other objects in the application.

In one embodiment of an ICE, as shown in FIG. 36, every object may be displayed, and each object may be shown in a single view. For example, for the data class 3605 "20—Cumulation and storage shown at end of gross part" shown in FIG. 36, a form may display the objects of data class 3605 themselves, so that a user may modify the objects themselves. Moreover, while a user is changing different aspects of an object (e.g., a adding a field, or adding a value), the ICE can automatically produce the massive updates of the underlying model.

In one embodiment, the ICE may be used to configure an existing application for a specific use, such as modifying a company's payroll. For example, for an SAP R/3™ payroll application, the ICE may display choices for a consultant to modify various wagetypes (e.g., to change a country parameter for an office's payroll.) The ICE for the payroll application may also allow a user to modify any wagetype, processing class, rule, schema, etc., and to view the effects of changes. In another example, an ICE for a finance application may allow a user to configure parameters for general ledgers, accounts, debits, credits, etc.

Incrementally Exposing Business Application Errors Using an Integrated Display

Embodiments of methods and systems consistent with the invention determine errors in an application, such as a business application, modeled with an object-oriented hierarchy and expose the errors at different levels in the hierarchy, for example, using an integrated display.

Many computer applications, and especially large, complicated, legacy business applications, tend to be coded and modified in any manner that results in a system that works. That is, a system that produces the correct results or output. Over time, however, generation of modifications, usage changes, etc. cause inconsistencies, subtle or transitory bugs, inefficient implementations, and a host of other problems to accumulate, making the application unreliable and error-prone. For example, a developer or programmer may omit proper code or configuration modifications for different reasons, such as performance reasons (e.g., not creating a foreign key within the database because it slows access), complexity reasons (e.g., a case should never occur so code is not created to handles that case), because of a design decision (e.g., one object is considered too unrelated to another object so their relationship is not formally documented), or because of laziness or a mistake (e.g., using a function, procedure, etc., specifically designed for one environment in another environment where it happens to give the correct output for the specific inputs that the developer is facing).

Application usage changes can also cause problems. For example, a developer may design an application for one purpose, and after delivery to a customer, the customer may find a way to use it for another purpose in another field. The new field of use, however, may require some limitations that were not designed into the application. Consequently, some things may not work as intended. For example, consider a business application program designed for businesses operating in the United States that is then modified for use by Canadian businesses. While it may function correctly for most Canadian businesses, it may not function correctly for certain Canadian businesses that are too dissimilar from U.S. businesses.

As noted previously, analyzing and debugging such problems by walking through the execution operations of an application can be extremely tedious, difficult, and time-consuming, especially for large, complex applications which execute thousands, or hundreds of thousands, of lines of code, where most of the execution flow operations are unrelated to the data object(s) associated with a problem, and especially for design or usage problems that manifest themselves intermittently or under only rare circumstances when executing.

Figure 72:
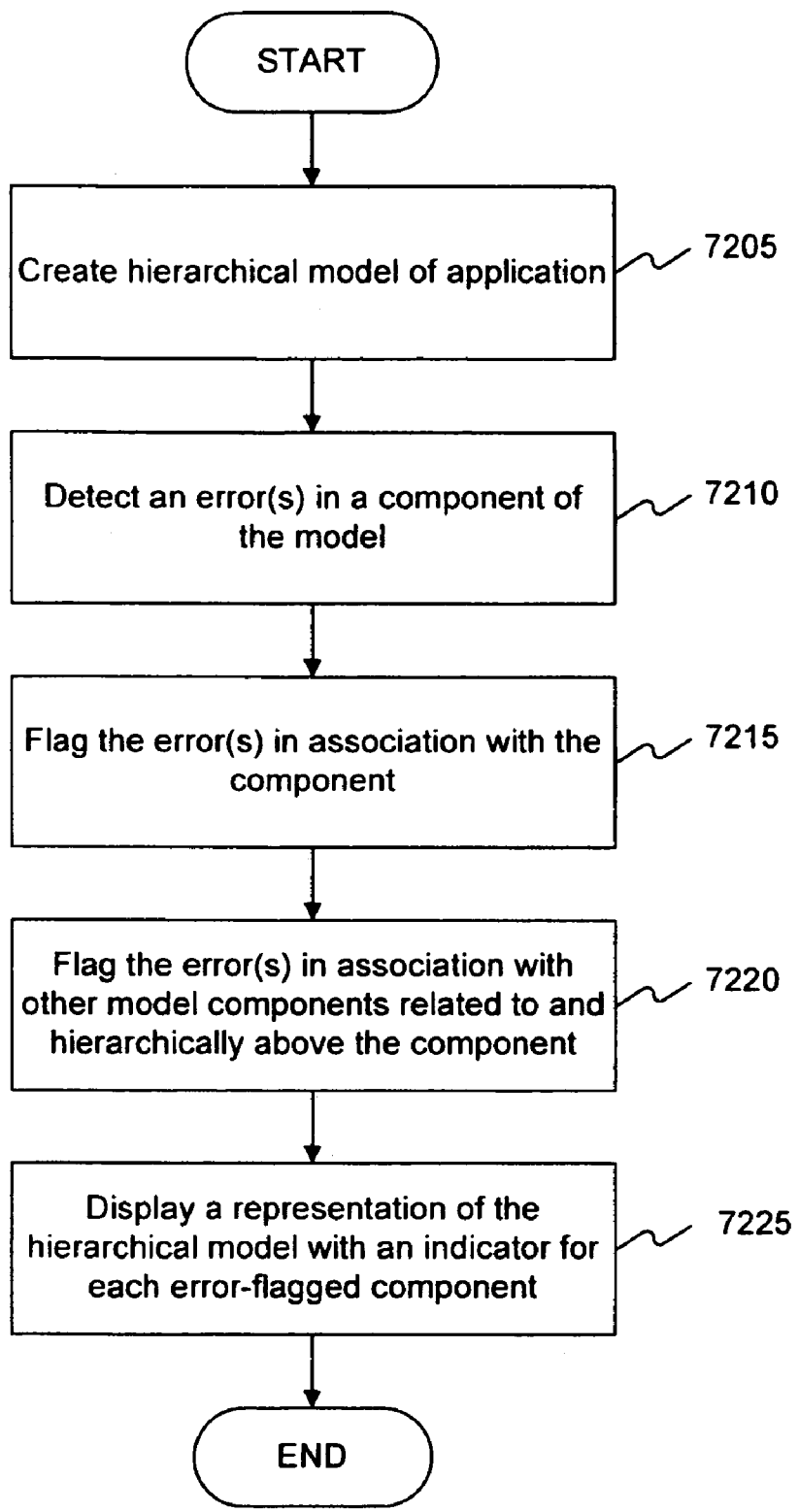

Embodiments of systems and methods consistent with the invention expose application errors using a hierarchical model of a business application program and indicate errors at multiple incremental levels of the hierarchy. FIG. 72 is a exemplary process for incrementally exposing errors in an application consistent with the invention. As shown, the process begins by creating a hierarchical model of an application, such as a business application (stage 7205). Details of this stage are explained above in this specification. As described previously, in one embodiment the hierarchical model uses OOP language constructs to represent and enforce the data, functions, interrelationships, and hierarchy of the application objects, and this technique may be particularly useful in the context of legacy, table-driven, business applications, such as, for example, those running on an SAP R/3™ system. Also as described previously, in some embodiments the entire model is updated or recreated as a user modifies it. For example, if a user deletes a data object or operation, which may affect many other places in the model that used the deleted object or operation, the system recalculates the model based on the deletion.

Next, the process detects an error(s) in a component of the hierarchical model (stage 7210). For example, as explained above, modeling a business application in an object-oriented language such as Java™ enables a user to apply many different types of analysis tools and development environments to identify errors and inconsistencies within the model, independent of the actual business application being modeled. In one embodiment, the hierarchical model of the business application is loaded into the workspace of an integrated development environment such as the Eclipse Platform, which is maintained by The Eclipse Foundation. Modern software development tools can identify problems and inconsistencies that are very difficult to find using the original table-based code and structures of the actual business application. As explained previously, a configuration object may be defined by analyzing the configuration of a table-based business application and generating an object model representing the application's configuration.

For example, in an SAP R/3™ payroll business application, every data object (e.g., every rule, schema, wagetype, etc.) includes a country modifier or attribute. That is, a rule designed to be used in Brazilian payroll calculations, e.g., to calculate Brazilian withholding tax, includes a country modifier indicating Brazil, while a similar rule to calculate German withholding tax includes a country modifier indicating Germany, while other rules may include a country modifier indicating they are applicable for all countries. In an SAP R/3™ payroll business application, however, the country modifier attribute is not an enforced attribute. That is, a rule with a country attribute designating Brazil can be invoked and executed in a German payroll application without any indication from an R/3™ system that this may be problematic. Similarly, a Brazilian rule may be mismarked as applicable all countries, and some developer may configure a German application to use this rule because it produces the correct result in the developer's situation. Although these examples are clearly application misconfigurations, the R/3™ system does not detect them or enforce consistency among attributes. When a user misconfigures an application, it may work correctly for a time, but problems often arise over time. For example, a developer configuring a system may change a Brazilian rule to correctly implement a Brazilian tax law change, but the developer may not realize that the Brazilian rule is also being used by a German payroll application. The correct Brazilian updates affect, and probably cause errors in, the German payroll application that is misconfigured to also use the rule. Worse, there will be no obvious cause from the German point of view, and the German application may generate only intermittent errors caused by the change. Such problems are very difficult to debug and correct.

Analysis of a hierarchical model of the payroll application, however, will reveal a Brazilian-attributed rule that is part of a German-attributed application as an error because the model enforces attribute consistency among related hierarchical objects. For example, as described previously, the model may be an OOP model divided into unique configurations or projects based on top level characteristics or attributes, such as the system running the application, the client name, and the client country attribute, and the model maintains internal consistency so that lower hierarchy level objects' attributes correspond to the top level attributes. The model recognizes attributes, knows their meaning, and detects an error when attributes have improper values. Thus, a Brazilian rule invoked by a function under a German project hierarchy will be flagged as an error. As described previously, many other types of errors in addition to misconfigurations may also be detected in the application model.

As shown in FIG. 72, the process next flags the component that was determined to have an error (stage 7215). The process then proceeds up the model hierarchy and sets an error flag in each higher level component related to the detected component (stage 7220), propagating the error flagging up to the top of the hierarchy. For example, an error detected in a function may cause flagging of the function, flagging of the method that calls the function, flagging of the object that owns the method, flagging of the class that the object is an instance of, and flagging of the project that owns the class. Furthermore, as described previously, because the model represents an application, such as a business application, the errors that are detected and flagged are actually errors in the application that is being modeled, and many of these errors are undetectable in the environment of, and using the tools available for, the application that is being modeled, such as a business application on an R/3™ system.

Next, the process displays the hierarchical model with an indicator for each error-flagged component (stage 7225). A user may utilize this display to efficiently analyze and correct the detected errors.

One of ordinary skill will recognize that stages may be added to, deleted from, or modified in the process shown in FIG. 72 without departing from the principles of the invention.

FIG. 27 is an exemplary user interface from an embodiment of a system that incrementally exposes business application errors consistent with the invention. As shown, the system has detected an error 2710, namely that "Rule 9112 cannot be resolved." The source of the error is not important, and it may have been caused by any number of things. For example, the error may be present in the current version of the business application being modeled, or a user may have deleted "Rule9112" when working with other objects, and when the system recalculated the model to account for the deletion, it detected this error, and perhaps similar errors several other places. As shown, the system flags or marks the error in the display of "Rule9012," which calls "Rule9112," by displaying an "x in a square" ⊠indicator symbol 2705 next to the call to "Rule9112." Similarly, the system displays another error indicator symbol ⊠2710 next to "Rule9012" in the outline view display of Payroll Rules because "Rule9012" called "Rule9112" and is therefore the object above Rule9112 in hierarchy. The system also propagates the error indication up the hierarchy, flagging or marking the error for the object hierarchically above "Rule9012" and displaying another error indicator symbol ⊠2720 next to "Payroll Rules" in the object hierarchy display for project USA.ma.800. (The text "Payroll Rules" is the display representation of the payroll rules object in the hierarchical model of the business application, and the payroll rules object is related to the rule9012 object.) Similarly, the system propagates the error indication up the hierarchy further, flagging or marking the error for the objects hierarchically above "Payroll Rules," displaying an error indicator symbol ⊠2725 next to client object representation "800," an error indicator symbol ⊠2730 next to system object representation "ma," and error indicator symbol ⊠2735 next to country object representation "USA."

Figure 47:
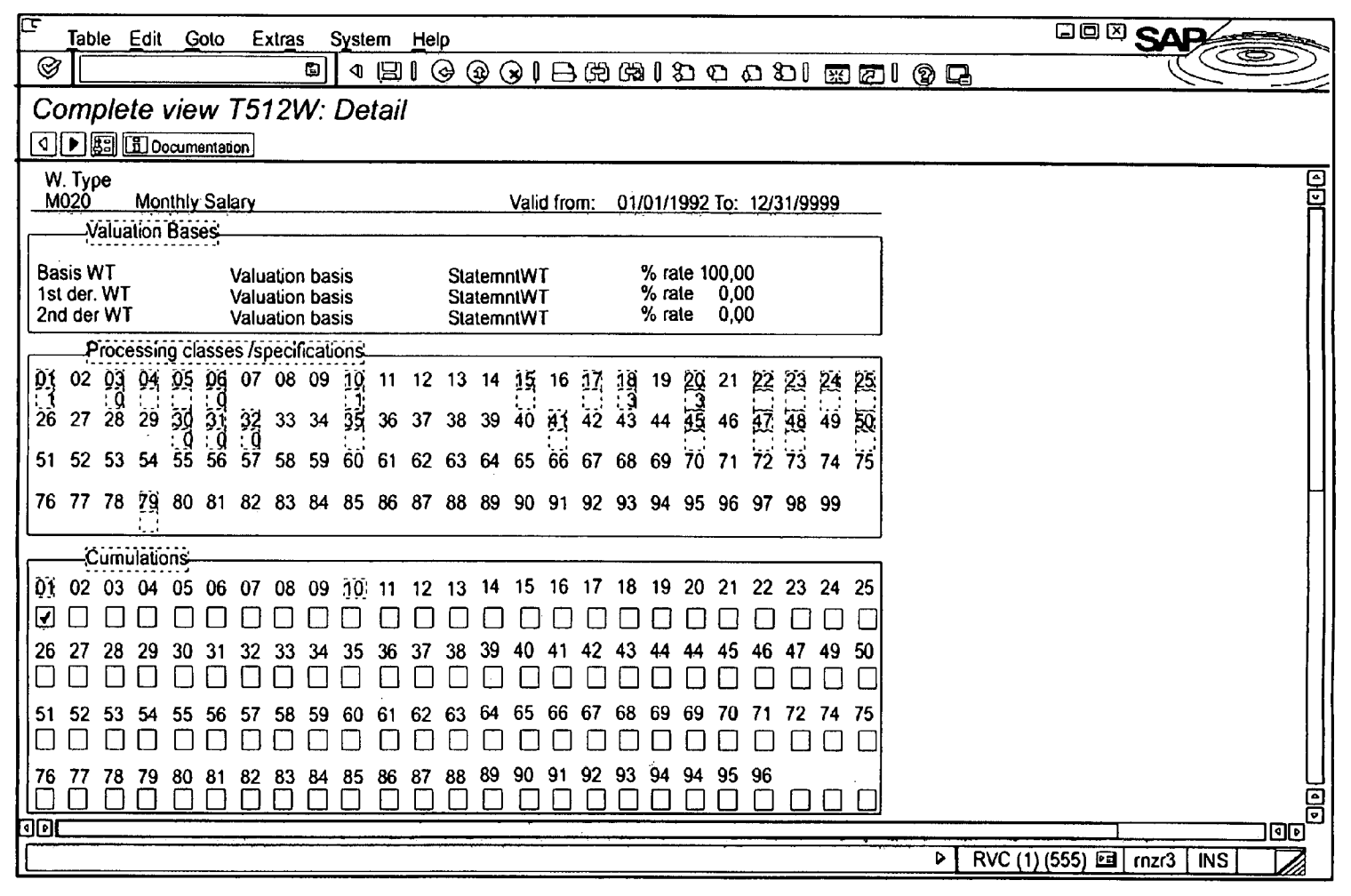

By starting at the top level of the application model hierarchy, for example at country object "USA" and traversing the hierarchy down by following the error indicator symbols, a user is quickly lead to the source of the problem with the modeled business application. This contrasts with the difficulty of finding problems in the business application itself using its native environment. For example, in the SAP R/3™ system, the user interfaces showed single objects, or sets of objects at a time, such as a list of rules, a list of functions, a list of wagetypes, etc., as shown, for example in FIGS. 32-35. These single object listings contain no indication or relationships to other objects and no indications of errors in related objects that might affect the object being viewed. In the R/3™ environment and similar business application environments, there is no efficient way to positively determine whether and how a change to one business object affects (including adversely affecting) other objects in the application, short of examining every other object one screen at a time. The error-checking provided by the R/3™ environment is on a per-object basis. For example, as shown in FIG. 47, which is an exemplary R/3™ screen for modifying a wagetype business object in a payroll business application, a user may be able to perform error checking on the single wagetype "T512W" by activating an error check function, e.g., by clicking a button on the screen. Although this reveals any errors in wagetype "T512W," it does not reveal errors in other wagetype objects or indicate what other objects to examine.

Moreover, even if a user went through the screens of all the objects in an application and activated the error checking function for each, problems could still occur. For example, one user may modify a first object, such as wagetype object, on a certain date and activate error checking for the object, showing that there are no errors after the modification; yet another user may modify a second object at a later date, where the second object is an object that the first object depends on, in a manner that causes an error with the first object. Systems such as the R/3™ system will not indicate the error in the first object on the screen used to modify the second object. A user will not be aware of the error caused to the first object unless he brings up the first object screen and activates the error checking function for the first object, but the system does nothing to guide him to do this. So typically, the error in the first object caused by the change to the second object will not be detected until the application is executed and produces incorrect results because of the error.

Embodiments consistent with invention, on the other hand, employ a model of the business application that enforces the hierarchical structure of objects that participate in the application, and apply processes to propagate an indication of errors up through the hierarchical structure of the application model. Thus, as shown in FIG. 27, a user may determine from the error indicator symbol ⊠2735 next to country object representation "USA" that a business application model under this country representation has an error somewhere, even if the windows showing the lower objects in the hierarchy under "USA" were not open. Moreover, the user may iteratively drill down (for example by clicking on) each lower level object representation with an error indicator symbol to easily pinpoint the object that is the source of the error, such as "Rule9112" 2701 in FIG. 27.

Merging Business Process Configurations

As described in a previous section, one aspect consistent with the invention is the ability to compare two models generated from two different configurations or versions of a business application and find the differences between the two models. For example, a test version of a business application in a lab may be configured differently from the production version of the business application that is employed at a customer site. Differences in the models of the two versions of the actual business application directly correspond to differences in the versions of the actual business application. As explained previously, being able to identify differences between two or more configurations of a business application is an important maintenance capability.

Embodiments of systems and methods consistent with the principles of the invention expand the usefulness of a differences capability by adding a merging capability, which allows the different features from one or more of the versions being compared to be combined or added to form a new model of a new version of the business application. As explained previously, the new model may then be transformed into a new version of the business application having the same configuration characteristics as the new model.

An efficient merging capability may greatly ease and improve maintenance of a business application. For example, the SAP R/3™ landscaping has three proposed configuration systems: (1) a development system, where the developers can do anything they want, in order to development the new configuration or new functionality the customer needs; (2) a testing system, where all certified changes from the development system may be tested; and (3) a production system, where the configuration is sent when it passes the test requirements. The production system is what a company uses in order to run their business application.

A consultant may wish to compare a development system of a business application to a testing system, or compare a testing system to a production system, for example to debug a problem found in the production system using the testing system. If the configurations of the two systems are not the same, then the consultant cannot be sure whether effects were caused by the bug or a difference in the system configurations. In typical tabled-based business applications, such comparison would require reformatting the table-based data into textual format, properly aligning the data, and then comparing each textual line of data. This process is extremely time-consuming and difficult to perform correctly, especially for complex business objects having interrelated structures that are scattered throughout tables in the actual business application implementation. When differences are found, the consultant will want to synchronize the two systems, updating the configuration of one or both so that they are both the same.

Differences in the configuration of business applications running on different systems may arise from many sources. For example, incremental changes to the same objects, code, etc. may not be completely implemented on, different systems. For example, if a first developer develops a change to a portion of the business application, such as function, rule, data structure, etc., on a test system for later installation on a production system, and another developer modifies the same portion based on the first developer's modifications, (e.g., to extend a rule's functions for the second developer's needs), but only the second developer's changes are installed in the production system, or if the second developer's changes are installed before the first developer's changes, then a problem has developed with the production system. Moreover, the production system may have locally installed configuration changes that are not used in the test system. Consequently the test system will not have the same problem (as it will have the correct developer-change configuration), so it cannot be used to debug the production system problem. To debug the problem, the production and test systems must be brought into a synchronize state.

To synchronize the two systems, a user must identify what changes need to go from one system to another (e.g., from testing to production, or from production to testing), merge the identified parts and create a new configuration. This is difficult to do for a complex business application, especially for a table-driven system such as the SAP R/3™ system.

Figure 74:
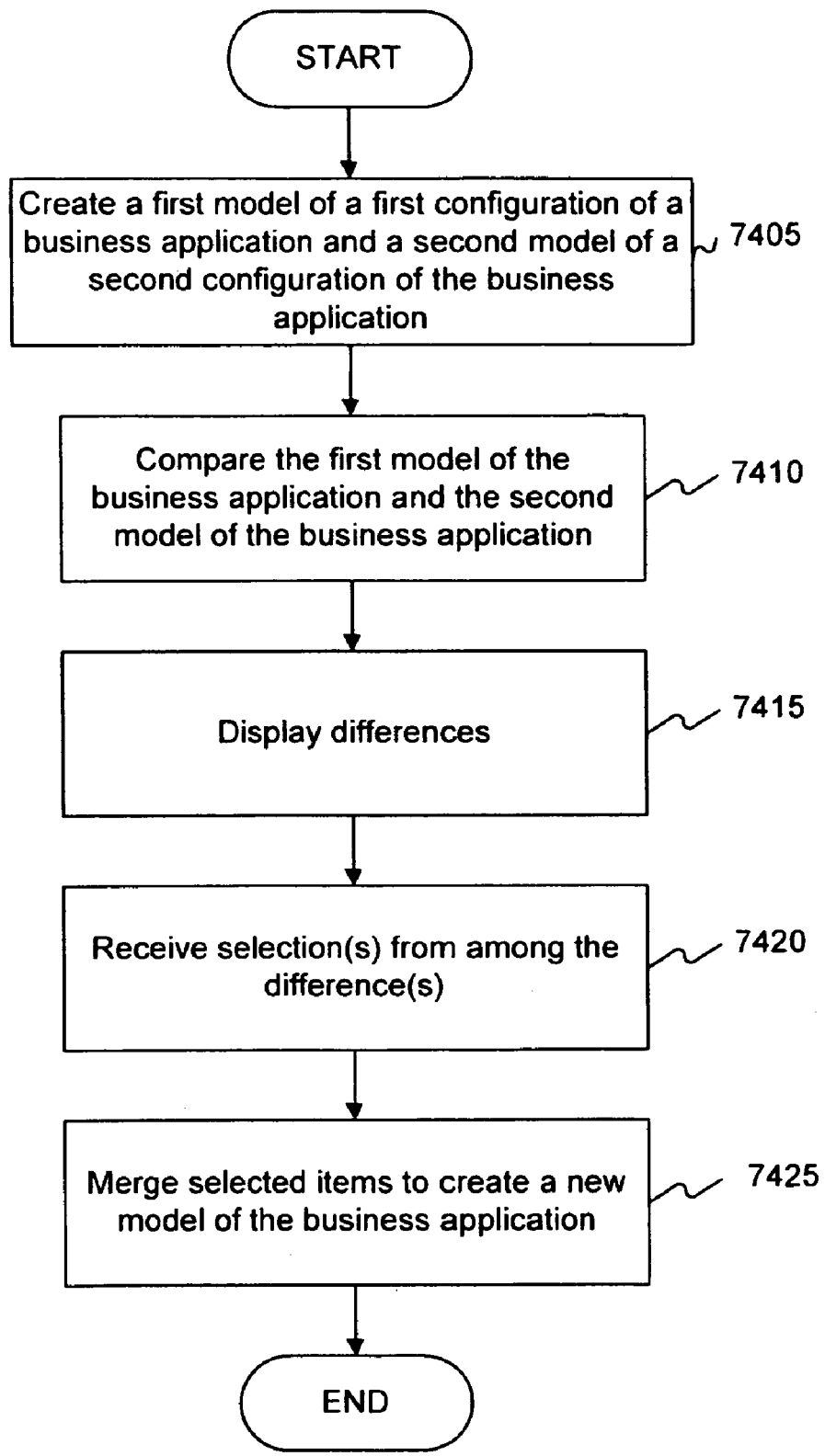

FIG. 74 is a flowchart of an exemplary process for merging business application configurations consistent with an embodiment of the invention. As shown, the process begins by creating a first model of a first configuration of a business application and creating a second model of a second configuration of a business application (stage 7405). Creation of a detached model of a business application is explained in previous sections. In one embodiment, the model may be an object model, for example, expressed in terms of object-oriented software code representing the configuration of the business application, but the model is not dependent on being represented in terms of an object-oriented programming language. For example, the model could be expressed in a set of tables representing the business application configuration, and analyzed with a tool that handles referential integrity checking using the set of tables.

Next, the process compares the two business application models (stage 7410). In one embodiment consistent with the invention, comparison is done between the objects that comprise the models of the business application, on an object by object basis. In one embodiment, the models comprise object-oriented language constructs and this functionality is implemented using an integrated development environment, which acts as an integrated configuration environment for configuring the business application. As explained previously, the data and code in the actual business application may be scattered and the relations between items may not be discernable. For example, in a system like the SAP R/3™ system the data and code may be scattered among many tables. Gathering this scattered information together and modeling it as an object or other structured entity allows the process to compare one object to another and find the differences in different aspects of these objects.

After the differences between the two models are identified, the differences are displayed (stage 7415). In one embodiment, the process is implemented to display corresponding portions of the two models, such as code portions, side by side and to indicate differences between the models with markers such as icons, different colors, bold text, etc. In another embodiment, the process may display an explanation of what is different, for example, using a pop-up text box activated by placing a cursor over the item of interest.

In another embodiment, for nonsequential data objects from the model (e.g., wagetype data objects from a model of an R/3™ payroll application), the process may display a textual explanation summarizing and explaining the differences between two corresponding data objects from the two different configuration models being compared. This explanation may include the business meaning of the object in the context of the business application. Side by side display for data objects may also be used, but nonsequential data structures typically do not adapt well to side by side comparison because they may have different subordinate objects, different names for fields and attributes, etc. In one embodiment, a data object from one model may be displayed with an icon(s) overlayed to indicate that a particular field is different from the corresponding field in the object from the other model.

Next, the process receives a selection of one of the desired configuration option from among the displayed differences (stage 7420). In one embodiment, a user chooses from among the displayed alternatives to decide which of the alternatives will be used in the merged model of the business application that will be produced. For example, a user may be trying to synchronize the configurations of two systems that are running the business application, such as a test and development system running a new configuration of the application and a production system running an old configuration of the application or a production system running a locally revised configuration of the business application and a test system running an unrevised, as-released configuration. As needed for the situation, a user may select the configuration changes that need to go from one system to the other system in order to make the business application equivalent on both.

In another embodiment, the selection of different configuration options is automated according to predetermined rules. For example, a rule may specify that the most recently modified object, line of code, etc. be selected, or a rule may specify that the configuration of one of the models will be chosen for a specified set of objects, while the rest of the object selections will come from the other model.

After the desired configuration items among the different items are selected, the process merges the selected items to create a new model of the business application (stage 7425). This, in effect, creates a third configuration model which is the merged version of both of the two starting configurations. In one embodiment, as explained in previous sections, the new model may be translated into a new version of the actual business application, and installed and run on a target system, such as a test system or production system as mentioned above.

One of ordinary will recognize that stages may be added to, deleted from, or modified in the process shown in FIG. 74 without departing from the scope of the invention. For example, the process stages may be modified to handle three of more configuration models at a time, or the display stage 7415 may be deleted for implementations where the difference selection is automated. One of ordinary skill will also recognize that the processes described in this specification may be implemented with the assistance of an ICE or IDE loaded with the business application models, which provide functions to assist a user in viewing, managing, and modifying the models and their elements, for example, object-oriented language elements.

Figure 67:
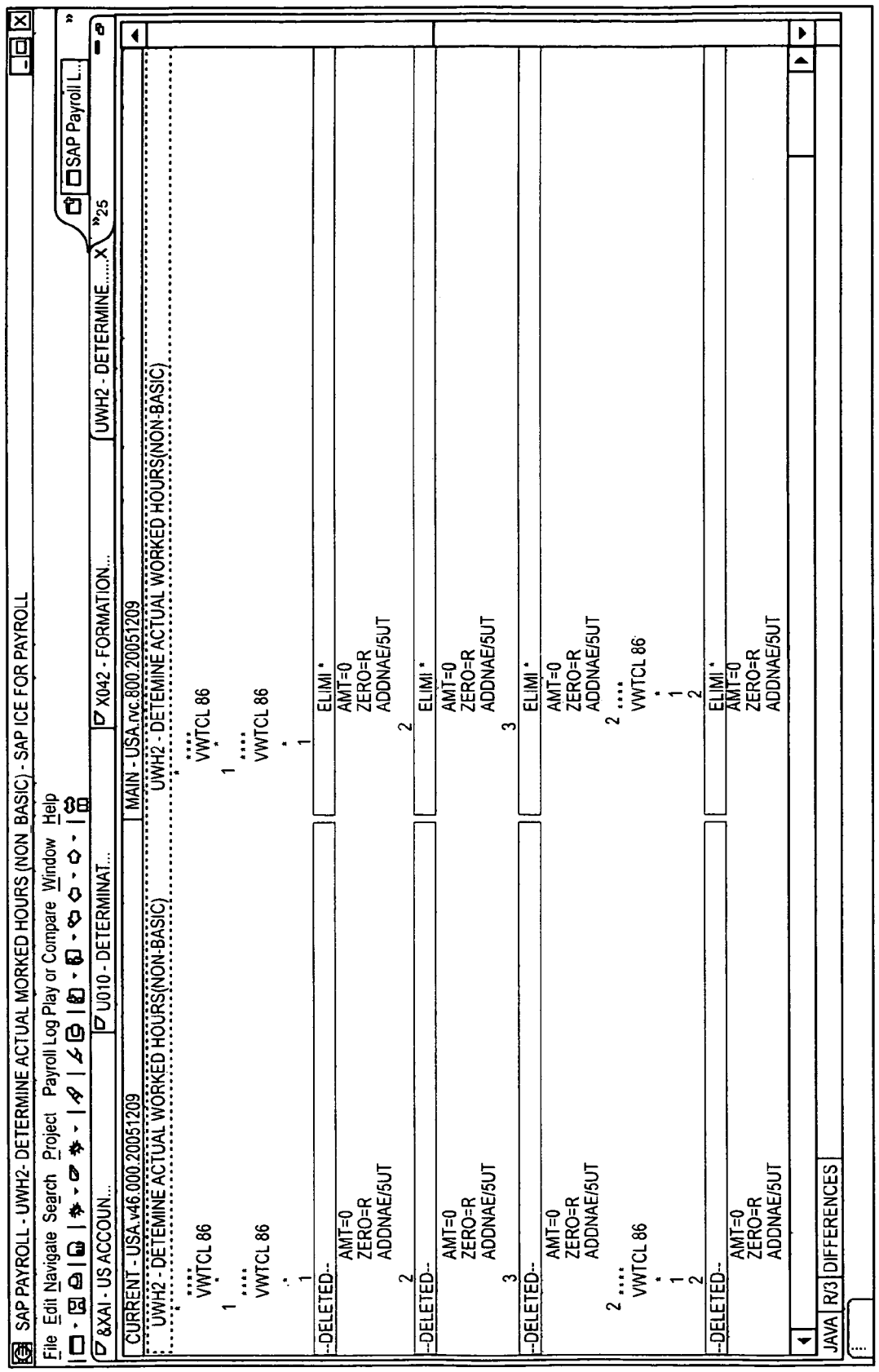

FIG. 67 displays an exemplary user interface that may be used to analyze and select differences between objects in two models, for example, such as might be used during stages 7415 and 7420 of FIG. 74. In the embodiment shown, an interactive window 6705, such as an interactive browser window that is part of an ICE, displays a portion of two models of two different configurations of a business application. The business application model on the left is entitled "Current— USA.v46.000.20051209" 6710 and the model on the right is entitled "Main—USA.rvc.800.20051209" 6720. Under the two model titles are displayed two different versions of a rule object "UWH2—Determine actual worked hours (non-basic)" 6725 from the two different business application models. As shown, the corresponding portions of rule object "UWH2" are shown side by side, and the display has highlighted the lines that are different 6730 between the two configurations.

In another embodiment, items on the display may be associated with an icon that indicates that a particular item, such as an object field or attribute, is different from the one it is being compared to. Such embodiments may allow a user to compare the items, and select one by manipulating the icon. In another embodiment, the differences may be displayed using markers next to a difference and pop-up text boxes explaining the difference. For example, for some data objects such as a wagetype in an R/3™ payroll application, the data structure may have differences in the data fields, or sub-objects that may have differences. One object may be displayed along with a summary of the differences between the object and another object, such as a textual explanation of what the differences are.

Using a display such as is shown in FIG. 67, a user may analyze the differences between models of business applications, choose one model, or the portions of each model, desired, and merge the models to create a new model, which may in turn be transformed into a new version of the business application.

Conclusion

Accordingly, as disclosed, systems and methods are provided for analyzing a business application's data, operations, and relationships and creating a corresponding model, such as an object oriented programming (OOP) object model, comprising OOP objects, functions, and operators corresponding to the business application entities, and various uses involving the model for improving the business application. The foregoing description of possible implementations consistent with the present invention does not represent a comprehensive list of all such implementations or all variations of the implementations described. The description of only some implementations should not be construed as an intent to exclude other implementations. One of ordinary skill in the art will understand how to implement the invention in the appended claims in may other ways, using equivalents and alternatives that do not depart from the scope of the following claims.

The systems and methods disclosed herein may be embodied in various forms including, for example, a data processor, such as a computer that also includes a database. Moreover, the above-noted features and other aspects and principles of the present invention may be implemented in various environments. Such environments and related applications may be specially constructed for performing the various processes and operations according to the invention or they may include a general-purpose computer or computing platform selectively activated or reconfigured by code to provide the necessary functionality. The processes disclosed herein are not inherently related to any particular computer or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Systems and methods consistent with the present invention also include computer readable media that include program instruction or code for performing various computer-implemented operations based on the methods and processes of the invention. The media and program instructions may be those specially designed and constructed for the purposes of the invention, or they may be of the kind well known and available to those having skill in the computer software arts. Examples of program instructions include, for example, machine code, such as produced by a compiler, and files containing a high level code that can be executed by the computer using an interpreter.

What is claimed is:

1. A method of presenting business application execution information, comprising:
   executing a business application;
   creating an execution log containing information regarding operations and data of the business application in execution sequence order;
   identifying a set of objects used by the business application by matching the information regarding the operations and data of the business application with predefined objects that model the set of objects used in the business application;
   organizing the information in the execution log according to the set of objects;
   presenting the organized information according to the set of objects; and
   assigning an indicator to a log entry from a plurality of log entries signifying how the log entry affected an object in the set of objects.

2. The method of claim 1, wherein organizing further comprises:
   associating each entry in the execution log with an object that the entry affected during execution of the business application.

3. The method of claim 1, wherein presenting further comprises:
   creating a hierarchical display having the set of objects as top level nodes of the hierarchy and the organized information in the execution log as sub-nodes of the top level nodes.

4. The method of claim 3, wherein the sub-nodes are arranged in chronological order of execution.

5. The method of claim 1, wherein the information from the execution log regarding the operations and data of the business application comprises the plurality of log entries,
   and where presenting further comprises:
      displaying a representation of the assigned indicator with a representation of the log entry.

6. A method of organizing a plurality of entries regarding a plurality of operations of a business application during execution, comprising:
   recording an execution log containing the plurality of entries in execution order, wherein an entry of the plurality of entries contains information regarding an operation of the plurality of operations, and wherein the information indicates an object affected by the operation;
   reorganizing the recorded execution log such that the entry containing information regarding the operation is associated with a category corresponding to the object;
   displaying a representation of the category corresponding to the object;
   displaying a representation of the entry containing the information regarding the operation associated with the category so as to visually associate the representation of the entry with the representation of the category;
   assigning an indicator to the entry containing the information regarding the operation based on how the operation affected the object; and
   displaying a representation of the assigned indicator so as to visually associate the representation of the assigned indicator with the representation of the entry.

7. The method of claim 6, wherein the category corresponding to the object is an object class.

8. The method of claim 6, further comprising:
   displaying a representation of a second entry containing information regarding the operation associated with the category so as to visually associate the representation of the second entry with the representation of the category.

9. The method of claim 8, wherein the representation of the entry and the representation of the second entry are displayed in execution order.

10. The method of claim 6, further comprising:
    displaying the representation of the category corresponding to the object among a plurality of representations of categories corresponding to a plurality of objects according to a category identifier provided by a user.

11. The method of claim 6, wherein the assigned indicator indicates whether the entry modified the object.

12. The method of claim 6, wherein displaying the representation of the entry containing the information regarding the operation associated with the category further comprises:
    displaying a value associated with the object before the operation executed; and
    displaying a second value associated with the object after the operation executed.

13. The method of claim 6, further comprising:
    sorting a plurality of object-oriented elements according to a chronological order of the plurality of operations.

14. A system, comprising:
    a processor for executing instructions stored on a computer-readable medium to perform a method of organizing a plurality of entries regarding a plurality of operations of a business application during execution, the method comprising:
       recording an execution log containing the plurality of entries in execution order, wherein an entry of the plurality of entries contains information regarding an operation of the plurality of operations, and wherein the information indicates an object affected by the operation;
       reorganizing the recorded execution log such that the entry containing the information regarding the operation is associated with a category corresponding to the object;
       displaying a representation of the category corresponding to the object;
       displaying a representation of the entry containing the information regarding the operation associated with the category so as to visually associate the representation of the entry with the representation of the category;
       assigning an indicator to the entry containing the information regarding the operation based on how the operation affected the object; and
       displaying a representation of the assigned indicator so as to visually associate the representation of the assigned indicator with the representation of the entry.

15. The system of claim 14, wherein the category corresponding to the object is an object class.

16. The system of claim 14, wherein the method further comprises:
    displaying a representation of a second entry containing information regarding the operation associated with the category so as to visually associate the representation of the second entry with the representation of the category.

17. The system of claim 16, wherein the representation of the entry and the representation of the second entry are displayed in execution order.

* * * * *